United States Patent [19]
Kirkland et al.

[11] Patent Number: 6,046,752
[45] Date of Patent: *Apr. 4, 2000

[54] PEER-TO-PEER PARALLEL PROCESSING GRAPHICS ACCELERATOR

[75] Inventors: Dale Kirkland; Cynthia E. Allison, both of Madison; James Paul Turner; Joseph Clay Terry, both of Huntsville; Jeffrey S. Ford, Madison, all of Ala.

[73] Assignee: Intergraph Corporation, Huntsville, Ala.

[ * ] Notice: This patent is subject to a terminal disclaimer.

[21] Appl. No.: 09/246,399

[22] Filed: Feb. 9, 1999

Related U.S. Application Data

[63] Continuation of application No. 08/761,104, Dec. 5, 1996, Pat. No. 5,917,502.

[51] Int. Cl.[7] .................................................. G06F 15/80
[52] U.S. Cl. ......................... 345/505; 345/520; 709/251
[58] Field of Search .................................. 345/502, 505, 345/506, 503, 520; 709/220, 221, 223, 226, 234, 251

[56] References Cited

U.S. PATENT DOCUMENTS

| | | |
|---|---|---|
| 4,646,232 | 2/1987 | Chang et al. . |
| 5,394,524 | 2/1995 | DiNicola et al. . |
| 5,446,479 | 8/1995 | Thompson et al. . |
| 5,557,734 | 9/1996 | Wilson . |
| 5,841,444 | 11/1998 | Mun et al. ............................. 345/506 |
| 5,870,567 | 2/1999 | Hausauer et al. ...................... 710/101 |

FOREIGN PATENT DOCUMENTS

| | | |
|---|---|---|
| 0 327 180 A2 | 5/1990 | European Pat. Off. . |
| 0 397 180 | 11/1990 | European Pat. Off. . |
| 0 627 682 A1 | 4/1994 | European Pat. Off. . |
| 0627682 | 12/1994 | European Pat. Off. . |
| WO 93/06553 | 4/1993 | WIPO . |

OTHER PUBLICATIONS

IEEE Computer Society Press, "A Multiprocessor System Utilizing Enhanced DSP's for Image Processing," Ueda et al., pp. 611–620, May 1988.

Proceedings of the 5th International Conference on Image Analysis and Processing, "A Date Flow Image Processing System TIP–4," Y. Fujita, et al.

NEC Research and Develop., No. 93 "A fine grained data flow machine and its concurrent execution mechanism" by Iwashita et al, pp. 63–72, Apr. 1989.

*Primary Examiner*—Kee M. Tung
*Attorney, Agent, or Firm*—Bromberg & Sunstein LLP

[57] ABSTRACT

A graphics accelerator includes a plurality of digital signal processors that are arranged in a self-regulating, peer-to-peer configuration. Accordingly, the processors cooperate to process, on a cyclical basis, each of a successive series of graphics requests received over a request bus. To that end, each processor includes a request bus, an input in communication with the request bus, and an output coupled to a sequencer for ordering graphics requests processed by the digital signal processors.

16 Claims, 57 Drawing Sheets

| | |
|---|---|
| DESTINATION TRANSFER COUNT | 400 |
| DESTINATION ADDRESS MODIFIER (ALWAYS ZERO) | 402 |
| DESTINATION TRANSFER ADDRESS | 404 |
| ADDRESS OF THIS CONTROL BLOCK | 406 |
| CHAIN POINTER | 408 |
| SOURCE TRANSFER COUNT | 410 |
| SOURCE ADDRESS MODIFIER (ALWAYS ONE) | 412 |
| SOURCE TRANSFER ADDRESS | 414 |
| WRITE WORD COUNT ADJUSTMENT FOR INPUT QUEUE ZERO | |
| WRITE WORD COUNT ADJUSTMENT FOR INPUT QUEUE ONE | |
| WRITE WORD COUNT ADJUSTMENT FOR INPUT QUEUE TWO | 416 |
| WRITE WORD COUNT ADJUSTMENT FOR INPUT QUEUE THREE | |
| WRITE WORD COUNT ADJUSTMENT FOR INPUT QUEUE FOUR | |
| WRITE WORD COUNT ADJUSTMENT FOR INPUT QUEUE FIVE | |

FIG.26

PEER-TO-PEER PARALLEL PROCESSING GRAPHICS ACCELERATOR

PRIORITY

This application claims priority from and is a continuation of U.S. patent application Ser. No. 08/761,104, filed Dec. 5, 1996, now U.S. Pat. No. 5,917,502 entitled "PEER-TO-PEER PARALLEL PROCESSING GRAPHICS ACCELERATOR", the disclosure of which is incorporated herein, in its entirety, by reference.

FIELD OF THE INVENTION

The invention generally relates to computer graphics processing and, more particularly, the invention relates to graphics accelerators having parallel processors.

BACKGROUND OF THE INVENTION

Graphics rendering devices commonly include parallel processors for improving processing speed. Such rendering devices typically require a controlling device that controls the operation of each processor relative to the other processors.

SUMMARY OF THE INVENTION

In accord with one aspect of the invention, a graphics accelerator includes a plurality of digital signal processors that are arranged in a self-regulating, peer-to-peer configuration. Accordingly, the processors cooperate to process, on a cyclical basis, each of a successive series of graphics requests received over a request bus. To that end, each processor includes a request bus, an input in communication with the request bus, and an output coupled to a sequencer for ordering graphics requests processed by the digital signal processors.

In a further preferred embodiment, each of the digital signal processors has a token input and a token output, and the token output of a first one of the digital signal processors is connected to the token input of a second one of the digital signal processors. And, the presence of a control token in the token input of a digital signal processor identifies an active digital signal processor and triggers the processing by such digital signal processor of a graphics request on the request bus, and after processing by such digital signal processor, the control token is provided upon the token output so that processing by all of the digital signal processors is controlled at a peer-to-peer level.

In a still further embodiment, the graphics accelerator has a distinct communication bus between the sequencer and each of the plurality of digital signal processors so that the sequencer may simultaneously receive a processed graphics request from each of the digital signal processors.

In another preferred embodiment, each a token includes an identifier of the digital signal processor placing the token upon the token output so that a first processor may determine when the token has traveled cyclically to all digital signal processors.

In another preferred embodiment, the sequencer further includes a method for simultaneously receiving the processed graphic requests from each digital signal processor, and a method for outputting to a graphics rendering device each processed request in the order the processed request was received upon the graphics bus.

In another preferred embodiment, the graphics accelerator further includes a workload balancing arrangement, wherein a first processor may reduce its workload by skipping its turn in the processing cycle.

In another preferred embodiment, the token input and the token output are configured to handle a global token, and wherein receipt by one of the digital signal processors of the global token in its token input causes such processor to process the graphics request upon the graphics request bus, and to place the global token on the token output so as to trigger processing of the graphics request by all other processors.

BRIEF DESCRIPTION OF THE DRAWINGS

The foregoing and advantages of the invention will be appreciated more fully from the following further description thereof with reference to the accompanying drawings wherein:

FIG. 26 shows the format of each control block for the output chain.

DETAILED DESCRIPTION OF PREFERRED EMBODIMENTS

Figure 1:
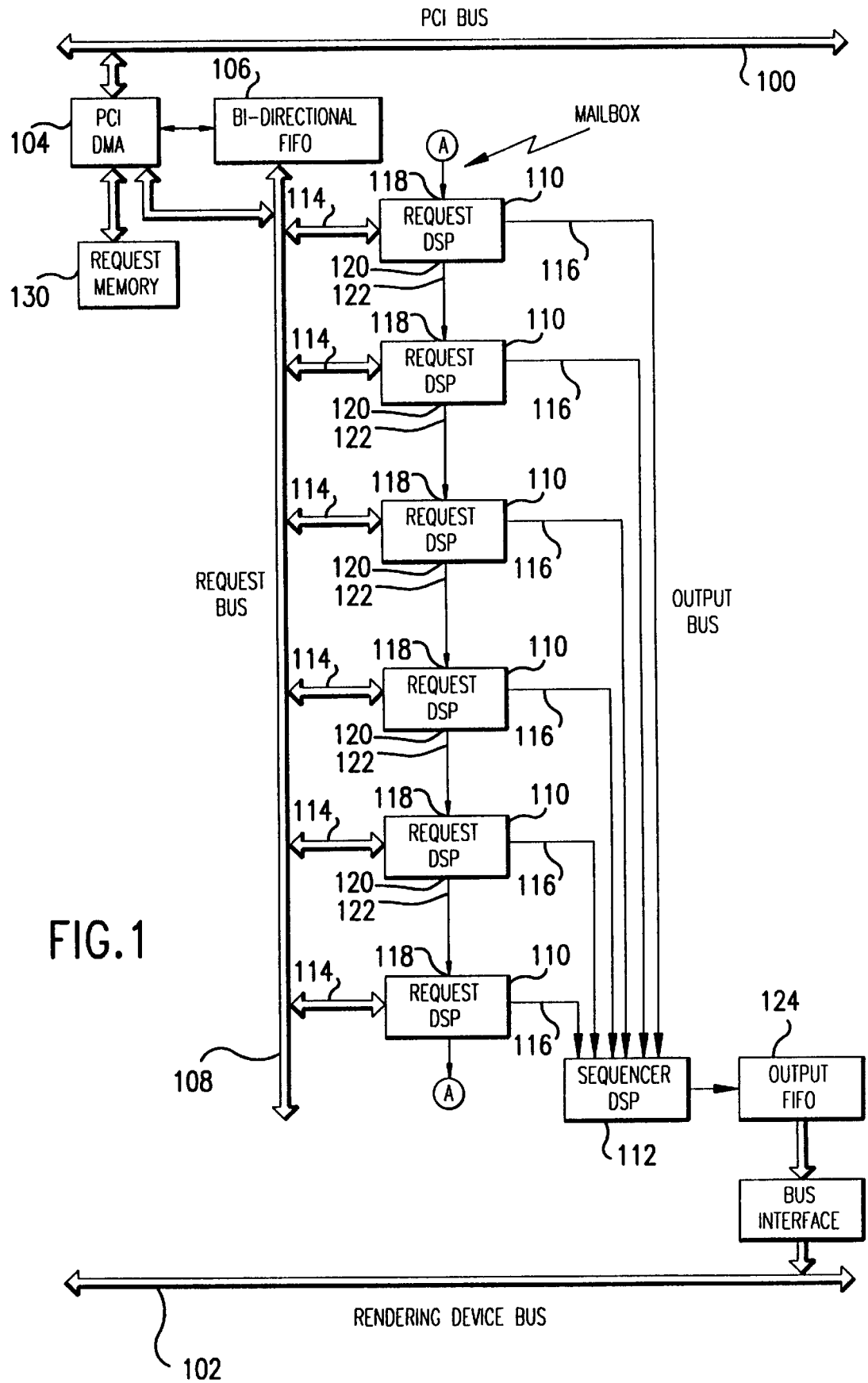
FIG. 1 is a flow-chart showing the high level structure of a preferred embodiment of the invention, where there is a private bus connecting the invention to a graphics output card.

A preferred embodiment of the present invention provides a graphics accelerator implemented by a peer-to-peer parallel processing graphics pre-processor card. In a preferred embodiment, the invention is used to implement an OpenGL client driver, VDD, and direct memory access driver for a host computer's video graphics rendering device (the device being accelerated by the present invention). The invention may be used to process graphics requests that would be processed within software, or that would be normally processed by the host computer's graphics rendering device. Although it is contemplated that preferred embodiments will accelerate OpenGL graphics requests, the present invention's architecture, design and method of operation theory may be used to accelerate any graphics system utilizing graphics procedure calls that may be enhanced through parallel processing of the request.

In a preferred embodiment, at least two digital signal processors (hereinafter "request processor" or "request DSP") for responding to graphics requests share a bus for data input and data movement between the digital signal processors. Each request processor maintains its own input and output queues. Each request processor has its own output bus to a sequencer digital signal processor (hereinafter "sequencer" or "sequencer processor"). During operation, a single request processor pulls input from the input FIFO as an interrupt task. The request processors receive input management commands through an incoming mailbox port. When a request processor has finished pulling a single request from the input FIFO, it notifies the next digital signal processor to pull data by sending it a token through the outgoing mailbox port. When a request processor encounters a global request in the input stream, it notifies all other request processors to copy the global request into their input queues or sends the information through the mailbox. Requests are typically distributed among the request processors in a round-robin fashion, but there is a mechanism disclosed hereinbelow for a busy request processor to pass the input FIFO ownership token without reading a request. In a preferred embodiment, output requests are sent over a dedicated output-bus that is in communication with the sequencer.

In a preferred embodiment, if the output generated by the invention results in a defined primitive having a zero area, in order to ensure proper sequencing of processed graphics requests, the request processor must send a null output request to the sequencer so that proper ordering of graphics requests may be maintained. The sequencer processes each output request in a round-robin fashion. In a preferred embodiment, the sequencer processor also performs screen-related and back-end processing, such as splitting output streams destined for separate renderers, checking for data integrity, and clipping the data to be sent to the graphics rendering device. Preferred embodiments are designed to be coupled to the graphics rendering device through a separate data bus to allow the direct sending of output data to the graphics rendering hardware. Alternatively, the invention also supports use with a graphics rendering device where output from the invention is passed back over the PCI bus or other system bus used to communicate with the invention.

Portions of the invention operate in parallel, and portions operate in a single-tasking mode. Single-tasking operations are interrupt-driven through use of Interrupt Service Routines (hereinafter ISRs). An ISR is a piece of program code left resident in a computer's volatile or non-volatile memory, and is somewhat equivalent to a terminate-and-stay-resident (TSR) type of program used to simulate multi-tasking under a disk operating system such as the DOS operating system developed by Microsoft Corporation for the International Business Machines Corporation). An ISR operates by redirecting an Interrupt Vector to point towards a piece of the invention's resident code, where this code may be located in hardware or software. Then, each time the redirected interrupt occurs, the resident ISR code is executed. Generally, interrupts may be generated by hardware (a port received a byte-in) or by software (by the BIOS, operating system, or application program). Once an interrupt occurs, the computer's processing is temporarily halted and the program environment for the halted tasks is stored while the ISR handles the cause of the interrupt. When the invention hardware is initialized, a software boot-up routine will initialize the invention, register the invention's device driver with the operating system, effect the vector redirection, and install the ISR device driver into the host computer's memory. In a preferred embodiment, the host-computer will be running the Windows NT operating system.

In a preferred embodiment, overall control flow for the invention is as follows. An application program makes an OpenGL call into the OpenGL32 dynamic link library (DLL). The OpenGL32 DLL dispatches the OpenGL client driver. The OpenGL client driver builds requests in a shared memory buffer. If the graphics request is one the invention is able to process, the requests will contain headers indicating that they may be processed by the invention. If the invention cannot handle the graphics request, the requests will contain headers indicating that they should be passed through to the graphics rendering device for processing of the request. The OpenGL client driver instructs the VDD to copy the buffer of requests to the invention via the OpenGL escape application programming interface (API). The VDD instructs the direct memory access driver to add the transfer to its direct memory access queue. The direct memory access driver programs the direct memory access hardware to copy the data from the shared memory buffer to the input FIFO of the invention. In systems without a private communication bus between the invention and the accelerated rendering device, the direct memory access driver is also responsible for keeping a perpetual direct memory access running to transfer data from the accelerator to the rendering device.

The invention processes the requests as they are transferred to it. Requests that require handling by the invention are processed, this processing generating processed graphics requests to then be handled by the graphics rendering device. Requests that do not require processing by the invention are simply passed through to the rendering device so that it may handle the request. In a preferred embodiment, all requests generated by the OpenGL client driver are sent to the invention via direct memory access. The VDD never accesses the invention directly except to flush the accelerator's subsystem, and it only accesses the rendering device directly when sending graphics device (GDI) requests or when reading from the rendering device.

In the description hereinbelow, it is presumed the invention is being used within a host computer running the Windows NT operating system. However, another operating system, for example, one supporting a graphics environment equivalent to OpenGL, such as X-Windows, or the Macintosh graphics environment, may be used to host the invention.

In an alternate embodiment, the invention could be implemented in software, where each digital signal processor is implemented as a separate threaded logical process. For the purpose of the claims that follow, the term digital signal processor includes such a logical process. In practice, the logical processes may be operated on a multiple processing machine such that each logical process is carried on a separate physical processor.

FIG. 1 is a hardware diagram showing the basic components of a preferred embodiment of the invention. Preferred embodiments may be installed within a host-computer to perform as a graphics pre-processing card, where there may be a dedicated communication bus between the invention and the graphics rendering device being accelerated. In alternate embodiments, the invention may be a single component (i.e. a type of large-scale integrated-circuit) or daughtercard to be added-on to a graphics rendering device. Shown in FIG. 1 is the bus 100 for the host-computer, which in this embodiment is a PCI based bus. Most communication with the invention will be through the host bus 100, and after data is processed by the invention, the invention will communicate its output directly to the graphics rendering device over a dedicated bus 102. However, as described hereinbelow for FIG. 2, one alternate embodiment has no dedicated connection, and in such circumstances the invention posts the processed graphics requests back onto the system bus 100. Attached to the host bus 100 is a bridge 104 for receiving the information off the host bus 100. Attached to the bridge is a memory 130 local to the invention for storing graphics requests before they are made available over the request bus 108 carries data relating to graphics requests to be processed by the invention. Use of the memory 130 allows the invention to have graphics requests stored local to the invention rather than in the host computer's main memory, and thus to have the requests more quickly and therefore more efficiently made available to the request bus 108. Different types of memory, for example, SRAM, DRAM, SDRAM, or error correcting RAM, may be used to configure the local memory 130. In addition to the request bus, the bridge 104 also communicates with a bidirectional FIFO 106. Attached to the request bus 108 are the request processors 110 which process the graphics requests, each of these digital signal processors function in parallel to form the present peer-to-peer graphics accelerator. In a preferred embodiment, there are at least two request processors 110 in addition to a sequencer processor 112. Additional digital signal processors 110 for processing graphics requests may be added to increase performance, and shown is a configuration having six request processors. Each processor 110 has an input connection 114 from the request bus 108, an output connection 116 to the sequencer 112, an input mailbox 118, an output mailbox 120, and a communication bus 122 for communicating between the digital signal processors. The request processors 110 operate in parallel. As graphics requests are received off of the request bus 108, notification of the request is sent to all request processors 110, and in a round-robin fashion the request processors retrieve and process the graphics requests.

To control the round-robin execution of instructions, there is a finite state machine timing loop cooperatively controlled by all processors 110, where the state machine has one node for each of the request processors. The incoming mailbox for each processor is used to implement each node of the state machine. The current state of the finite state machine is determined by whichever mailbox contains the state indicator, which is referenced in the description and the claims that follow as the "token." The presence of the token within a processor's mailbox indicates that the processor is currently responsible for retrieving a graphics request off of the graphics request bus 108. State changes are effected by the processors' 110 round-robin passing of the token the next processor's mailbox; this token-passing method of coordination is more fully disclosed hereinbelow. However, as a given request processor 110 may be busy with a complex task when it receives the token within its mailbox, preferred embodiments allow a processor to skip its turn, thus requiring the invention to allow requests to be processed out of strict round-robin order. To get processed requests back into the order as received, the sequencer 112 has an output FIFO 124 for temporarily storing processes graphics requests until an in order sequence may be reconstructed. Once the sequencer 112 has reassembled a sequence of requests, the results are sent to the graphics rendering hardware for display upon an output device. In a preferred embodiment, the invention has a dedicated bus 102 that allows the invention to directly send data to the graphics rendering device.

In a second preferred embodiment, rather than having a finite state machine loop cooperatively controlled by all processors 110, in this second embodiment each processor contains within it a state loop operating synchronously with the other processors' state loops. As with the previous embodiment, there are as many states as there are processors, but rather than passing a token between the processors, in this embodiment each node synchronously and internally tracks the passage of the state transitions. When the invention is first initialized, each processor is assigned a state to indicate the equivalence of having received a token as in the first embodiment. Here, the state of the a processor's internal state machine tells the processor whether it is currently responsible for retrieving the graphics request off of the request bus 108. In this second embodiment, state changes in this embodiment are effected by each processor internally moving a token around the state loop, and when the token arrives in the node corresponding to the processor containing the state loop, the processor is then responsible for retrieving a graphics request off of the graphics request bus 108.

Figure 2:
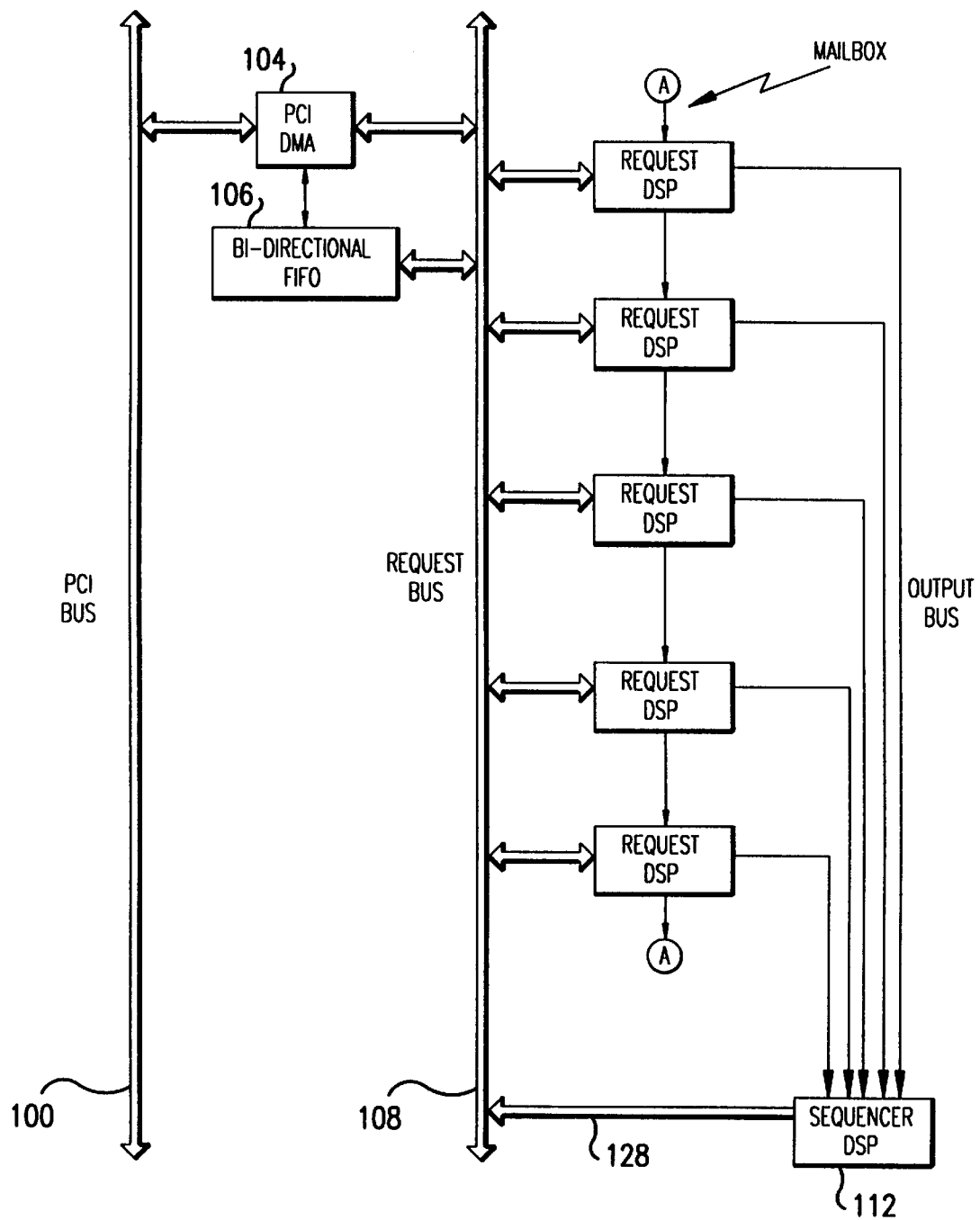
FIG. 2 is a flow-chart showing an alternate preferred embodiment of the invention, where there is no private bus connecting the invention to a graphics output card.

FIG. 2 shows a modified FIG. 1 embodiment in which there is no dedicated connection between the invention and the graphics renderer, and there is no local memory to increase the speed of transferring graphics requests to the request bus 108. In this embodiment, the sequencer 112 has a connection 128 to the request bus 108, through which the results of graphics processing are transferred back onto the host-computer's bus 100 through the bi-directional FIFO 106 and PCI bridge 104.

Figure 3:
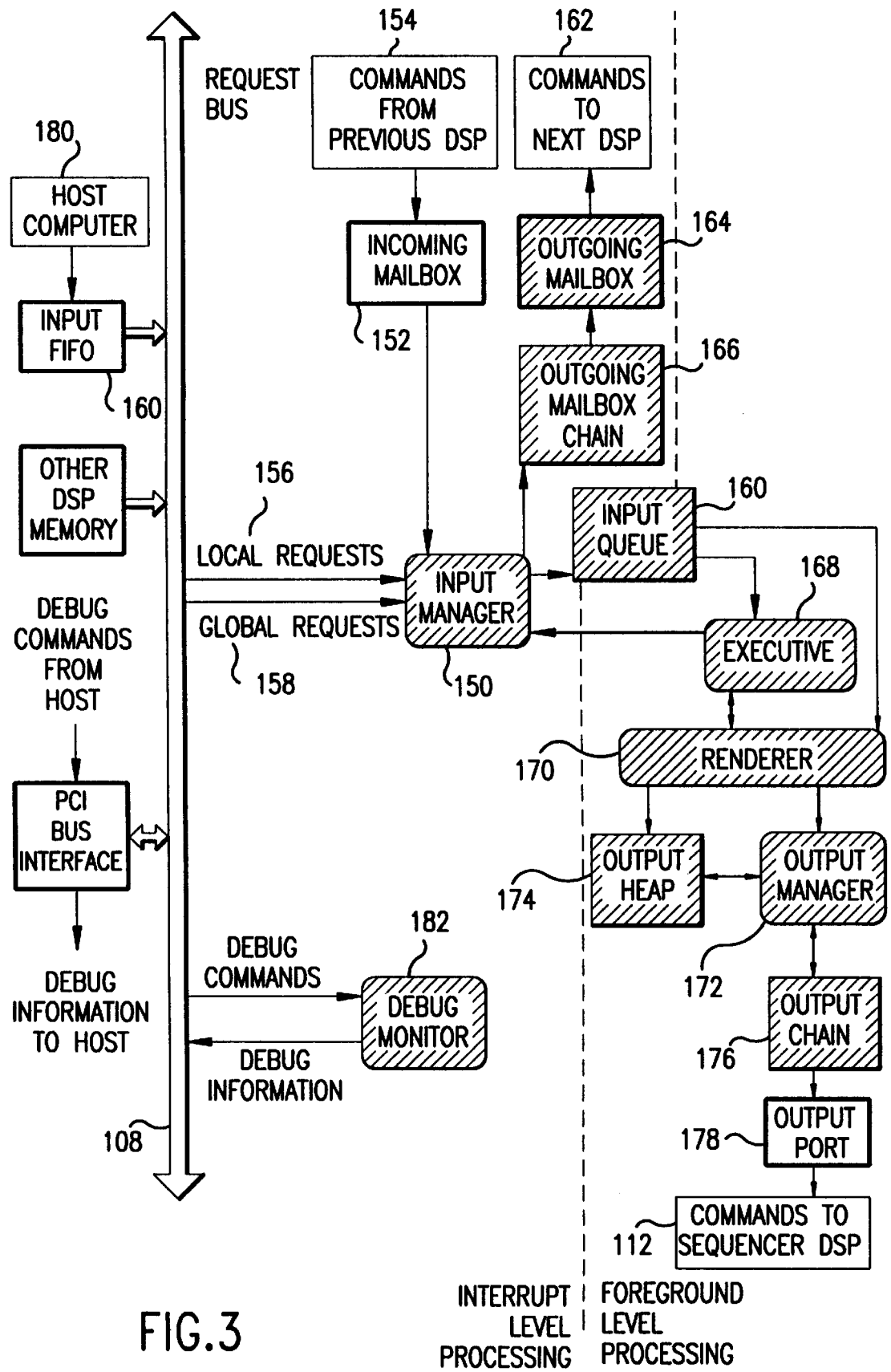
FIG. 3 is a flow-chart showing the internal configuration of a FIG. 1 request processor.

FIG. 3 shows the internal configuration for a single request processor 110 of FIG. 1. Shown as item 150 is the Input Manager. The input manager manages the incoming mailbox 152 and commands 154 (which may be a token) placed therein. The input manager also transfers local requests 156 and global requests 158 from the input FIFO 160 (this is the same FIFO shown on FIG. 1 as item 106) into the input queue 160, and sends global requests 158 as commands 162 to the next request processor through the outgoing mailbox 164. The input manager 150 is comprised of several functional entities implemented as Interrupt Service Routines (ISRs) that add data to the input queue and pass global requests to the other request processors, and utilized two main data structures.

Input Manager

Figure 9:
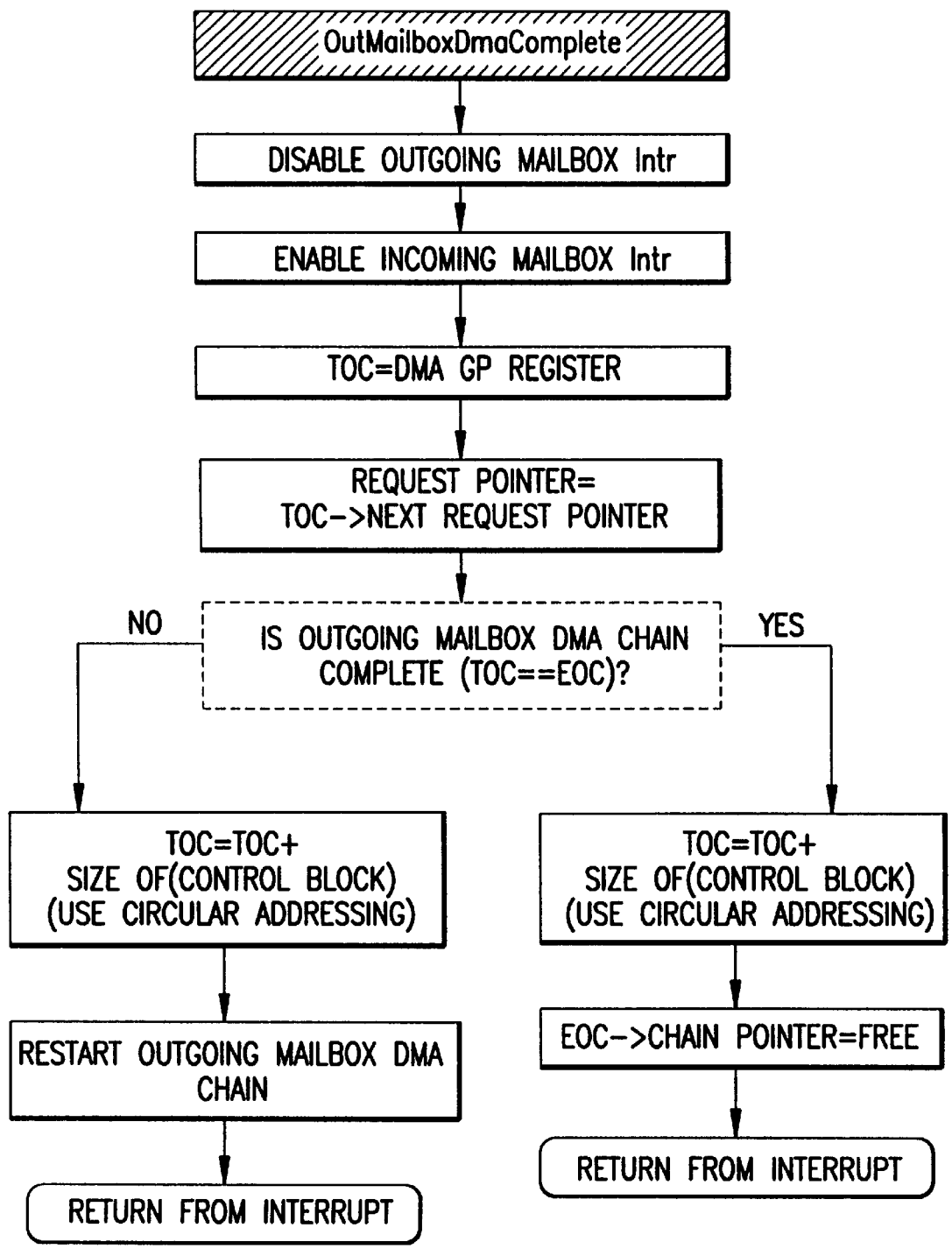
FIG. 9 is a flow-chart showing the flow control for the DmaCompleteOutgoingMailbox ISR.

The two major data structures used by the input manager are the Input Queue 160 and the Outgoing Mailbox Chain 166. When the outgoing mailbox 164 is full, a direct memory access is initiated to write data to it. The direct memory access is configured, in a preferred embodiment, so that the transfer will initiate as soon as the mailbox is no longer full. This allows an earlier return to active renderer processing. If more data must be output before the direct memory access is complete, it is placed into the outgoing mailbox direct memory access chain. The input management routines add requests to the outgoing mailbox direct memory access chain when the outgoing mailbox is full, or if more than one word needs be transferred. (FIGS. 30 et seq. described hereinbelow show the detailed structure of a chain entry in the outgoing mailbox direct memory access chain and manipulation thereof.) Upon completion of a transfer of a global request and tokens to the outgoing mailbox, in a preferred embodiment, the DmaCompleteOutgoingMailbox ISR is invoked. FIG. 9, described hereinbelow, discusses the detailed control flow for this function.

The first functional entity used by the Input Manager 150 is the Incoming Mailbox ISR (shown as FIG. 4) which is invoked when the incoming mailbox 152 receives a token. FIGS. 4 through 8 show, in detail, the flow of control for this ISR. This ISR is disabled from occurring until the appropriate direct memory access transfer is complete.

Figure 4:
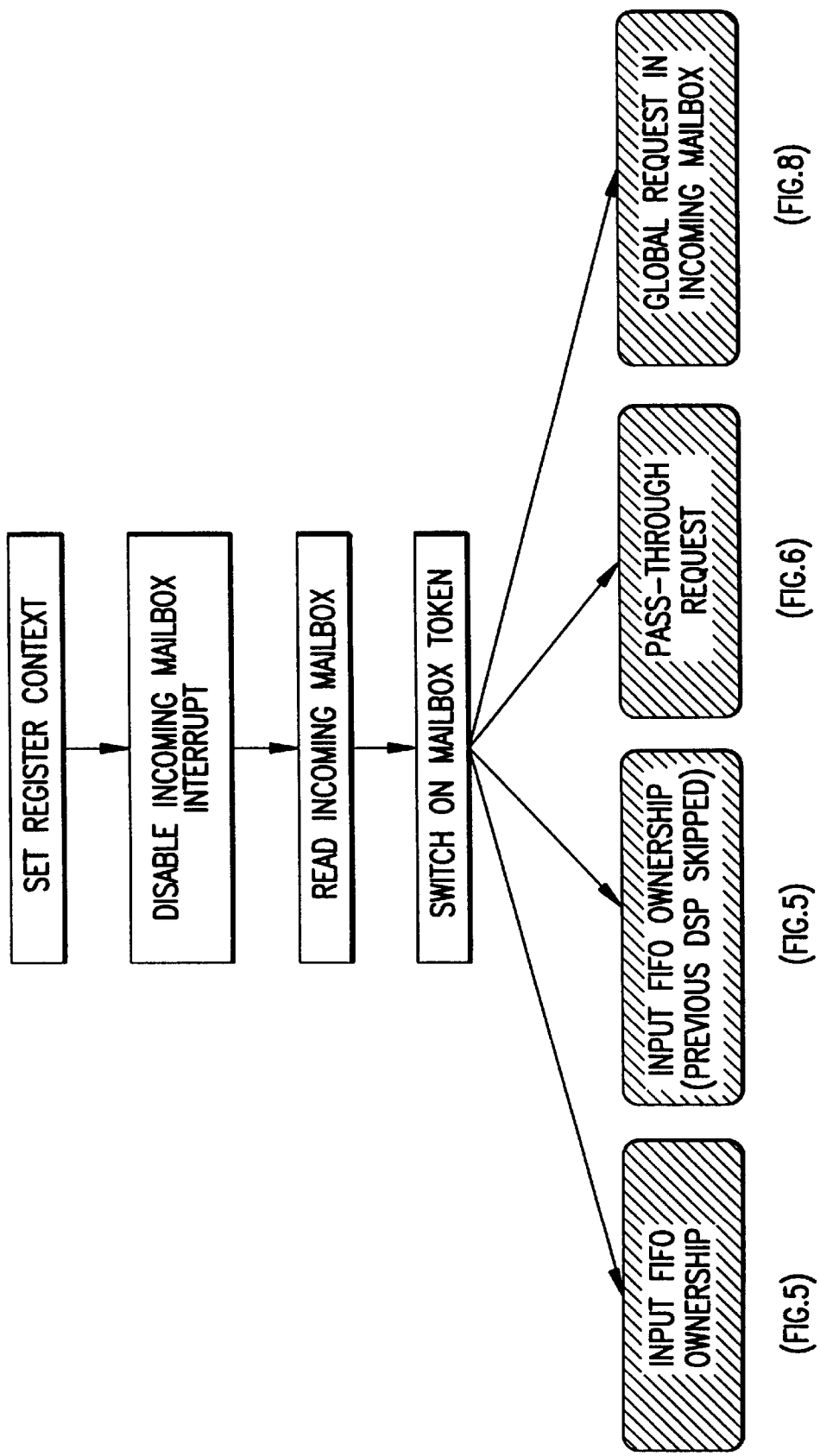
FIG. 4 is a flow-chart showing the top-level processing after a token is received in a mailbox.
Figure 5:
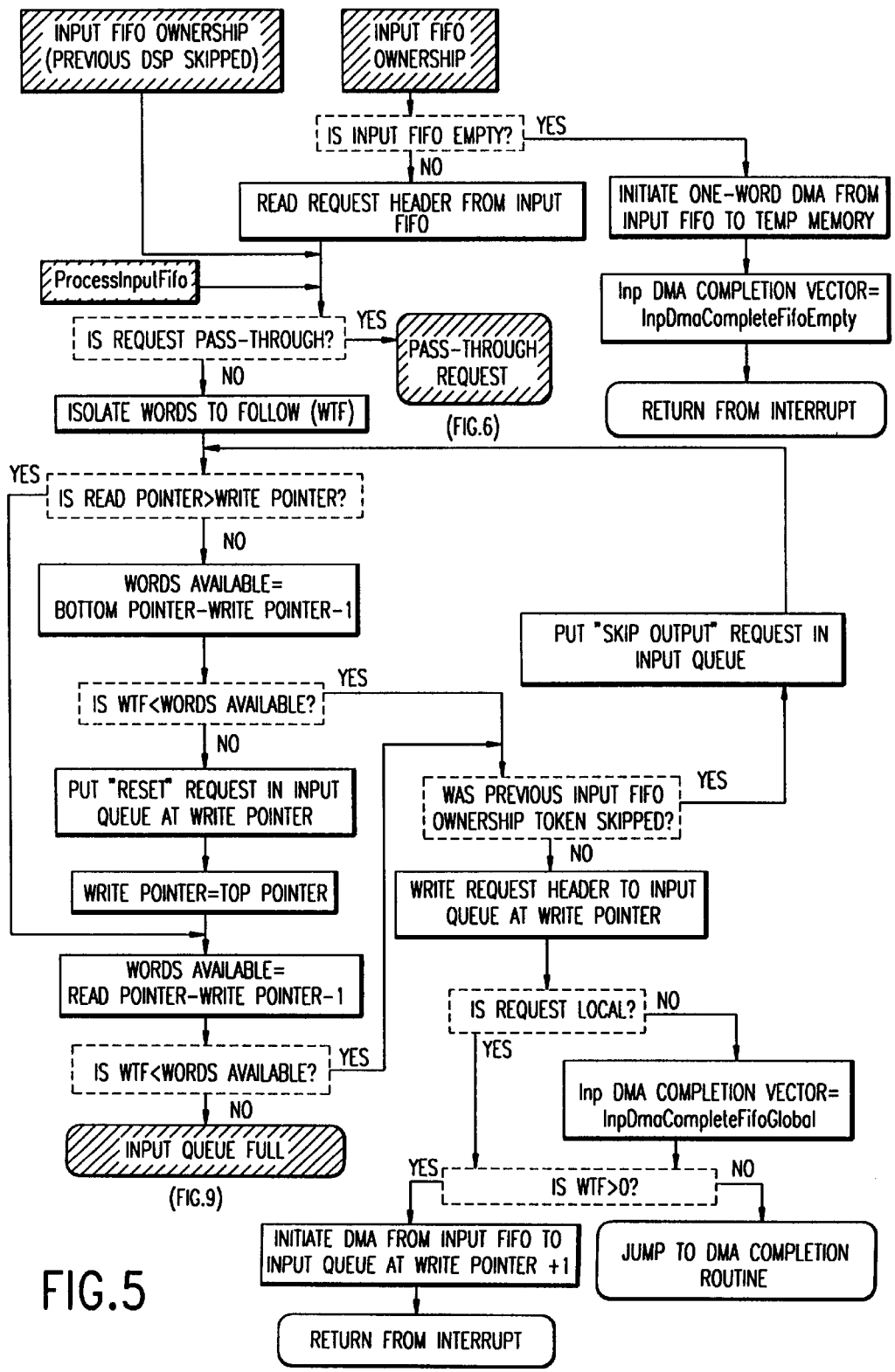
FIG. 5 is a flow-chart continuing the FIG. 4 flow-chart.
Figure 6:
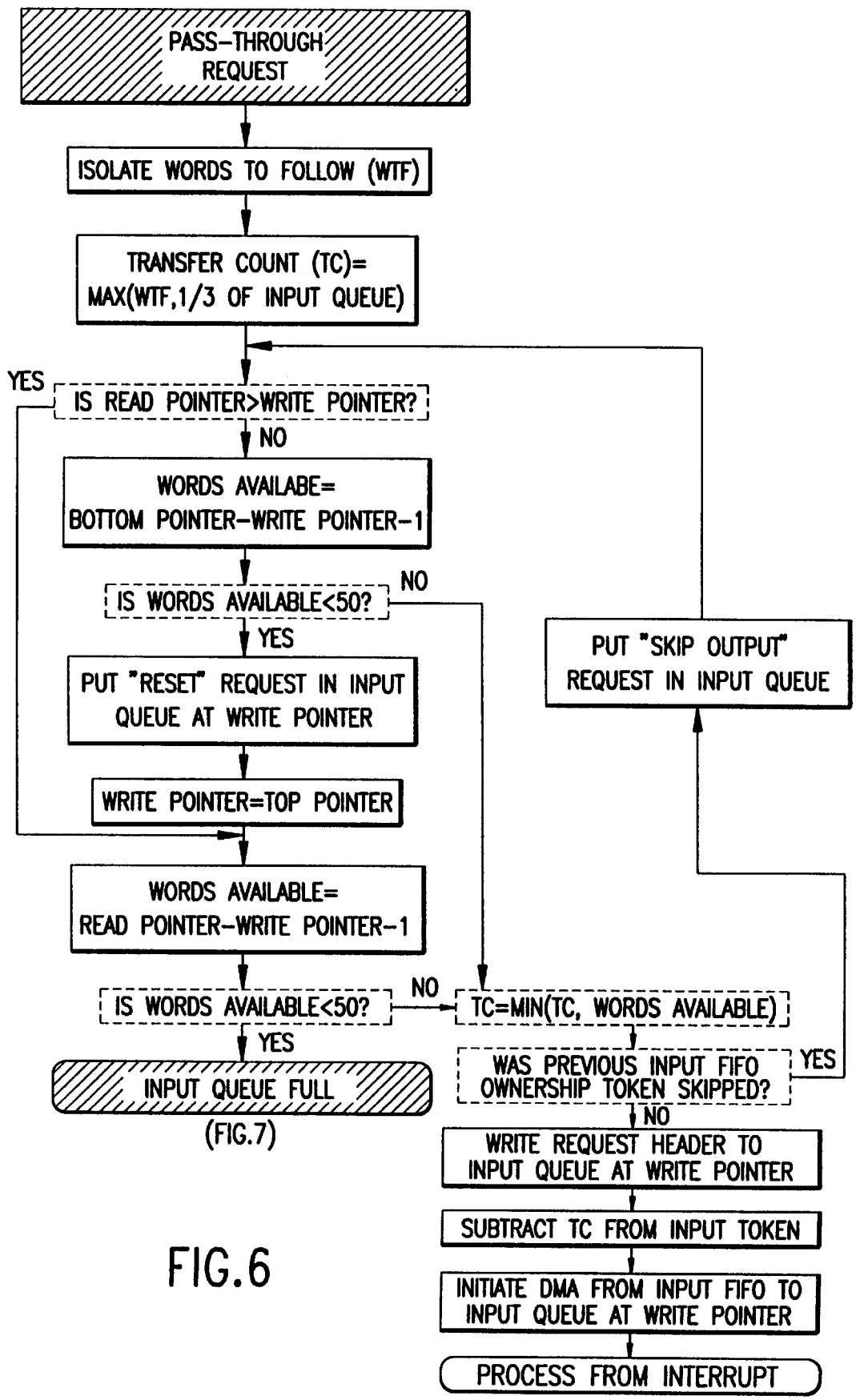
FIG. 6 is a flow-chart continuing the FIG. 4 flow-chart.
Figure 7:
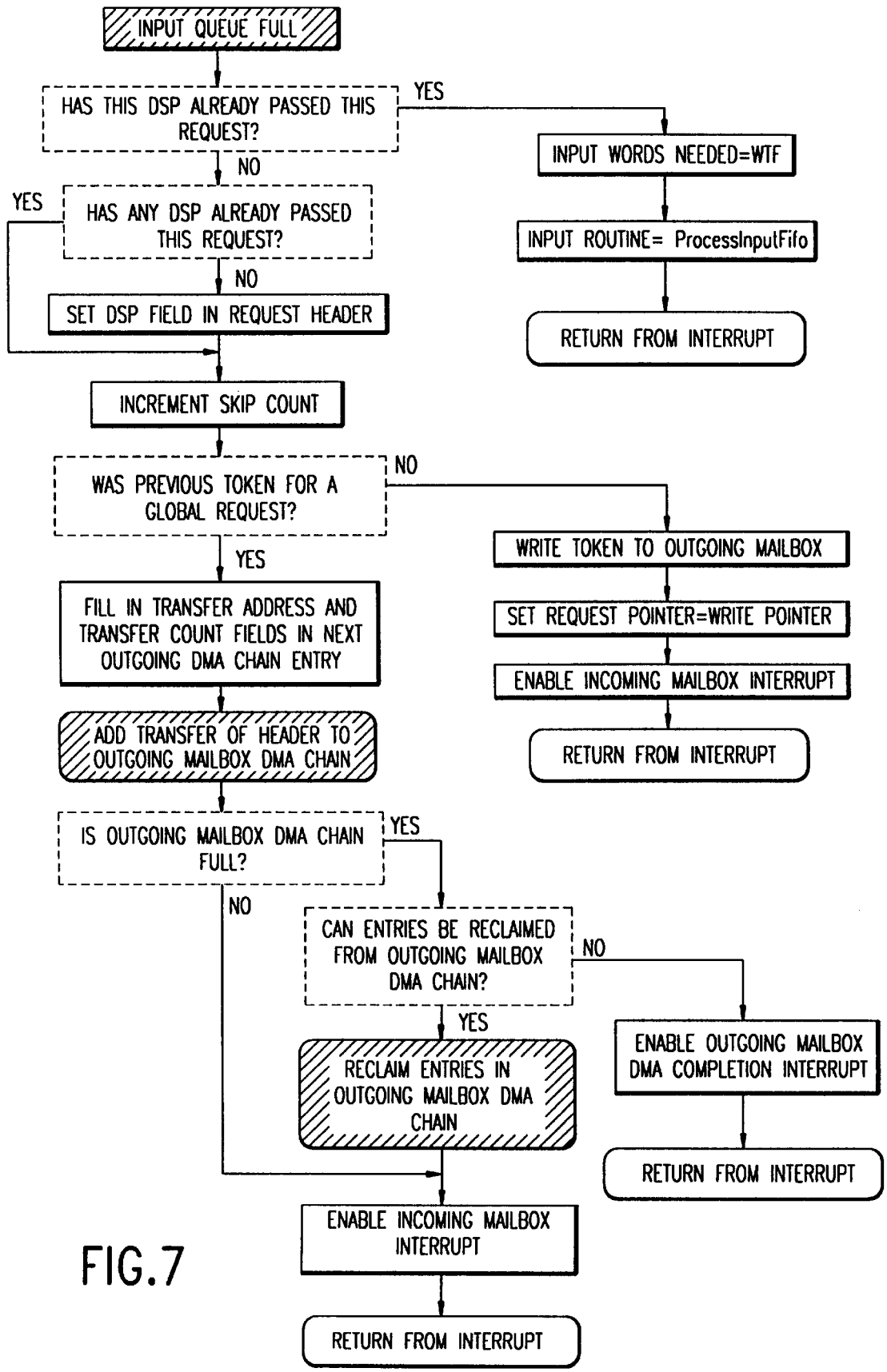
FIG. 7 is a flow-chart continuing the FIG. 6 flow-chart.
Figure 8:
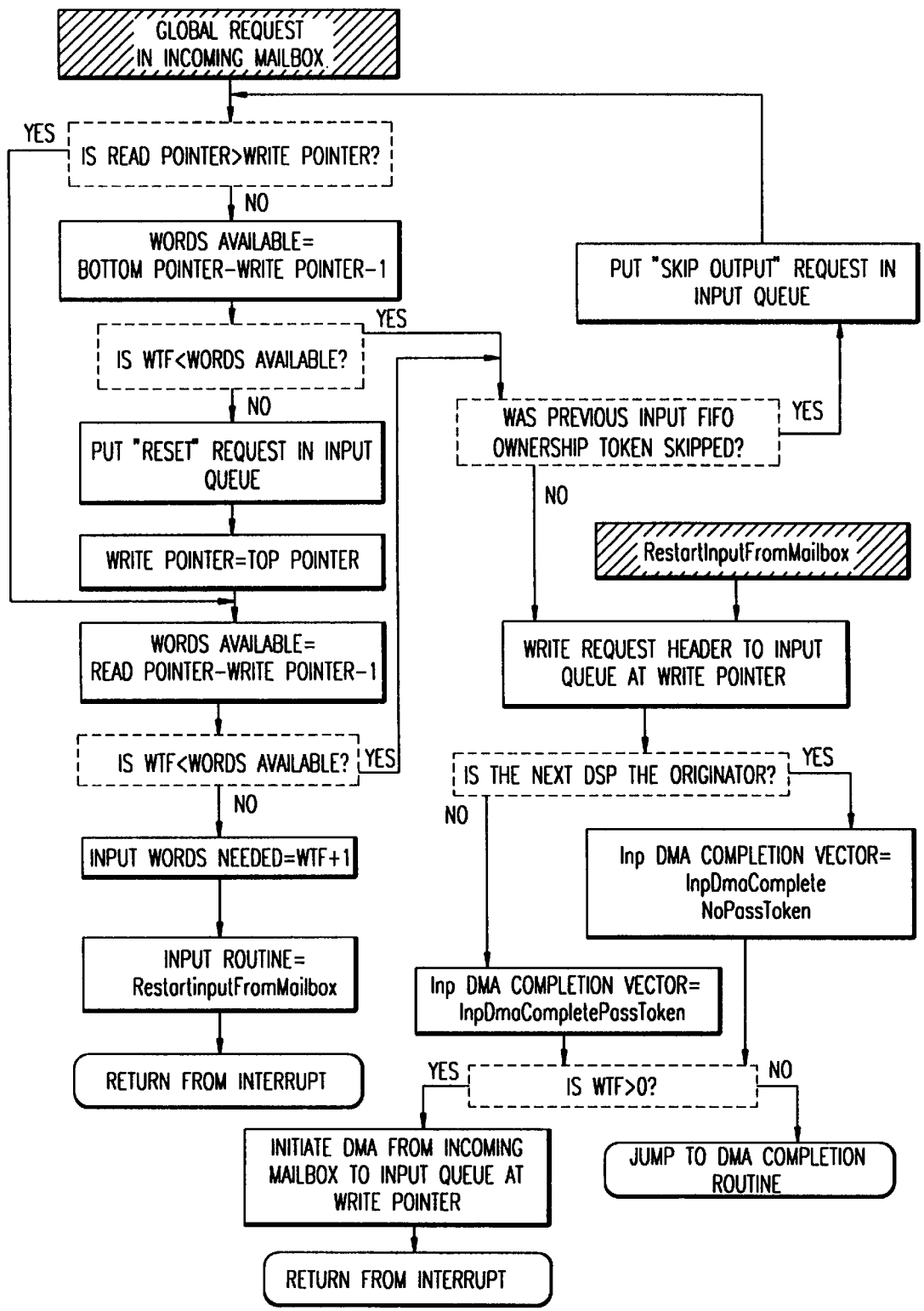
FIG. 8 is a flow-chart continuing the FIG. 4 flow-chart.

FIG. 4 shows the top-level control flow for the processing of the Incoming Mailbox ISR, in which depending on the type of token present in the mailbox, program control continues at FIGS. 5, 6 and 8. In a preferred embodiment, the Incoming Mailbox ISR is invoked whenever data is present in the incoming mailbox for a request digital signal processor.

FIG. 5 shows the processing of input FIFO ownership tokens for when the token is of type Input FIFO Ownership or Input FIFO Ownership (Previous DSP Skipped). This processing illustrates the logic required to track a digital signal processor's choosing to skip its turn in the round-robin processing queue.

FIG. 6, continues FIG. 5, and shows the processing of input FIFO ownership tokens with respect to having received pass-through requests. As described herein, configuration commands for the graphics display device being accelerated by the present invention are not normally processed by the invention, and are rather transmitted directly to the display device for its interpretation of the commands. FIG. 6 shows the processing of input FIFO ownership tokens with respect to the Incoming Mailbox ISR. This figure continues on FIG. 7. When the Input DMA Completion ISR is invoked (see also discussion hereinbelow for FIG. 27). In a preferred embodiment, the completion activity triggers one of the following five functions.

The first completion function is the InpDmaCompleteFifoOwn. This routine is invoked when the direct memory access of a local request from the input FIFO has completed and the previous token passed to the next request processor was an input FIFO ownership token or a pass-through request token. It passes the token to the next request processor by writing it directly to the outgoing mailbox.

The second completion function is the InpDmaComplete-PassToken. This routine is invoked in one of the following situations: (a) upon completion of a DMA transfer of a local request from the input FIFO when the previous token passed to the next request processor was a global request; or (b) upon completion of a DMA transfer of a global request from the incoming mailbox, if the next request processor is not the originator of the request. In each of these situations, the appropriate token is passed to the next request processor by placing a DMA control block on the outgoing mailbox DMA chain.

The third completion function is the InpDmaCompleteFifoGlobal. This routine is invoked when the DMA of a global request from the input FIFO has completed. The global request is passed to the other request digital signal processors (via outgoing mailbox), and the next request is processed from the input FIFO.

The fourth completion function is the InpDmaCompleteNoPassToken. This routine is invoked when the DMA of a global request from the incoming mailbox has completed and the next request processor is the originator of the request. No token is passed to the next request processor.

The fifth completion function is the InpDmaCompleteFifoEmpty. This routine is invoked when the input FIFO was empty and a DMA was initiated to read the request header. In a preferred embodiment there are four types of tokens that may appear in the mailbox to trigger the Incoming Mailbox ISR. The first token type is the Input FIFO Ownership token. This token indicates that the request processor receiving it has ownership of the input FIFO. The digital signal processor must read data from the input FIFO into its input queue until a single local request has been read. If the input FIFO is empty, the digital signal processor must initiate a single-word direct memory access and exit. After the token, the next word in the input FIFO is a request header. The digital signal processor must read the request header from input FIFO and initiate direct memory access to read the remainder of the request.

The second token type is an Input FIFO Ownership (Previous DSP Skipped) token. This token indicates that the request processor receiving it has ownership of the input FIFO. The digital signal processor must read data from the input FIFO into its input queue until a single local request has been read. Previous request processor relinquished ownership of input FIFO without reading a single local request. For this token, the token in the incoming mailbox contains a request header, and the next word in the input FIFO will be the first word of the request following the header. The digital signal processor will initiate a direct memory access to read the remainder of request.

The third token type is a Pass-Through Request token. This token indicates that the request processor receiving it has ownership of the input FIFO. The digital signal processor then reads portion of pass-through request that fits into its input queue, then passes remainder of the data on to next digital signal processor. In a preferred embodiment, the next digital signal processor in round-robin fashion should read a minimum of ten words and a maximum of one-third of the input queue size, and then pass the remainder on to the next digital signal processor in the series. The incoming mailbox token contains the word count. The next word in the input FIFO will be the first to pass through to the rendering hardware. The digital signal processor is then to initiate direct memory access to read part or all of pass-through request.

The fourth token type is a Global Request via Incoming Mailbox token. This token indicates that the request processor receiving this token must read a global request from the incoming mailbox and place the global request into its input queue. The digital signal processor must then initiate a direct memory access to read the global request from mailbox.

The Input Manager's 150 second functional entity is the Input FIFO DMA Completion ISR (Request Header). This ISR is invoked when direct memory access from the input FIFO 160 to the input queue 160 is complete and only a request header was transferred (the input FIFO was found empty in the incoming mailbox ISR). The input manager 150 then reads the request header into a local memory, and jumps to an entry point in the incoming mailbox ISR to process the request header.

The Input Manager's 150 third functional entity is the Input FIFO DMA Completion ISR (Local Request). This ISR is invoked when direct memory access from the input FIFO 160 to the input queue 160 is complete and the request being transferred was a local request. The input manager 150 adjusts the input queue 160 pointers, passes the input FIFO ownership token to the outgoing mailbox 164, an enables the incoming mailbox interrupt.

The Input Manager's 150 fourth functional entity is the Input FIFO DMA Completion ISR (Global Request Owner). This ISR is invoked when direct memory access from the input FIFO to the input queue 160 is complete and the request being transferred was a global request. The input manager 150 adjusts the input queue 160 pointers, and passes the global request token to the outgoing mailbox 164 for the other request processors to receive.

In a preferred embodiment, global requests are passed to the next digital signal processor via one of two methods: (1) in a preferred embodiment, the request is passed via a direct memory access to the outgoing mailbox, or (2) as in an alternate embodiment, a copy of the request is made in memory and its address is passed to the next digital signal processor. Note that the request dispatcher (see discussion relating to the Executive 168 discussed hereinbelow) should not be allowed to dispatch the global request until the outgoing direct memory access is complete. After passing the request, the input manager 150 then processes the next request from the input FIFO 160.

The Input Manager's 150 fifth functional entity is the Global Request DMA Completion ISR (Transfer from Incoming Mailbox). Preferred embodiments define this function to be invoked when direct memory access from the incoming mailbox 308 to the input queue 302 is complete. The input manager 300 then adjusts the input queue pointers, passes the global request to the next digital signal processor via the outgoing mailbox 306, and then enables the incoming mailbox interrupt service routine.

The Input Manager's 150 sixth functional entity is the Global Request DMA Completion ISR (Transfer to Outgoing Mailbox). Preferred embodiments define this function to be invoked when the input manager 150 stalls due to a full outgoing mailbox direct memory access chain 166. This function is invoked when the chain of direct memory access of mailbox tokens or global requests to the outgoing mailbox 164 is complete. After invoking this function, in a preferred embodiment, the input manager 150 adjusts the input queue pointers, and enables the incoming mailbox interrupt service routine.

FIG. 8 shows the detailed control flow for handling a global request in an Incoming Mailbox.

FIG. 9 shows the detailed control flow for the DmaCompleteOutgoingMailbox ISR. The DmaCompleteOutgoingMailbox ISR is invoked upon completion of a transfer of a global requests and tokens to the outgoing mailbox.

Executive

Continuing with FIG. 3, shown as item 168 is the Executive. The executive provides for idle processing, it also dispatches requests from the input queue 160 to the renderer 170, restarts the input manager 150 when the input manager stalls due to a full input queue, and it provides the ability to introduce error handling. In addition, although not necessary in a preferred embodiment under Windows NT, the executive may also provide a code overlay mechanism for those operating environments requiring overlays.

In a preferred embodiment, the executive 168 comprises several functional entities.

Figure 10:
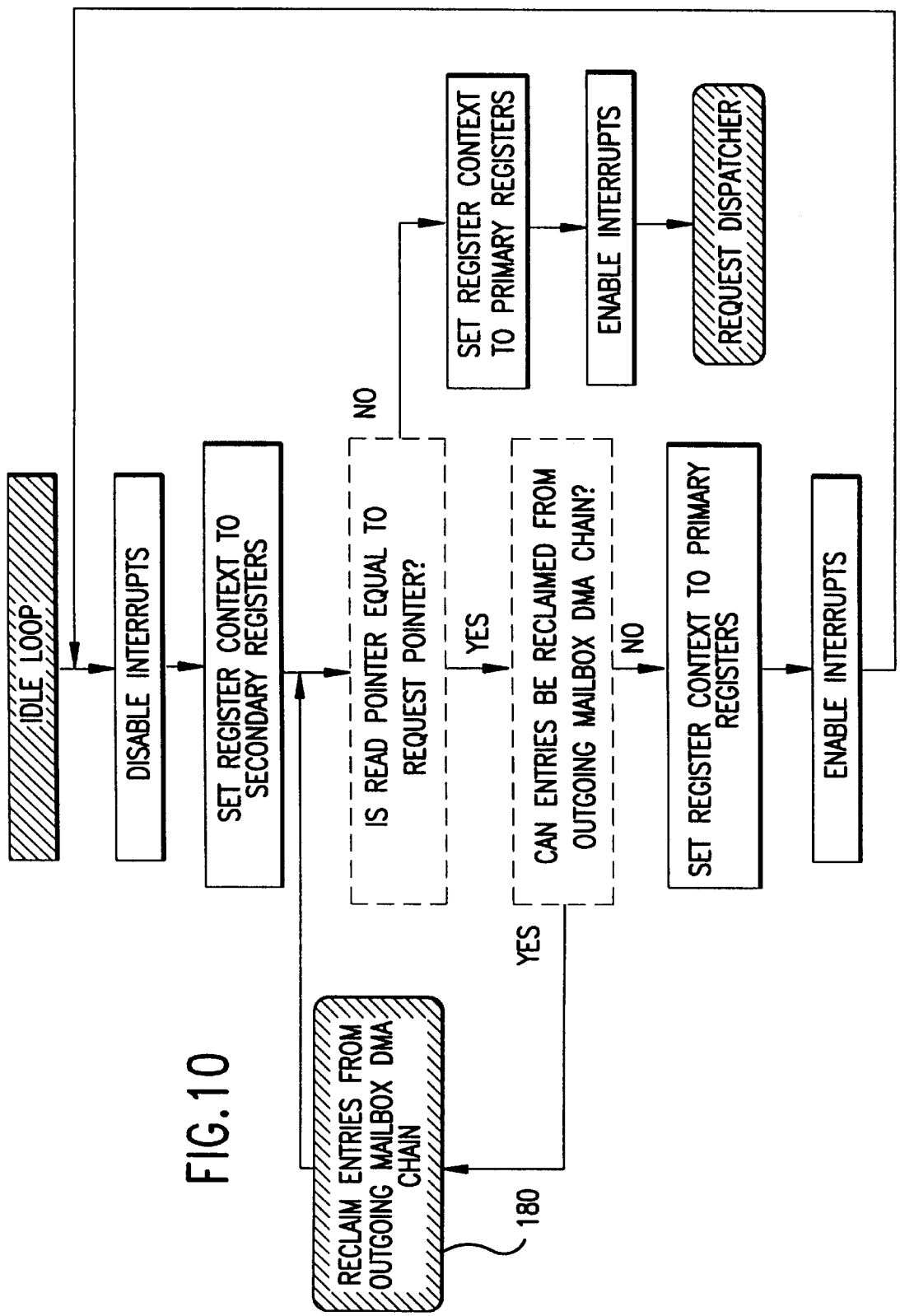
FIG. 10 is a flow-chart of a first idle loop of the FIG. 3 executive function.

FIG. 10 details the Idle Loop, the first executive functional entity. This function waits for requests to become present in the input queue 160 and it reclaims entries 180 from the output chain 176. Note that in alternate embodiments, rather than utilizing fixed sized queues and buffers, dynamically expandable queues and buffers, restricted only by available memory storage, may be utilized instead. This loops runs as a foreground process when the input queue 160 is empty.

Figure 11:
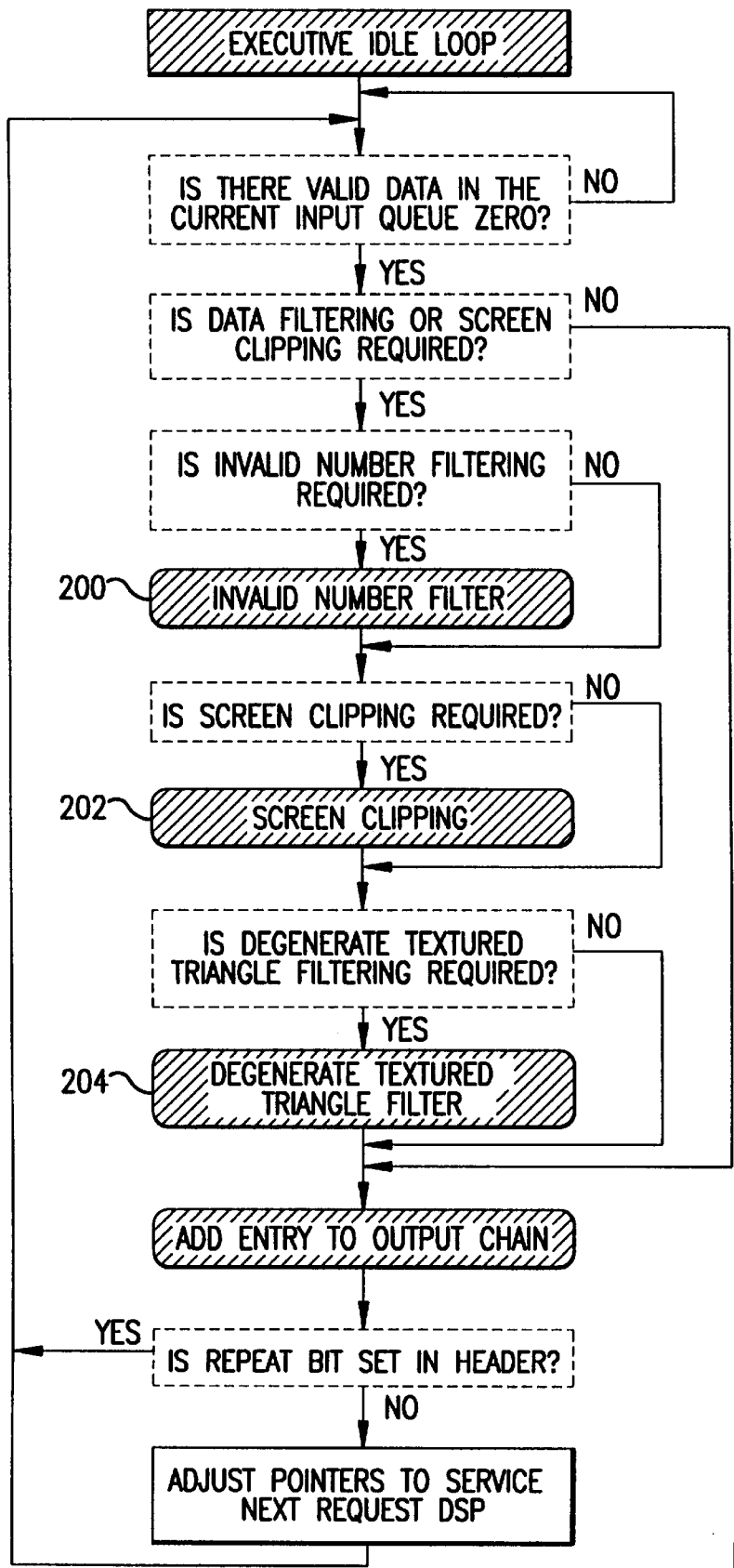
FIG. 11 is a flow-chart of an executive idle loop of the FIG. 1 sequencer digital signal processor.

FIG. 11 shows the detailed control flow for the executive idle loop of a sequencer digital signal processor 112 of FIG. 1. This loop is active when the input queue 160 is not empty, and it controls the executive's servicing of requests 156, 158 from the request processors (items 110 of FIG. 1) through the input queue 150. One of the primary functions of the executive 168 is the pre-processing of graphics data before the data is added to the output chain 176. Before data is transferred to the outgoing mailbox 164, the executive first performs invalid number filtering 200, screen clipping 202, and degenerate data filtering 204.

Figure 12:
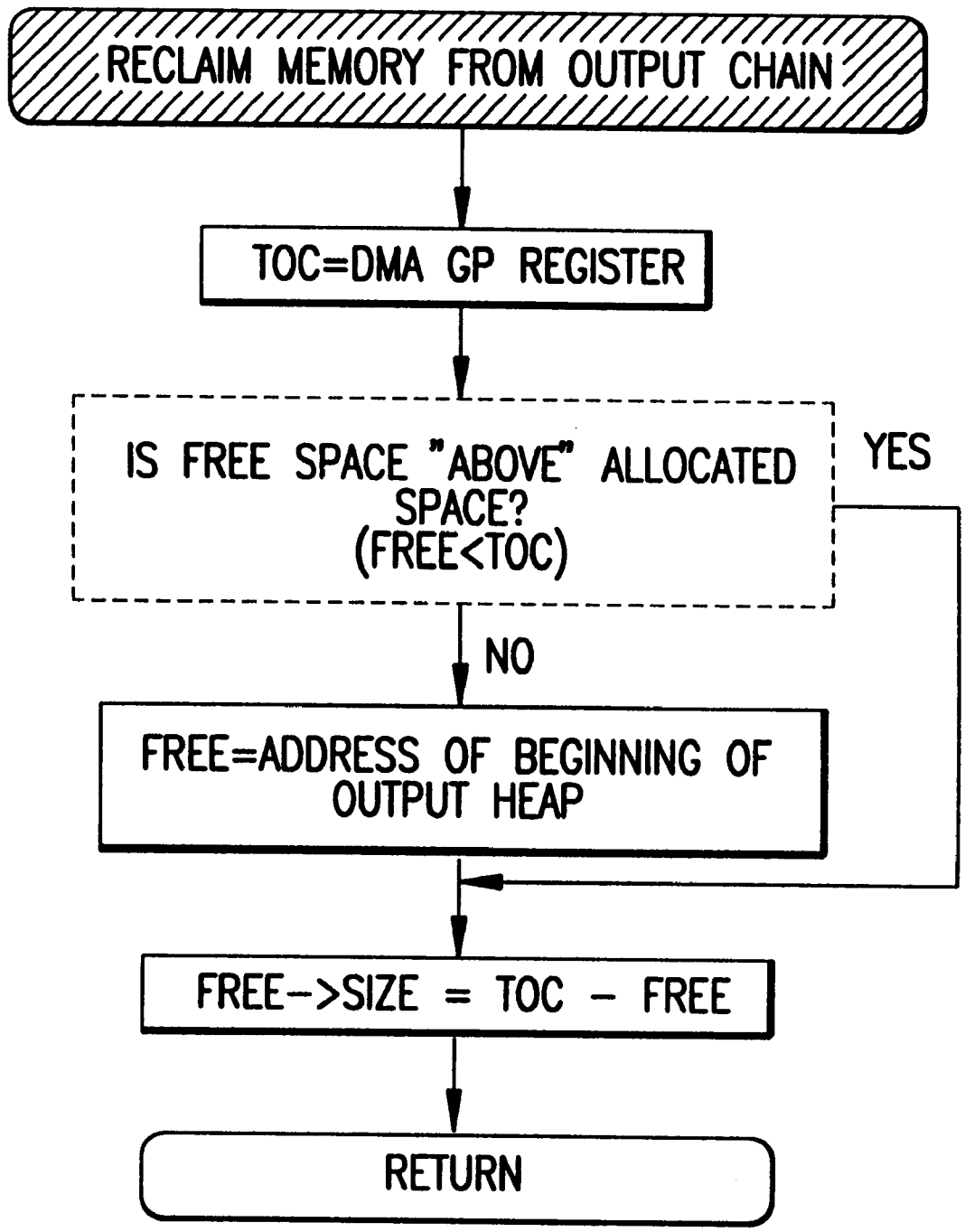
FIG. 12 is a flow-chart showing how to reclaim memory from the output chain of FIG. 10.

FIG. 12 shows the control flow for reclaiming memory from the output chain that is referenced by item 180 of the FIG. 10 idle loop. In a preferred embodiment, memory is always reclaimed from the top of the chain.

Figure 13:
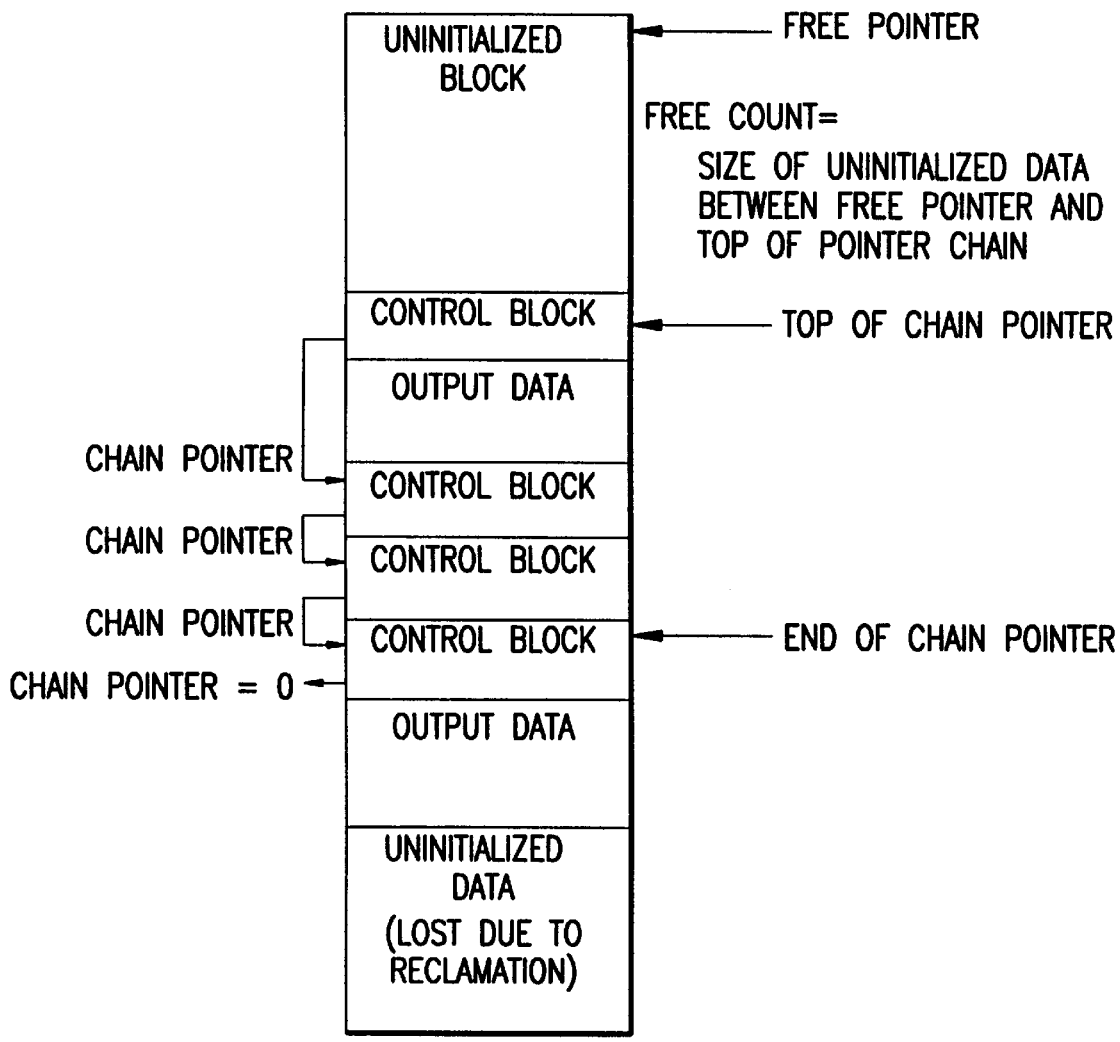
FIG. 13 shows the FIG. 10 output chain after entries have been reclaimed.

FIG. 13 illustrates the output chain 176 immediately after entries have been reclaimed from it through the procedure outlined in FIG. 12. When the data filter processor and the screen clipping processor of FIG. 11 allocate memory from the output chain, they must check for free memory as they process. If sufficient free memory is unavailable due to writing the last word in the output chain, the control block must be modified to transfer the existing portion of the request, memory must be reclaimed from the output chain, and a new control block must be allocated at the beginning address of the output chain. If sufficient free memory is unavailable due to writing the word immediately preceding the top of chain pointer, memory must be reclaimed from the output chain before continuing, but a new control block is not required. If memory cannot be reclaimed from the output chain, the output manager loops until enough transfers have completed to satisfy the allocation request.

Figure 14:
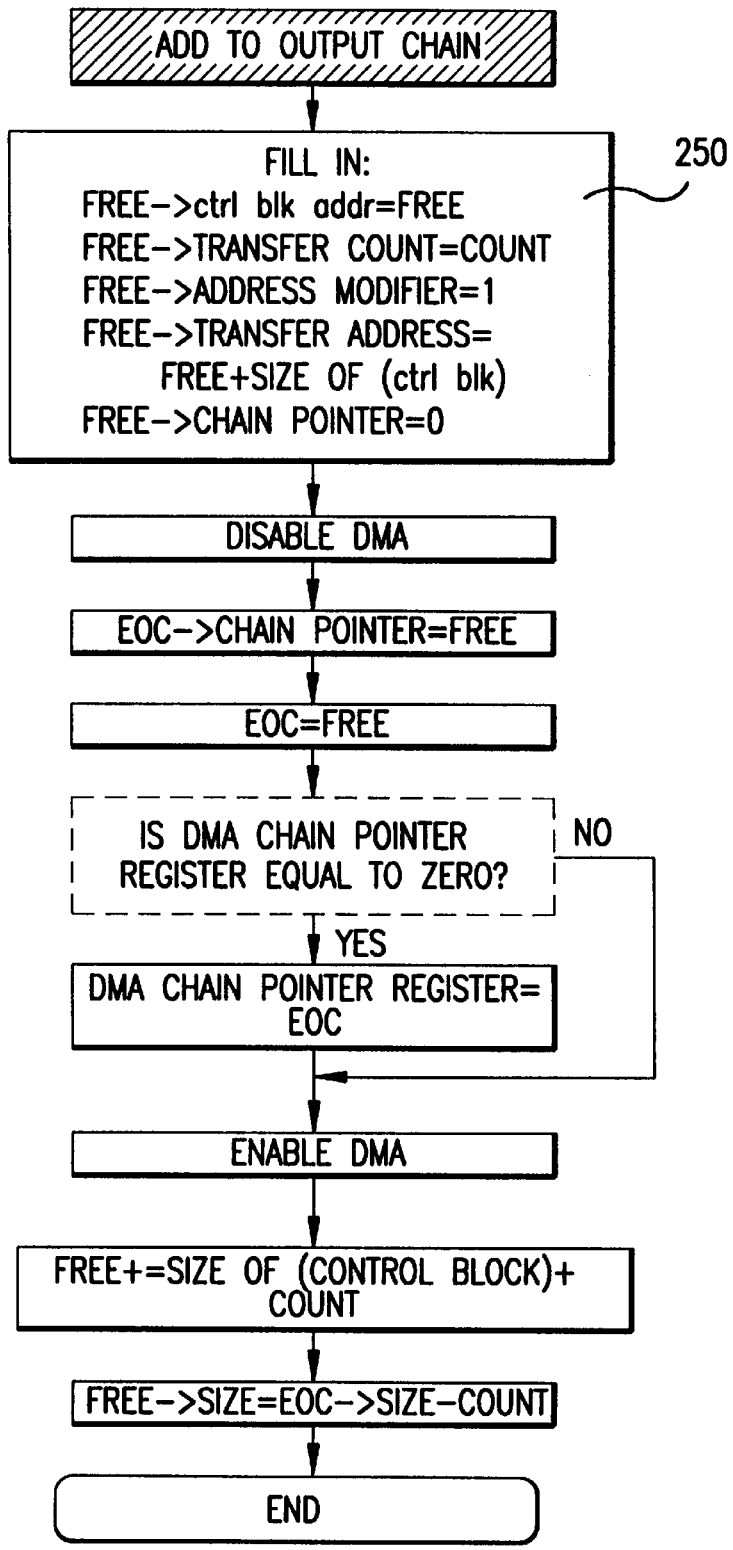
FIG. 14 is a flow-chart showing how to add entries to the output chain of FIG. 10.

FIG. 14 shows the control flow for adding an entry to the output chain. One parameter to this function is the transfer count 250, in words, to transfer to the sequencer. Note that in a preferred embodiment, only the last allocated entry may be added to the output chain.

Figure 15:
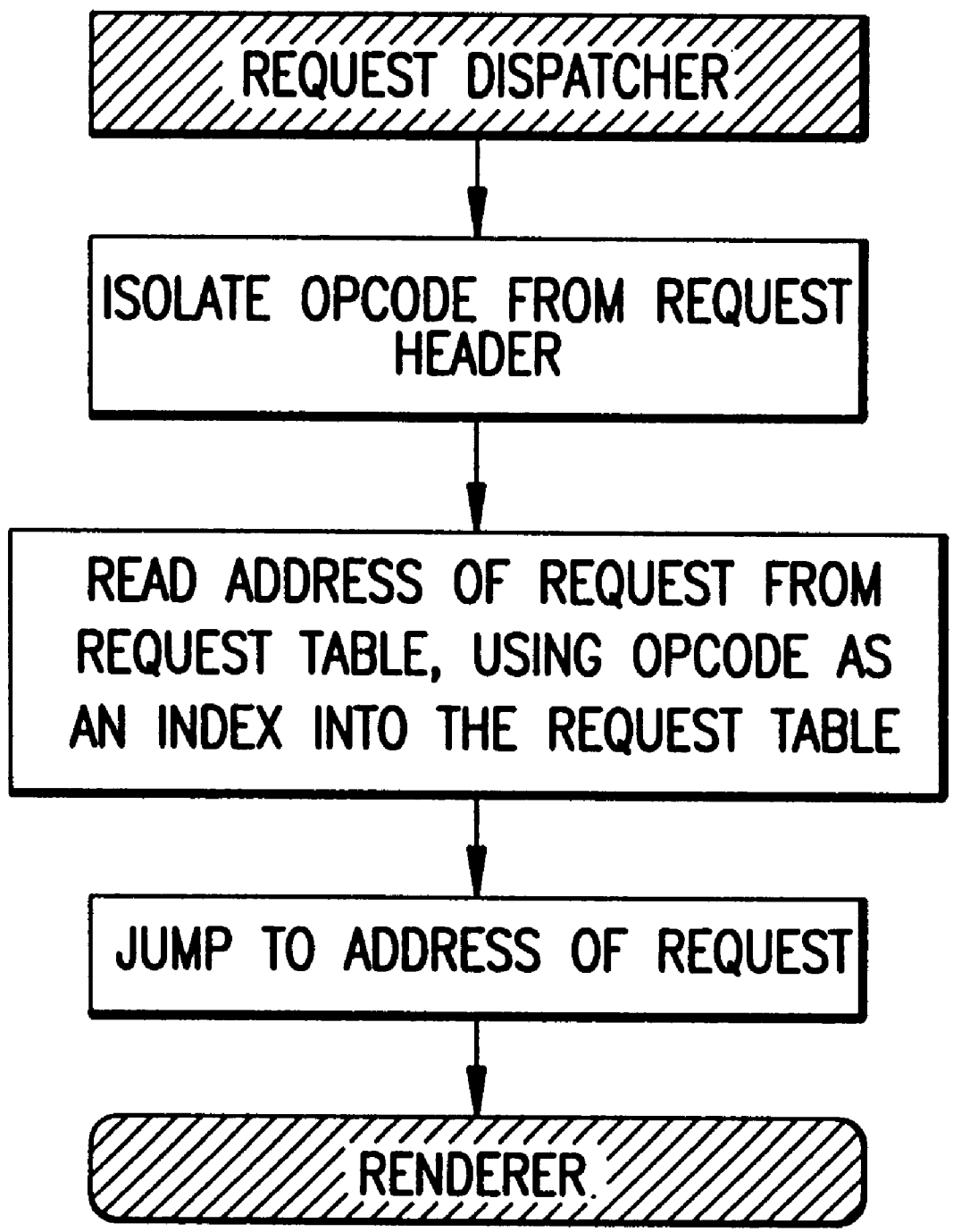
FIG. 15 is a flow-chart of the request dispatcher portion of the FIG. 3 executive function.

FIG. 15 shows the control flow for the request dispatcher, the second executive functional entity. This function interprets the request header of the graphics request being processed and dispatches the renderer 170 to the appropriate memory address containing graphics data to be rendered.

Figure 16:
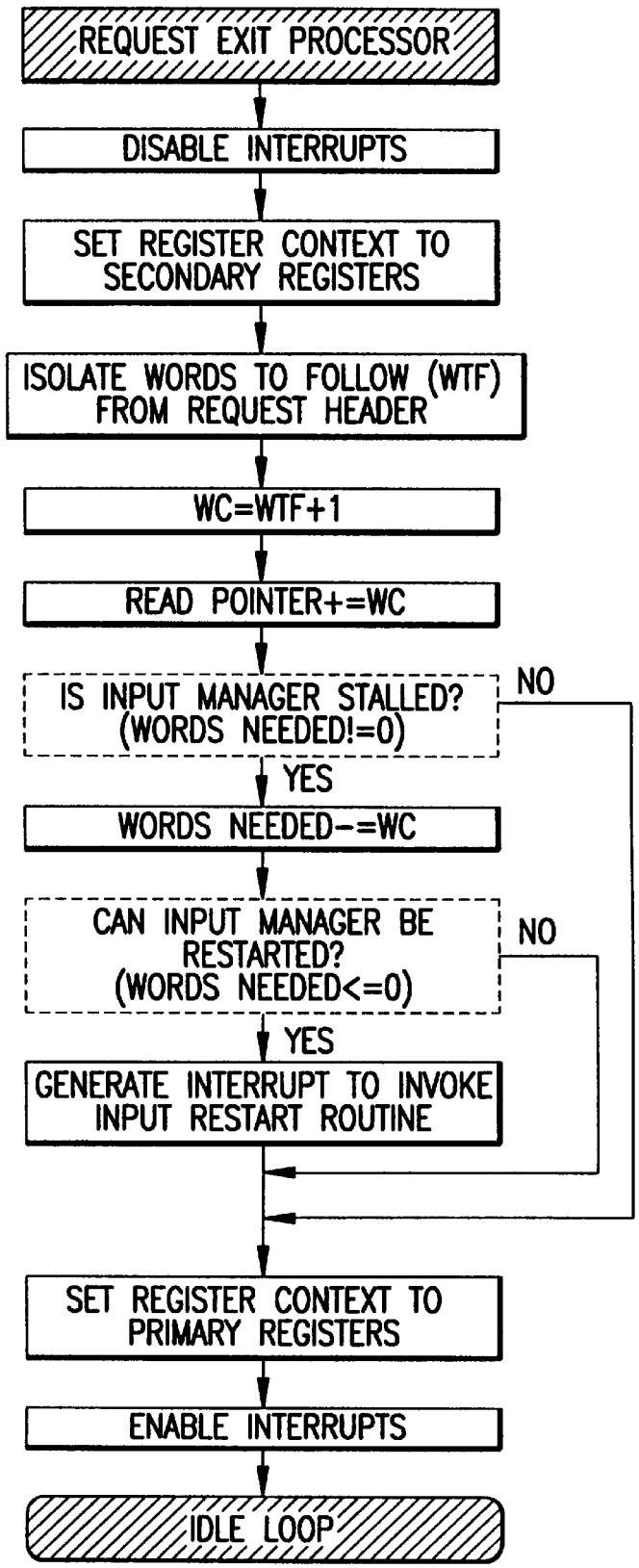
FIG. 16 is a flow-chart of the request exit portion of the FIG. 3 executive function.

FIG. 16 details the control flow for the Request Exit Processor, the third executive functional entity. This function is invoked when the renderer 170 has completed processing a request. The executive 168 then adjusts a pointer for the input queue, and restarts the input manager 150 if the input manager is waiting for room in the input queue and enough memory is now available. During operation, the request exit process invokes the DmaCompleteFifoEmpty (see also FIG. 5) and RestartInputFromMailbox (see also FIG. 8) ISRs when enough words have been read from the input queue to allow the input manager to transfer the next request from the input FIFO into the input queue.

Output Manager

Continuing with FIG. 3, shown as item 172 is the Output Manager. The output manager manages memory in the output heap 174, and starts or restarts the input manager 150 when data is placed in the output chain 176. In a preferred embodiment, the output manager 172 comprises several functional entities.

The first output manager functional entity is Allocate Memory in Output Heap. This function is invoked by the renderer 170. The function allocates memory in the output heap 174, attempts to reclaim entries from the output chain 176 when there is not enough memory in the output heap 174, and stalls if there is not enough memory in the output heap 174 and none can be reclaimed from the output chain 176. FIGS. 17 through 21 detail the output heap management for preferred embodiments. Note that, as indicated hereinabove, the static sizes of buffers may be avoided by using dynamically resizable buffers limited only by available memory, thus avoiding having to stall.

Figure 17:
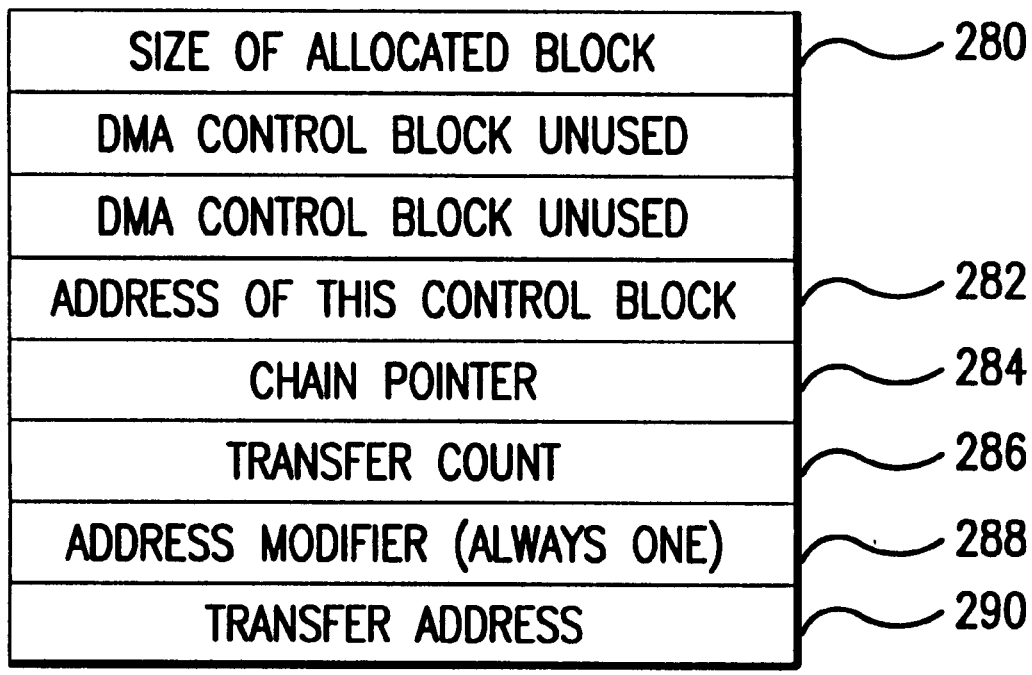
FIG. 17 shows the contents of a header block used by the FIG. 3 output heap and output chain.

FIG. 17 shows an Output Header, which is a control block beginning each entry in the Output Heap 174 and Output Chain 176. The output chain is an area of memory used to store output requests until they are transferred to the sequencer DSP. Memory for the output chain is allocated from the output heap. The output heap is a list of entries consisting of a control block followed by output data. These entries are divided into three categories: (a) many allocated entries that have been put on the output chain; (b) a single allocated entry being written to by the renderer, but not yet on the output chain; or (c) a single entry representing free memory. Due to sequential nature of allocation and deallocation, only one contiguous free area is required.

The control block contains the following entries: Size of Allocated Block 280. This entry specifies the size, in words, of the output heap entry, including the size of the header. The size is only valid for the free block. Address of this Control Block 282. The address of the control block is loaded into the DMA General Purpose Register when the control block is loaded into the DMA controller. Therefore, the address of the control block for the data currently being transferred can be read from the DMA General Purpose Register at any time. Upon DMA completion, the DMA General Purpose Register will contain the address of the last control block processed. Chain Pointer 284. This entry specifies where to retrieve the next DMA control block. If it is null, the DMA controller will stop after processing the transfer. The chain pointer points to the address of the Transfer Address entry of the next control block in the chain. Transfer Count 286. This entry specifies the number of words to transfer. Address Modifier 288. This entry specifies the amount to add to the address after each transfer. In a preferred embodiment it will always be one. Transfer Address 290. This entry specifies the starting address of the transfer. This address will always be the address immediately following the control block.

The pointers used to manage the output heap and output chains of preferred embodiments are summarized as follows. A top of chain pointer points to the first entry to be transferred from the output chain. An end of chain pointer points to the last entry to be transferred from the output chain. The chain pointer of the last block is null. A free pointer points to the first free control block. In a preferred embodiment, some restrictions are imposed on the renderer by the output manager. The renderer may only allocate one entry at a time. This entry must be placed on the output chain before another entry may be allocated. The renderer cannot ask the output manager to allocate more memory than exists in the heap minus the size of two control blocks. Initially, the output heap contains a dummy control block and a single entry representing free memory.

Figure 18:
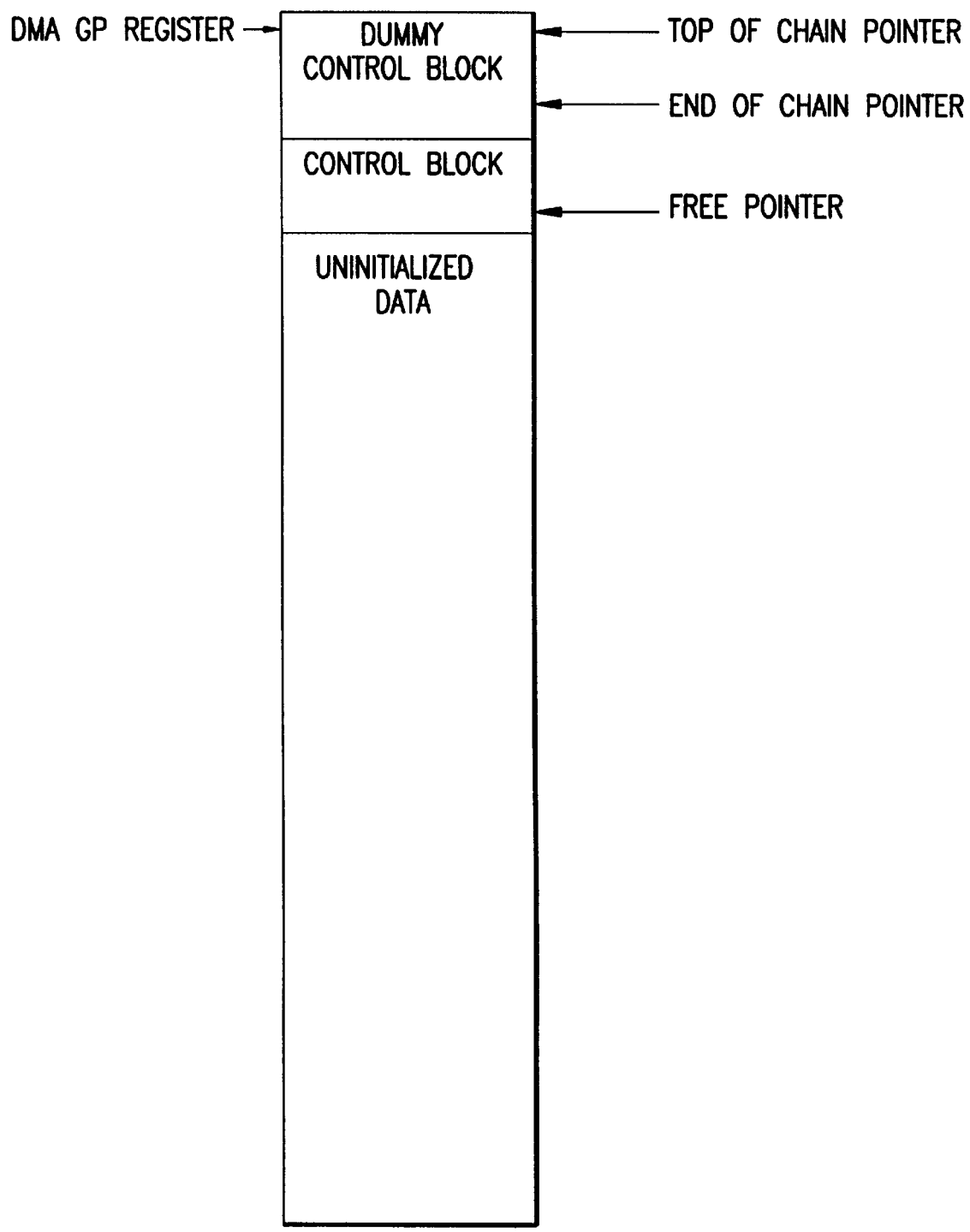
FIG. 18 shows the initial condition of the FIG. 3 output chain.

FIG. 18 illustrates the initial condition, in a preferred embodiment, of the output chain.

Figure 19:
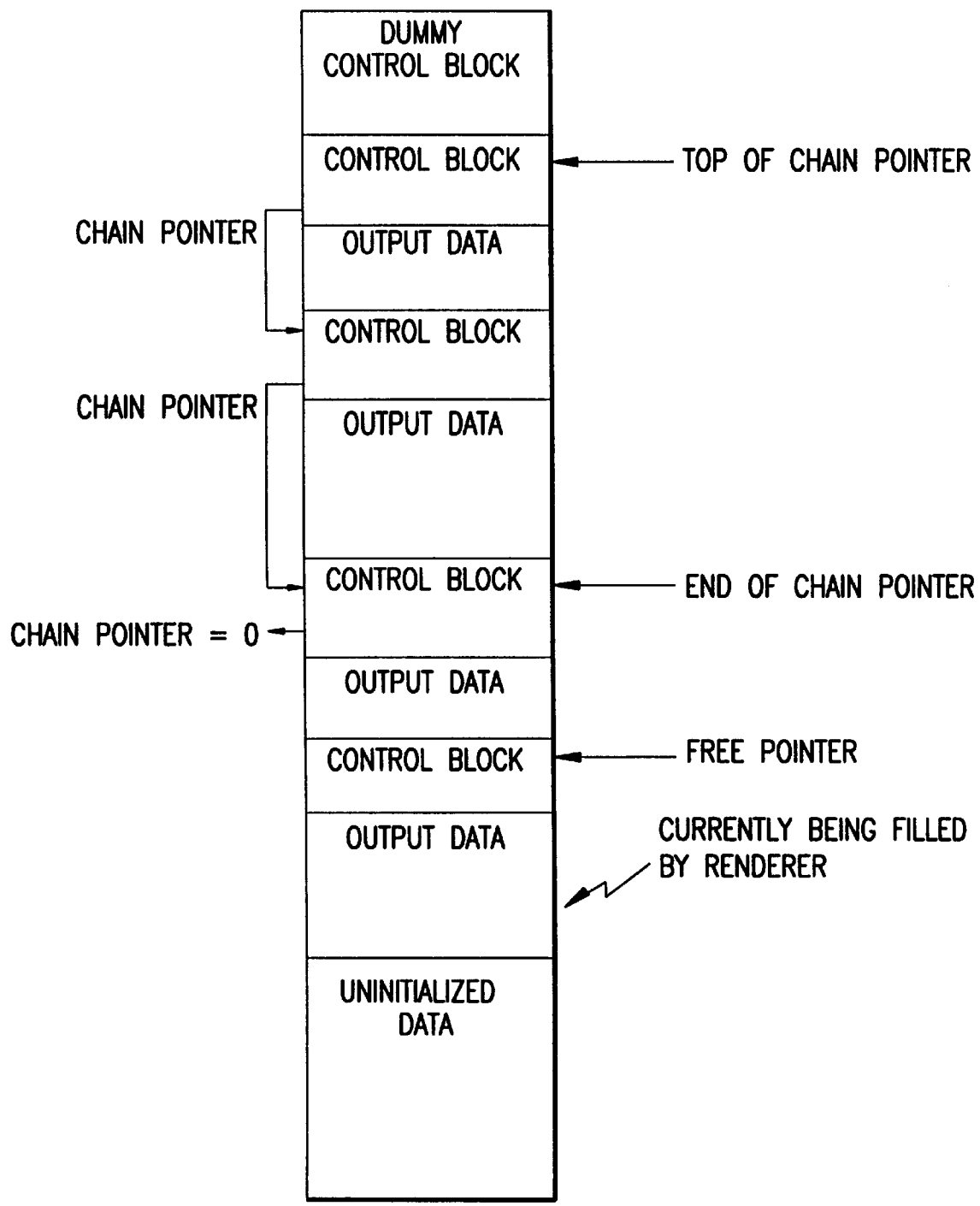
FIG. 19 shows the output heap and output chain after entries have been allocated from the heap and placed upon the chain.

FIG. 19 illustrates the output heap and output chain after entries have been allocated from the heap and placed on the chain. As entries are added to the output chain, a direct memory access is transferring them to the sequencer (item 112 of FIG. 1). When there is insufficient free space on the output heap, entries that have been transferred are reclaimed from the top of the output chain. In order to maintain a single contiguous free area, the free area at the bottom of the heap is lost after reclaiming entries at the top of the chain. Note that this does not affect the transfer of the last entry in the chain.

Figure 20:
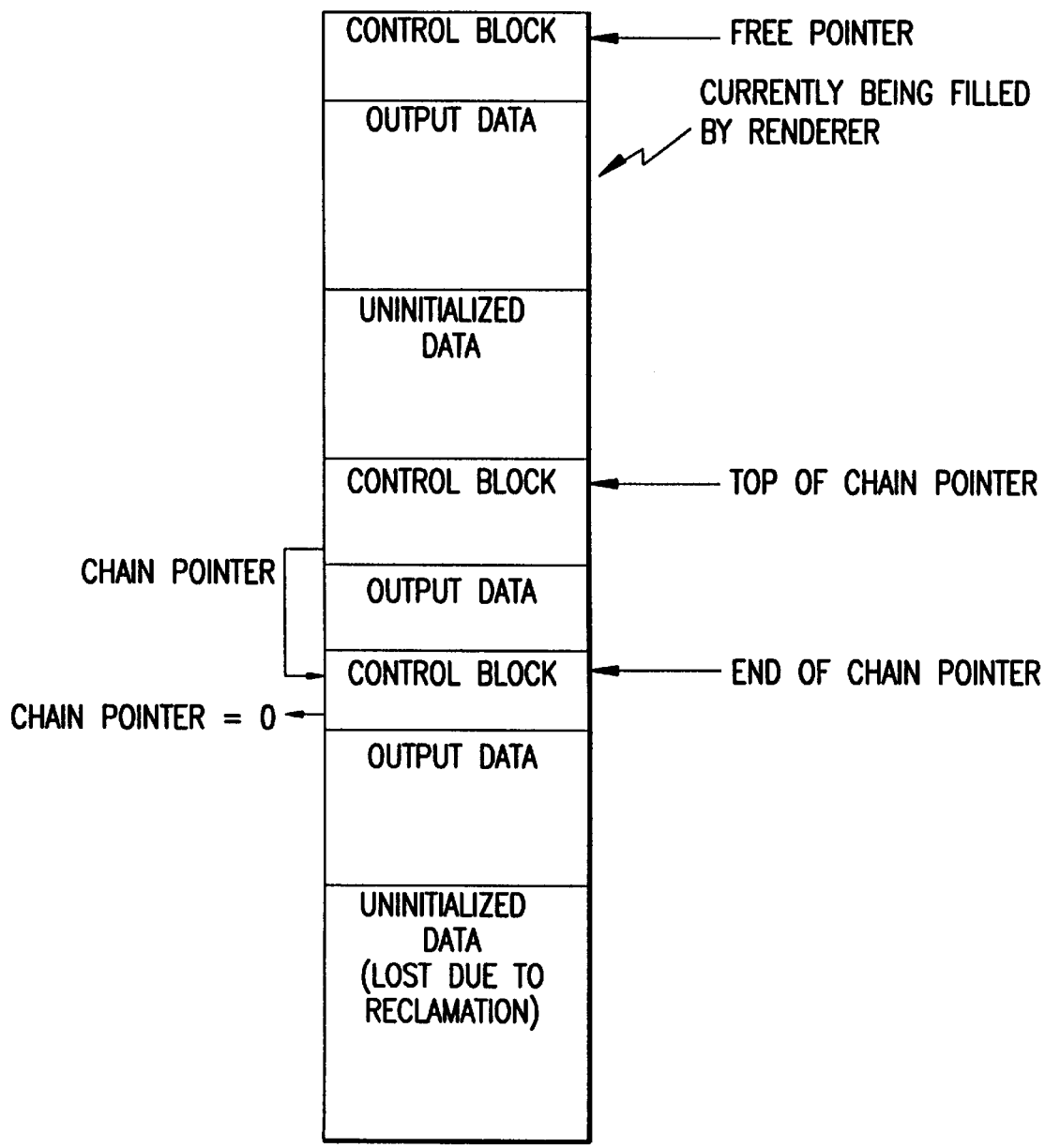
FIG. 20 shows the output heap and output chain after entries have been reclaimed from the chain and placed upon the heap.

FIG. 20 illustrates the output heap and output chain immediately after entries have been reclaimed from the chain and placed on the heap. In a preferred embodiment, if the output manager cannot satisfy the renderer's allocation request, it stalls until the direct memory access has transferred enough entries to be reclaimed from the output chain.

Figure 21:
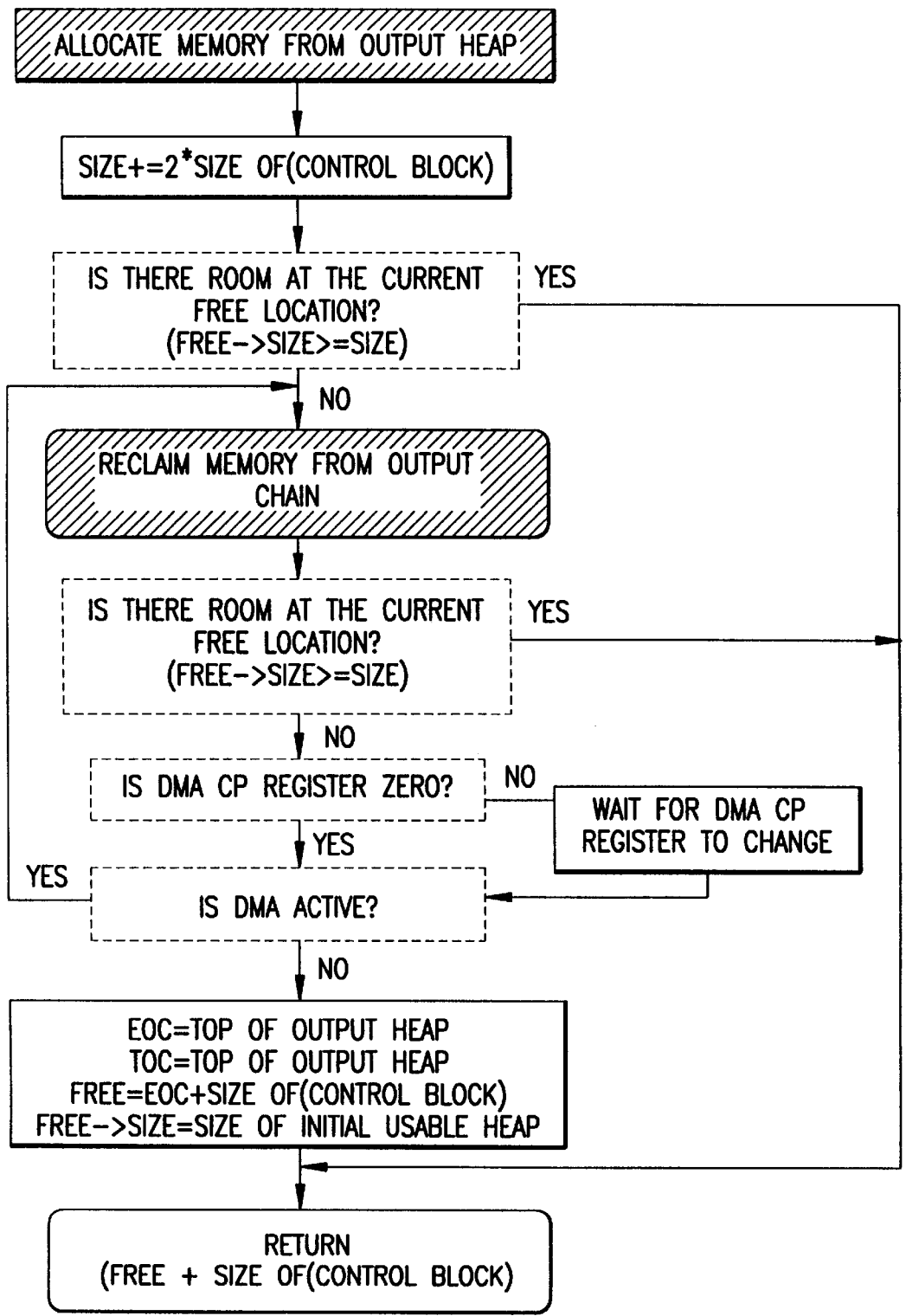
FIG. 21 is a flow-chart showing allocating memory from the output heap and reclaiming memory from the output chain.

FIG. 21 shows the control flow for allocating memory from the output heap 174 and reclaiming memory from the output chain 176. In a preferred embodiment, the output manager stalls if memory cannot be allocated.

The second output manager 172 functional entity is Reclaim Memory in Output Heap. This function is invoked by output manager 172 to find entries in the output chain 176 that have been transferred through the output port 178 to the sequencer processor 112 of FIG. 1, and adds them to the free area of the output heap 174. The methodology of reclaiming memory, in a preferred embodiment, is similar to and the inverse of allocating memory.

The third output manager functional entity is Free Memory in Output Heap. This function is invoked by the renderer 170 (discussed hereinbelow) to free memory in the output heap.

The fourth output manager functional entity is Add Entry to Output Chain. This function is invoked by the renderer 170 to add an entry to the output chain 176. (This function also starts the output direct memory access if it is not already running.)

Renderer

Continuing with FIG. 3, shown as item 170 is the Renderer. In a preferred embodiment, the renderer processes requests from the input queue 160. For preferred embodiments, i.e. the invention is accelerating OpenGL requests, the renderer 170 typically accepts vertices in object coordinates and performs all processing to produce vertices in window coordinates. Such OpenGL requests include points, line strips and separate line segments, triangle strips, triangle fans, and separate triangles, quadrilateral strips and separate quadrilaterals, polygons, and rendering context state information.

Preferred embodiments also provide for processing several special requests.

The first special request is Reset Input Queue Read Pointer. This request is placed in the input queue 160 by the input manager 150 when sufficient room is not available to place requests at the bottom of the input queue 160.

The second special request is Place Null Requests in the output chain 176. This request is placed in the input queue 160 by the input manager 150 when the input FIFO ownership token is passed to the next request processor without transferring a request from the input FIFO. This is necessary to ensure that the processors do not get out of synch with each other. For every graphics request received over the request bus 108, each request processor must in-turn act, even if such action is to indicate a skipping of processing by placing a Null Request in the output chain 176.

The third special request is Pass Request to Rendering Hardware. This request is placed in the input queue 160 by the input manager 150 when the host 180 sends a pass-through request (discussed hereinabove for FIG. 6) to send commands directly to the graphics rendering device (i.e. a graphics request was received that is only to be processed by the graphics rendering being accelerated; such requests may be configuration information for the accelerated device, or it may represent graphics commands unsupported by the present invention). In a preferred embodiment, pass-through requests contain state information used by the graphics rendering device, such as blend functions, depth buffer functions, etc.

Debugger

Also shown in FIG. 3 is the Debug Monitor 182. In a preferred embodiment, errors cause the debug monitor to be invoked. If the debugger is currently running with breakpoints set, the debug monitor 182 saves the processor state and indicates to the debugger that a breakpoint has been reached. The debugger will display the processor state for the instruction at which the error was detected. If the debugger is not running or is disconnected (remote debugging), the debug monitor saves the processor state and waits for the debugger to connect. Upon connection, the debugger will display the processor state for the instruction at which the error was detected. Presently, preferred embodiments only detect bad request headers, and preferably the debug monitor is a small interrupt-driven procedure that saves and restores processor state and catches breakpoints. The two functional modules that preferred embodiments define of are the interrupt routine and the breakpoint catcher.

In a preferred embodiment, the flow of control for the debug interrupt routine is as follows: save processor state; clear and disable instruction cache; signal to host (via flag pin) that DSP is in idle state; wait for signal (via DSP memory) to continue; restore processor state; and return from interrupt. While the debug monitor is waiting to continue, the host (debugger) may read and write DSP memory. The location of the saved processor state is known to the host and may be used to read or write core registers. Preferred embodiments provide a single-stepping mode that is achieved by setting a bit in the interrupt latch to trigger the debug monitor interrupt routine, restoring processor state, and returning from the interrupt. A single instruction will execute before the debug monitor is reentered.

The debugger 182 sets breakpoints by replacing the instruction at the desired location with an instruction to call the debug catcher. The flow of control for the breakpoint catcher is as follows:

Save processor state; clear and disable instruction cache; signal to host that the digital signal processor is in idle state; wait for signal (via data stored in a digital signal processor memory) to continue; restore processor state; and return from subroutine.

Sequencer

Figure 22:
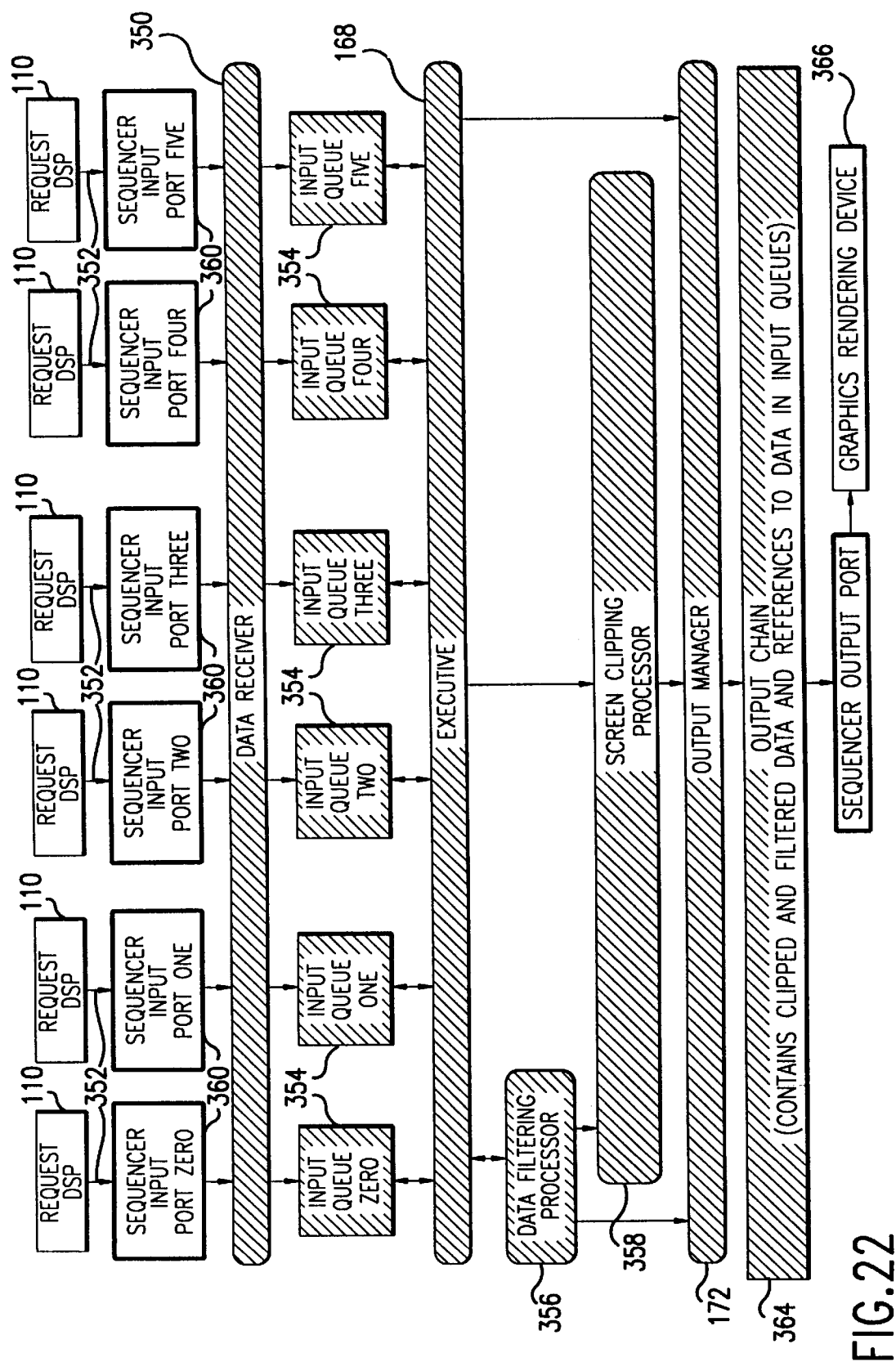
FIG. 22 shows in detail the sequencer of FIG. 1.

FIG. 22 shows a detailed layout of the structure of the sequencer (shown as item 112 in FIG. 1). In operation, a data receiver 350 collects output requests 352 from the request processors 110 and places it in the sequencer input queues 354 (these queues correspond to the single queue 160 of FIG. 3). As requests 352 are transferred to the input queues 354, the executive 168 (discussed hereinabove) performs one of the following tasks. If data filtering and screen clipping processors are not required, the executive invokes the output manager 172 to place a control block in the output chain 176 to transfer data from the input queue 160 to the rendering hardware 170. If data filtering is required, the executive invokes the data filter processor 356 to perform data integrity checks. If screen clipping is required, the executive invokes the screen clipping processor 358 to perform screen clipping.

During initialization of the invention, an input queue is allocated for each request processor. In one preferred embodiment, each input queue is managed by the following state variables. Write Pointers: the write pointers indicate the next location to be written in each input queue. They are maintained automatically in the direct memory access transfer address register for each channel. Read Pointers: the read pointers indicate the next location to be read by the executive in each input queue. They are maintained by the executive 168. Write Word Counts: the write word counts specify the number of words that may be written by the data receiver for each input queue. Write word counts is decreased by the transfer count each time a new direct memory access transfer is initiated by the data receiver 350. As data is transferred to the rendering hardware, the output manager increments the write word count by the appropriate amount for each request packet that has been completely processed.

Also during initialization of the invention, the executive 168 reads the sequencer configuration request directly from link buffer zero. As used in the specification and in the claims that follow, a link bus is the term used by digital signal processor vendors to refer to the multiple buses used to connect the request digital signal processors with the sequencer digital signal processor, and the port used to send and receive data over these busses are called link ports, each of which has an associated link buffer to hold data. The sequencer configuration request includes the screen height and width and the number of request digital signal processors. The executive allocates memory for the output chain 176, for input queues 160 (recall that FIG. 3 depicts a single request direct memory access processor), and for local storage and scratch memory. The executive then begins a direct memory access from each link buffer to completely fill the corresponding input queue and waits for a complete request packet to become available in the first input queue.

In a preferred embodiment, the Data Receiver 350 is an interrupt-driven program module that transfers data from the sequencer input ports 360 to the input queues 354. During initialization of the invention, the executive 168 begins direct memory accesses to fill all of the input queues 354. The data receiver should be implemented with a direct memory access completion ISR, as well as with a restart routine. (The detailed control flow diagrams for these routines are respectively shown hereinbelow as FIGS. 53 and 54.)

Screen Configuration

In a preferred embodiment, the executive 168 (FIG. 22) may receive several state requests. Two such requests are Set Configuration and Set Destination Screen and Viewport. Set Configuration sends configuration information to the sequencer such as the screen size and whether the data filters should be enabled. Set Destination Screen and Viewport (a viewport represents a rectangular region in screen coordinates to which is mapped a graphic primitive) sends the destination screen and viewport to the sequencer. The destination screen is required for output steering on the graphics rendering device, and the viewport is required to determine if screen clipping is necessary.

The Data Filter Processor 356 provides, in a preferred embodiment, two data filters. The first is the Invalid Number Data Filter. The purpose of this filter is to remove invalid numbers from the data stream that the graphics rendering device would interpret as graphics request stream terminators. This filter directly modifies the contents of the input queue 354. And second is the Degenerate Textured Triangles Data Filter. The purpose of this filter is to isolate textured triangles that define zero area (no output) triangles. The reason is that a graphics rendering device 366 may need to have its internal graphics pipeline stalled prior to sending these types of triangles. In a preferred embodiment, stalling is accomplished by inserting a dummy register load before sending the degenerate triangles. If degenerate triangles are found, the filtered data is written into the output chain. The Data Filter Processor's 356 two functions are invoked for each sequencer request as specified by the sequencer configuration request.

Figure 23:
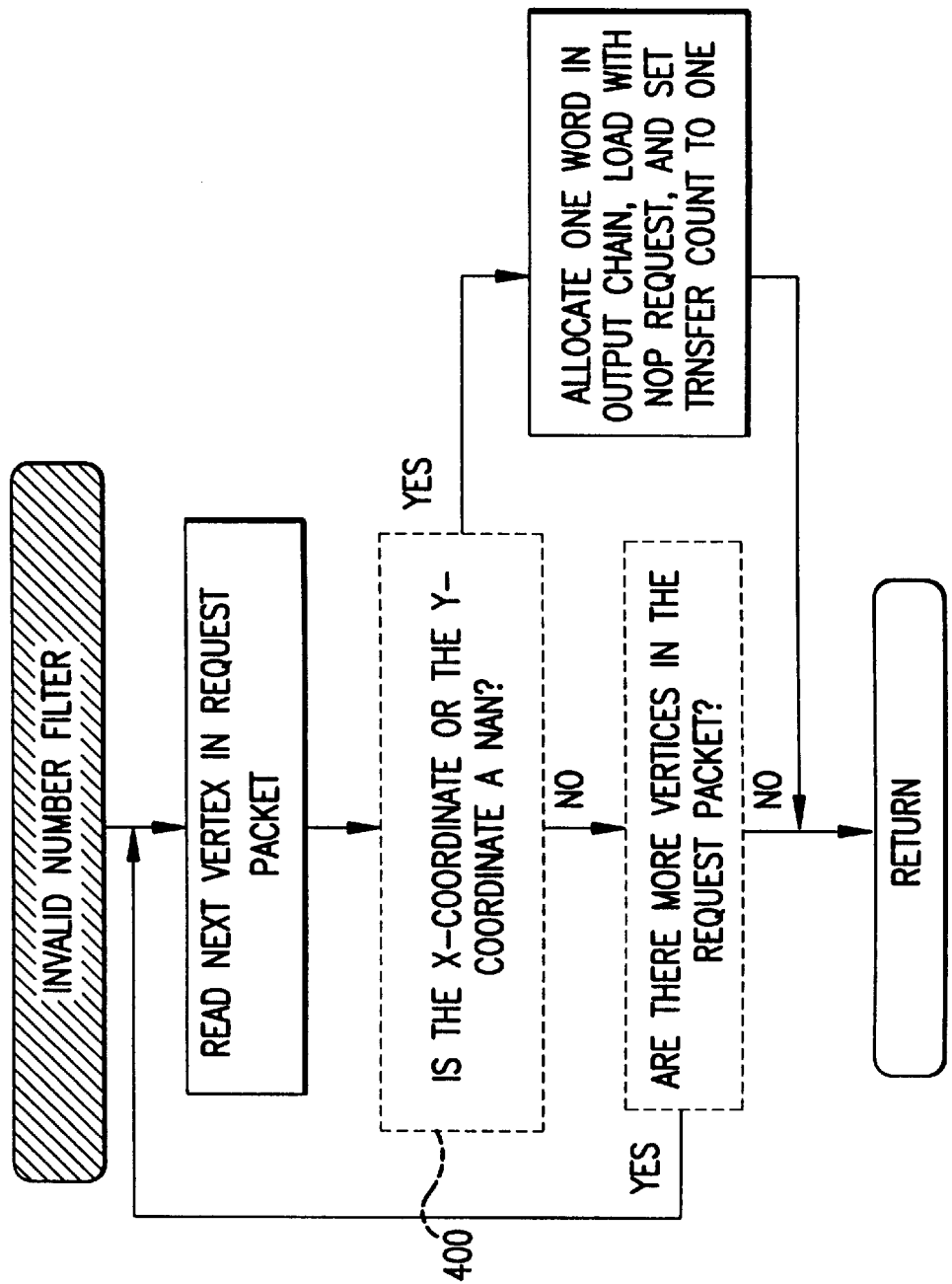
FIG. 23 is a flow-chart of the invalid number filter portion of the FIG. 22 data processing filter.

FIG. 23 depicts the detailed control flow for the invalid number filter, in which this function primarily checks at step 400 to determine whether any vertex values are NANs (not a number). Vertex values are stored, in a preferred embodiment, as floating point values in a memory location, and through inspection of the memory location containing the floating point value, it is possible to determine whether the value is a legitimate floating point value. That is, in addition to checking for a value range, floating point numbers have certain representation-level characteristics that indicate whether a valid floating point value is stored within the memory location. This filter searches for NANs in requests containing rendering primitives. If the X or Y coordinate is a NAN, it effectively removes the request by adding a request to the output chain which sends a single no-operation (NOP) request to the graphics rendering device.

Figure 24:
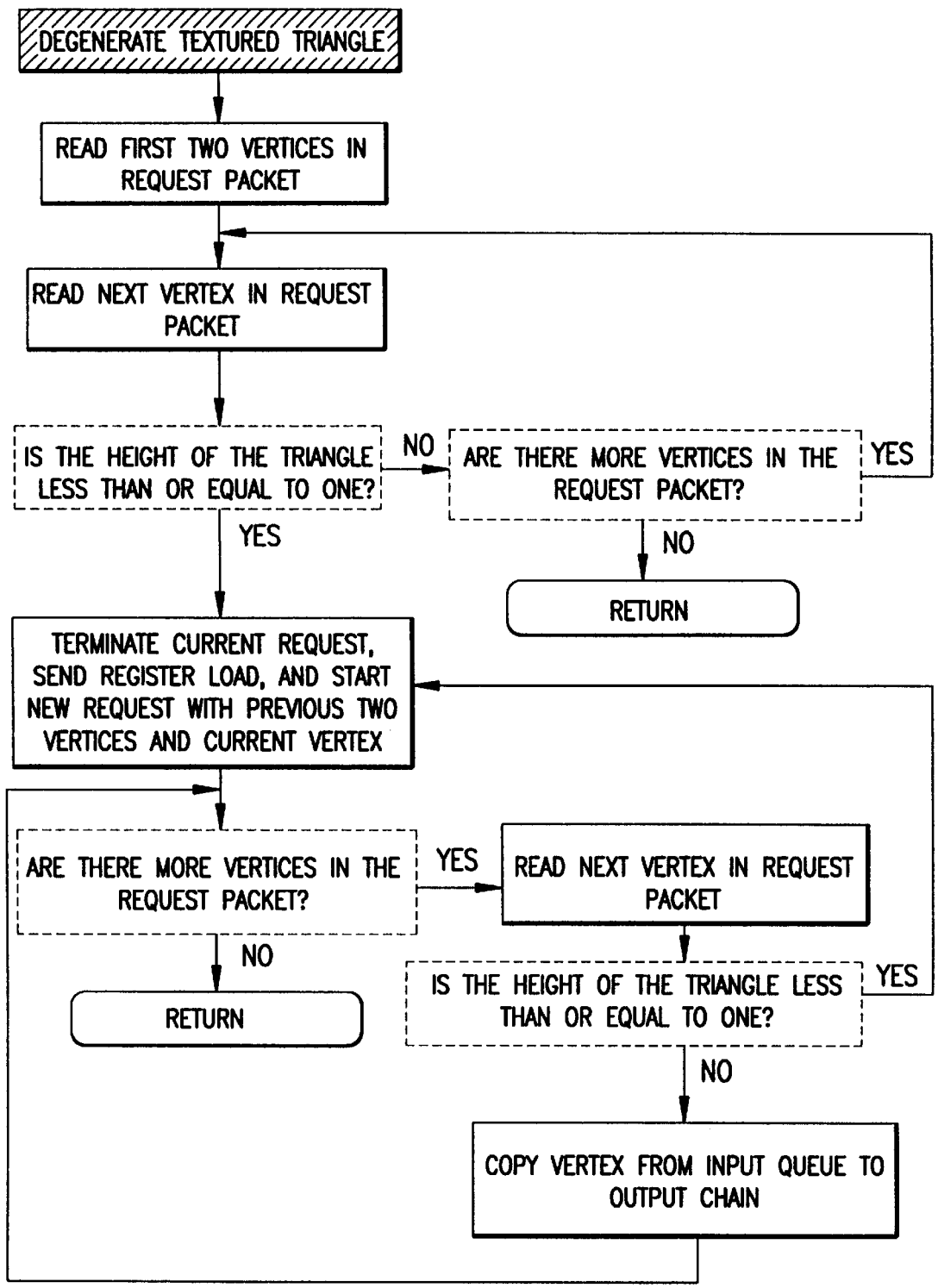
FIG. 24 is a flow-chart of the degenerate triangle portion of the FIG. 22 data processing filter.

FIG. 24 illustrates the control flow for the degenerate textured triangle filter, in which this function primarily looks for triangles having heights of less than or equal to one. This filter searches for requests containing textured triangles which will not produce any output (zero area), and preferably it isolates these degenerate triangles by terminating the request and starting a new request. The Degenerate Textured Triangle Filter also precedes the new request with a dummy register load. In a preferred embodiment, since this filter may change the size of a request, it always allocates memory in the output chain to write its output. Note that if no degenerate triangles were found, the input data is not copied. After the first degenerate triangle is found, all subsequent data in the request packet is copied even if it does not require filtering.

The Screen Clipping Processor 358 of FIG. 22 clips against the screen if the viewport is not wholly contained by the screen. If the input data must be clipped, this processor writes clipped data into the output chain 364 (which corresponds to chain 176 of FIG. 3). The screen clipping processor 358 reads data from the input queue 354, performs clipping, and writes the clipped data to the output chain 364. Screen clipping is performed based upon sequencer state information; however, in a preferred embodiment, screen clipping may be forced to be performed on a per-request basis by configuring the sequencer request header in a predetermined way, such as by setting a certain bit pattern. For example, screen clipping may be forced for certain cases of wide lines.

Output Chain and Output Heap

Figure 25:
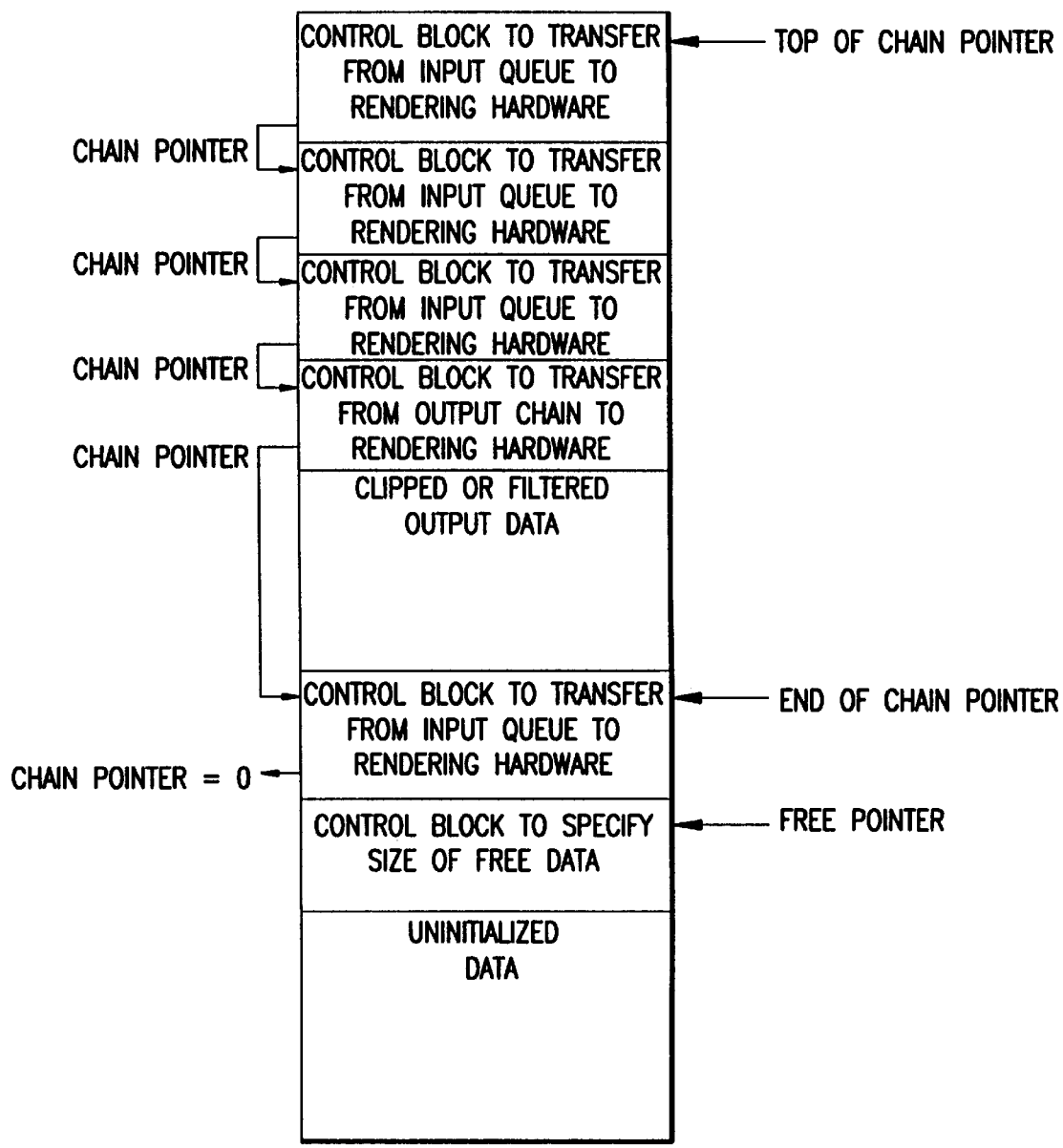
FIG. 25 shows the typical state of the FIG. 3 output chain.

FIG. 25 illustrates a typical state of the output chain. The output chain is an area of memory containing control blocks used by the direct memory transfer to transfer requests from the sequencer 112 shown in FIG. 1, to the rendering hardware device 366 shown in FIG. 22. If data filtering and screen clipping are not required, the control blocks specify transfers from the input queues 354 to the rendering hardware 366. If screen clipping or data filtering is required, which changes the size of the request, the control blocks specify transfers from the output chain to the rendering hardware. FIG. 11 described hereinabove depicts the executive idle loop control flow incorporating the filter, clipping, and degenerate triangle routines. Note for FIG. 11 that if both screen clipping and degenerate textured triangle filtering are required, in a preferred embodiment, the degenerate textured triangle filter is applied as each triangle is processed by the screen clipping processor.

FIG. 26 illustrates the format of each control block for the chain. The control block contains the following entries. Destination Transfer Count 400, which specifies the number of words to transfer. Destination Address Modifier 402, which specifies the amount to add to the destination address after each transfer. In a preferred embodiment, it will always be zero. Destination Transfer Address 404 which specifies the destination address of the transfer. This address will be the address of the output port to the rendering hardware. Address of this Control Block 406 which is the address of the control block loaded into the DMA General Purpose Register when the control block is loaded into the direct memory access controller. Therefore, the address of the control block for the data currently being transferred can be read from the DMA General Purpose Register at any time. Upon direct memory access completion, the DMA General Purpose Register will contain the address of the last control block processed. Chain Pointer 408 which specifies where to retrieve the next direct memory access control block. If this entry is null, the direct memory access controller will stop after processing the transfer. The chain pointer 408 points to the address of the Source Transfer Address 414 entry of the next control block in the chain. Source Transfer Count 410 which specifies the number of words to transfer. Source Address Modifier 412 which specifies the amount to add to the source address after each transfer. In a preferred embodiment, this value will always be one. Source Transfer Address 414 which specifies the starting source address of the transfer. This address will be either an address in the input queue or the address immediately following the control block. Write Word Count Adjustments 416 which specify the amount to add to the write word count for each input queue after the specified transfer has completed. When space is reclaimed in the output chain, the output manager uses these values to adjust the write word counts for all of the input queues, thus reclaiming space in the input queues.

The state variables used in a preferred embodiment to manage the output heap and output chain are summarized as follows: A top of chain pointer points to the first entry to be transferred from the output chain. A end of chain pointer points to the last entry to be transferred from the output chain. A chain pointer of the last block is null. A free pointer points to the first free word of memory. And a free count specifies the number of free words in the output chain. Initially, the output heap contains a dummy control block and a single entry representing free memory.

Output Manager

Continuing with FIG. 22, the Output Manager 172 performs several functions. The first is that the output manager allocates memory on the output chain 364. The output manager also adds control blocks to the output chain to transfer data from the input queues 354 or the output chain 364 to the rendering hardware 366. Further, as data is transferred to the rendering hardware, the output manager reclaims memory from the output chain 364.

Control Flow Perspective

Figure 27:
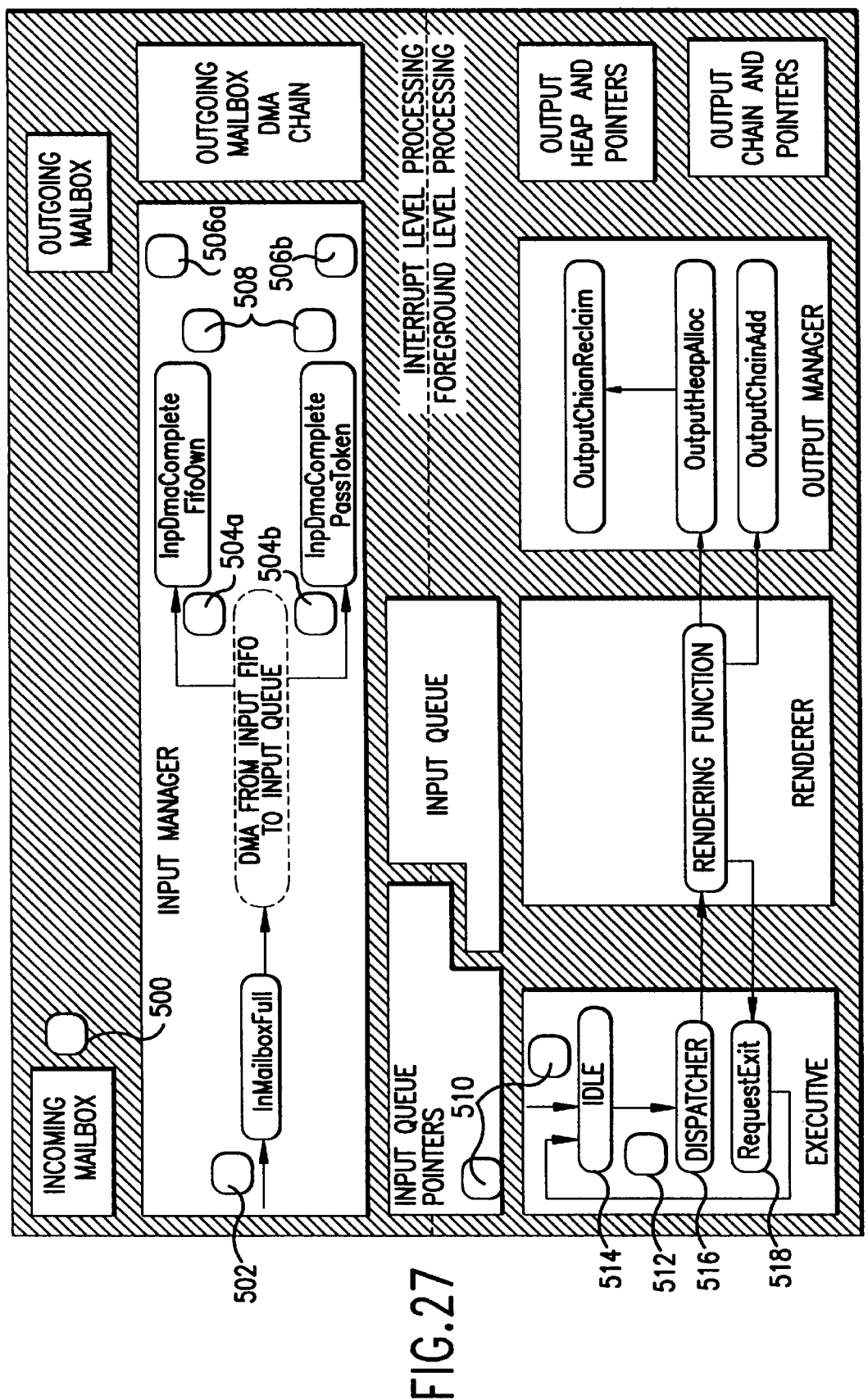
FIG. 27 is a data-flow diagram showing processing of a local request in the input FIFO.

FIG. 27 shows the interaction between the various modules of the invention from the perspective of data flow and control flow. The first data flow to consider is the input FIFO request processing for a Local Request within the Input FIFO, when a request processor receives the input FIFO ownership token and the input FIFO contains a local request. The flow of control for processing a local request in the input FIFO is as follows. At step 500, an input FIFO ownership token arrives in the incoming mailbox. At step 502 the InMailboxFull ISR is invoked, which reads the request header and determines the size of the request. At step 504, the InMailboxFull ISR initiates a direct memory access to transfer the request from the input FIFO to the input queue and then exits. For pass-through requests, only a portion of the request may be transferred. Note that foreground processing occurs while the direct memory access is running. At step 504, when the direct memory access completes, one of two input direct memory access completion ISRs (hereinafter input DMA completion ISR) is invoked. Step 504a is invoked if the previous token was not for a global request; in this situation the InpDmaCompleteFifoOwn ISR is invoked. In a preferred embodiment, this ISR is invoked when the direct memory access of a local request from the input FIFO has completed and the previous token passed to the next request processor was an input FIFO ownership token or a pass-through request token.

Figure 28:
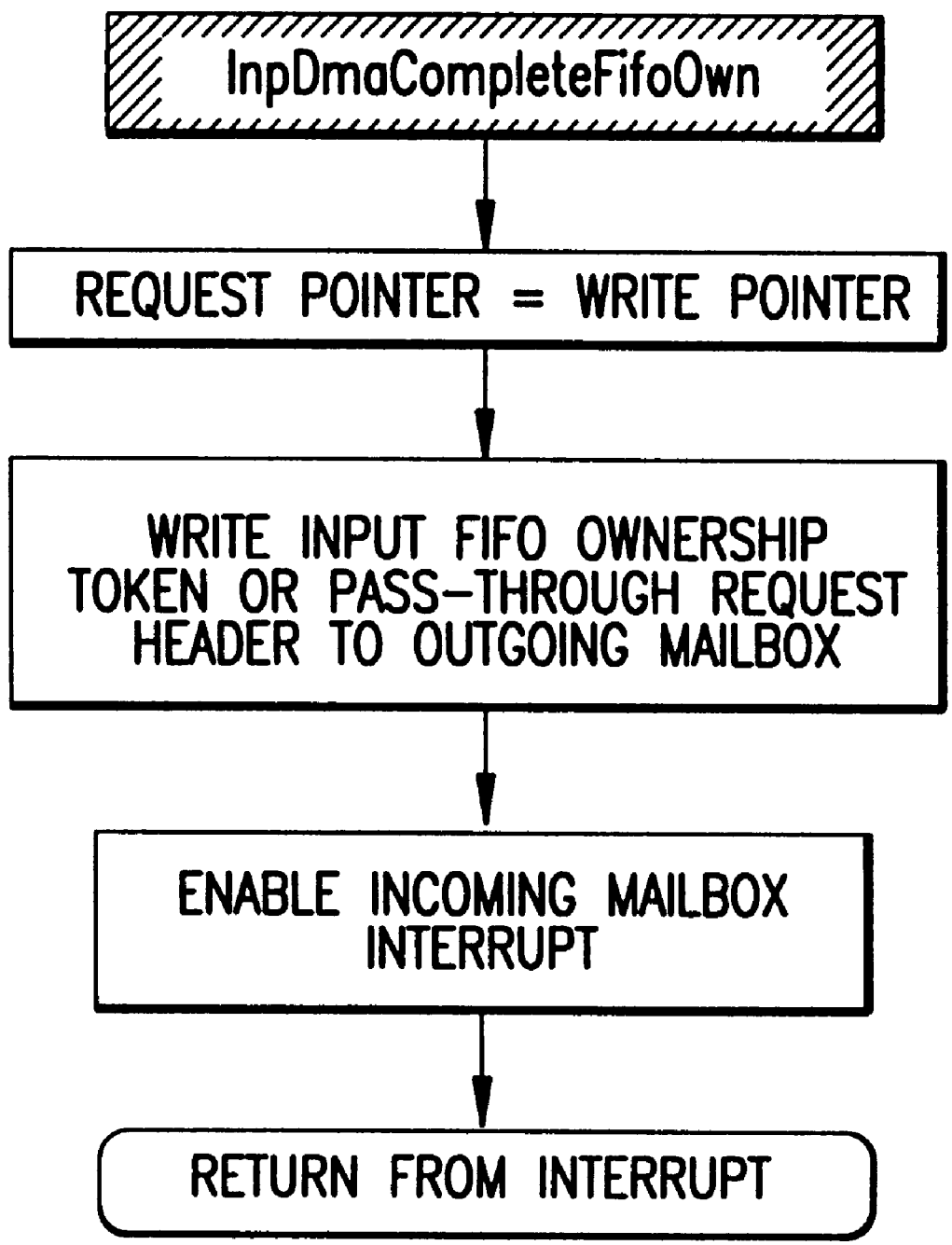
FIG. 28 is a flow-chart of the InpDmaCompleteFifoOwn ISR.

FIG. 28 shows the detailed control-flow for the InpDmaCompleteFifoOwn ISR referenced in FIG. 27. This ISR is invoked when the DMA of a local request from the input FIFO has completed and the previous token passed to the next request processor was an input FIFO ownership token or a pass-through request token. It passes the input FIFO ownership token or pass-through request token to the next request processor by writing it directly to the outgoing mailbox.

Continuing with FIG. 27, step 504b is invoked if the previous token was for a global request; in this situation the InpDmaCompletePassToken ISR is invoked.

Figure 29:
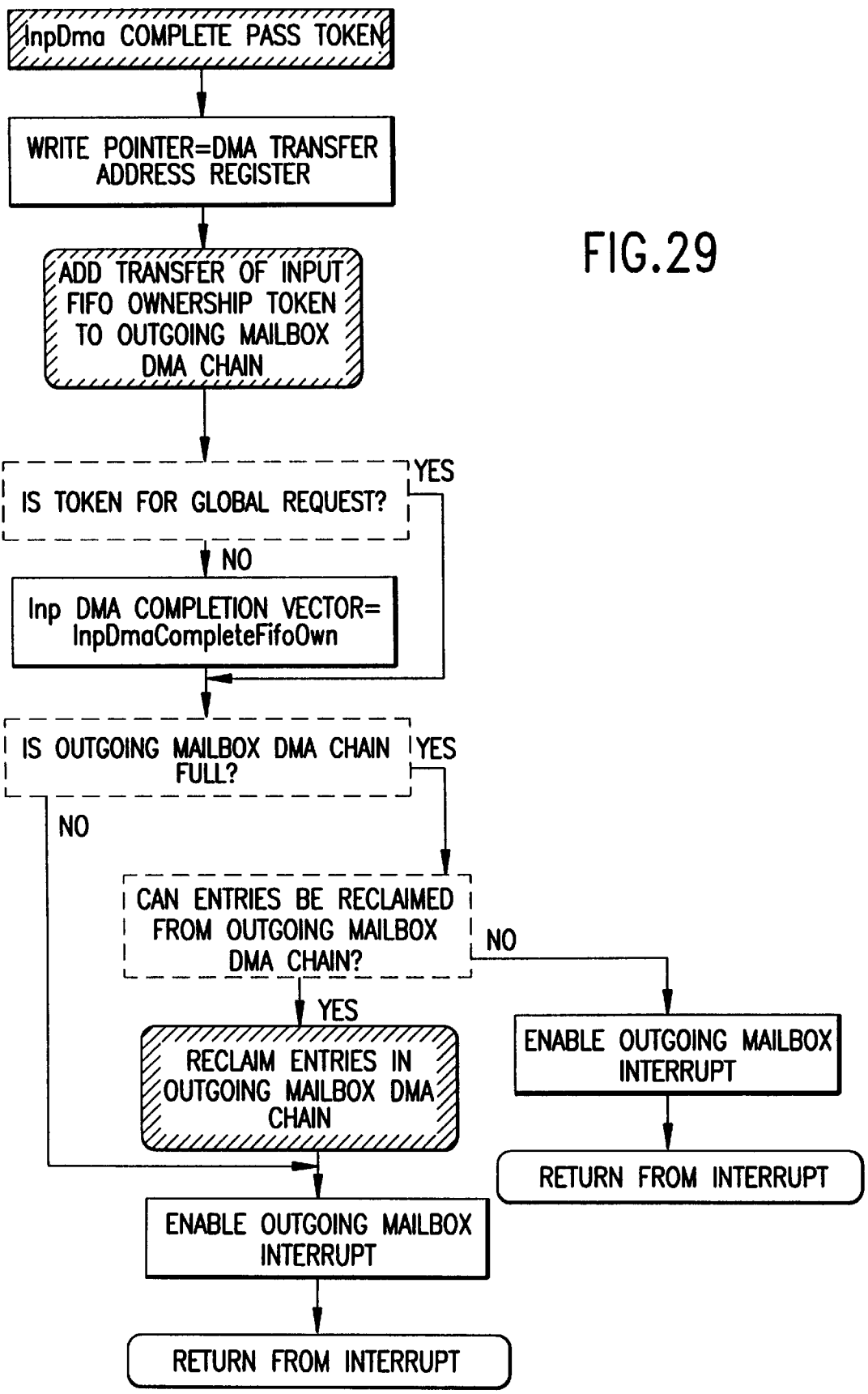
FIG. 29 is a flow-chart of the InpDmaCompletePassToken ISR.

FIG. 29 shows the detailed control-flow for the InpDmaCompletePassToken ISR referenced in FIG. 27. In a preferred embodiment, this ISR is invoked in one of the following situations: (a) upon completion of a direct memory access transfer of a local request from the input FIFO when the previous token passed to the next request processor was a global request (the present situation), or (b) upon completion of a direct memory access transfer of a global request from the incoming mailbox, if the next request processor is not the originator of the request. In each of these situations, the appropriate token is passed to the next request processor by placing a direct memory access control block on the outgoing mailbox direct memory access chain.

Continuing with FIG. 27, the input DMA completion ISR next passes the input FIFO ownership token to the next request processor via one of two methods. First, it may, at step 506a, write it directly to the outgoing mailbox. This is done if the previous token was not for a global request. Or, at step 506b, the input DMA completion ISR may place it in the outgoing mailbox direct memory access chain. This is done if the previous token was for a global request. Then, at step 508 the input DMA completion ISR exits and foreground processing is allowed to continue.

At step 510 the input queue request pointer is adjusted to include the request that has just been transferred in one of three ways: (a) if the input DMA completion ISR wrote the input FIFO ownership token directly to the outgoing mailbox, it adjusts the request pointer immediately; (b) in a relatively busy system, the input DMA completion ISR adjusts the input queue request pointer when it reclaims entries from the outgoing mailbox direct memory access chain; or (c) in a relatively idle system, the Idle loop adjusts the input queue request pointer when it reclaims entries from the outgoing mailbox DMA chain.

Outgoing Mailbox Memory Chain

Figure 30:
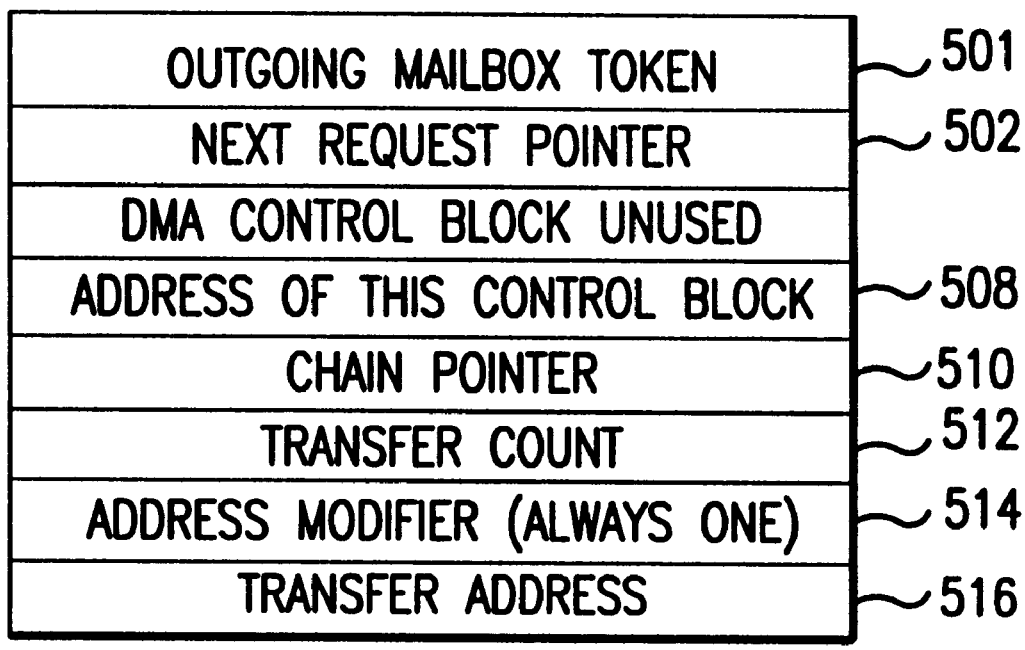
FIG. 30 shows the structure of a chain entry in the outgoing mailbox DMA chain.

FIG. 30 shows the detailed structure of a chain entry in the outgoing mailbox direct memory access chain. As used within this description, figures and claims that follow, references to TOC and EOC respectively refer to "top of chain pointer," and "end of chain pointer." Note that in a preferred embodiment, since all additions to the outgoing mailbox DMA chain occur at the interrupt level, no interrupts need to be disabled. Also note that the direct memory access is now started if it is not already running. The input management routines add requests to the outgoing mailbox direct memory access chain for the following cases: (a) the outgoing mailbox is full, and (b) more than one word must be transferred. Each entry in the outgoing mailbox direct memory access chain contains the following fields. Outgoing Mailbox Token 501. If a single-word mailbox token is being passed, this field contains the token. Next Request Pointer 502. This field contains the correct value for the input queue request pointer when the transfer is complete. Address of this Control Block 508. The address of the control block is loaded into the direct memory access General Purpose Register when the control block is loaded into the direct memory access controller. Therefore, the address of the control block for the data currently being transferred can be read from the direct memory access General Purpose Register at any time. Upon direct memory access completion, the direct memory access General Purpose Register will contain the address of the last control block processed. Chain Pointer 510. This field specifies where to pick up the next direct memory access control block. If it is null, the direct memory access controller will generate an interrupt upon completion of the transfer. Transfer Count 512. This field specifies the number of words to transfer. Address Modifier 514. This field specifies the amount to add to the address after each transfer. In a preferred embodiment, it will always be set to one. Transfer Address 516. This field specifies the starting address of the transfer. For single-word tokens, the address will be inside of the control block. For entire global requests, the address will be a location in the input queue.

Figure 31:
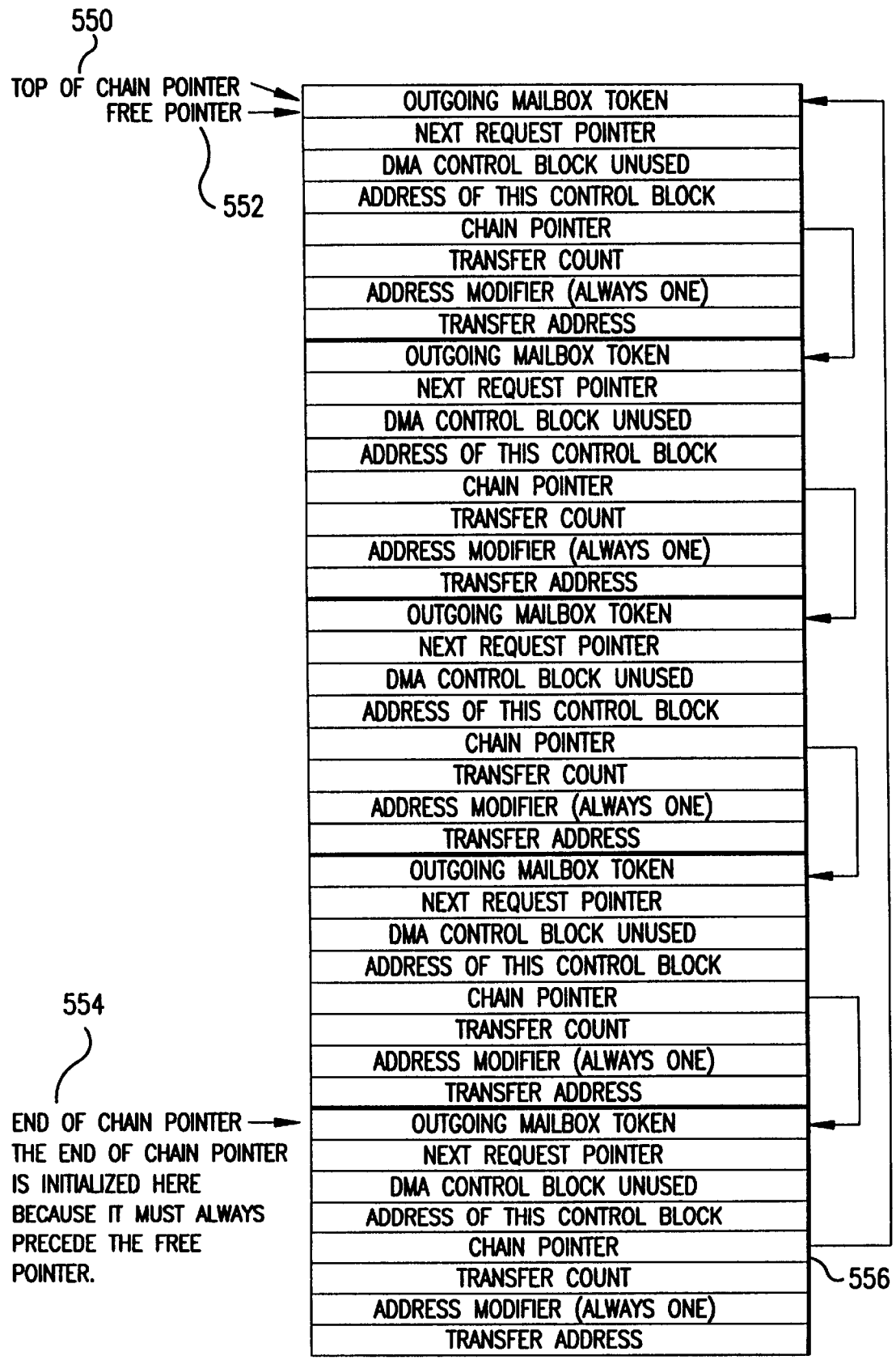
FIG. 31 shows the initial condition of the outgoing mailbox DMA chain.

FIG. 31 illustrates the initial condition of the outgoing mailbox direct memory access chain. The pointers used to manage the outgoing mailbox DMA chain are summarized as follows. The free pointer 550 points to the next free entry. The top of chain pointer 552 points to the first entry to be loaded into the DMA controller as a direct memory access control block. The end of chain pointer 554 points to the last entry to be loaded into the DMA controller as a direct memory access control block. The chain pointer 556 of the last block is null. In embodiments utilizing non-dynamically resizable (fixed-sized) buffers, if the free pointer 552 is equal to the top of chain pointer after adding an entry to the chain, then the chain is full. In a preferred embodiment, testing for a full chain always occurs after adding an entry to the chain. When the chain becomes full, the incoming mailbox interrupt is disabled and the outgoing mailbox DMA completion interrupt is enabled. The outgoing mailbox DMA completion ISR re-enables the incoming mailbox interrupt (see also hereinabove regarding the input manager 150 of FIG. 3).

Figure 32:
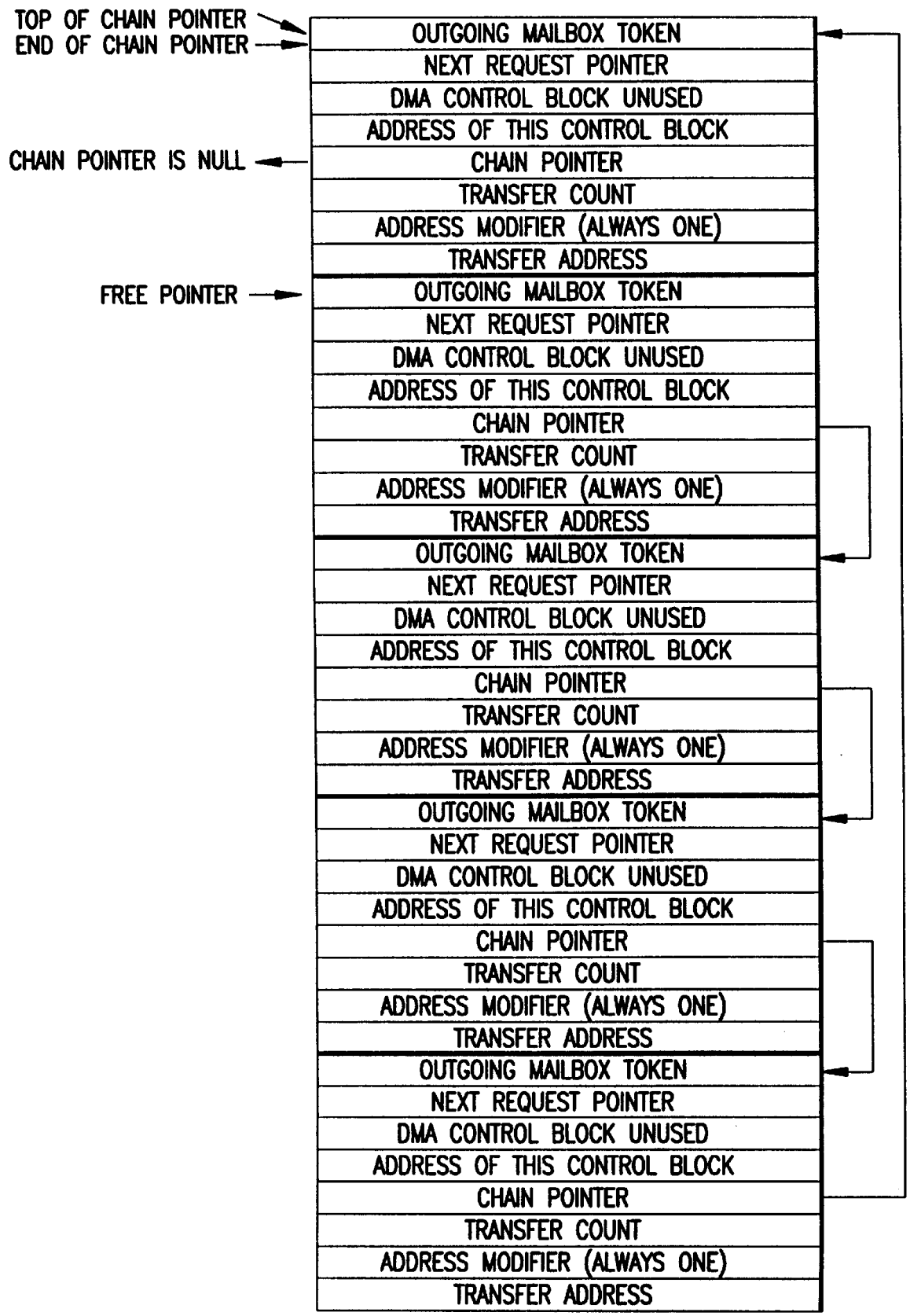
FIG. 32 shows the outgoing mailbox DMA chain after a single entry has been added.

FIG. 32 illustrates the state of the outgoing mailbox DMA chain after a single entry has been added.

Figure 33:
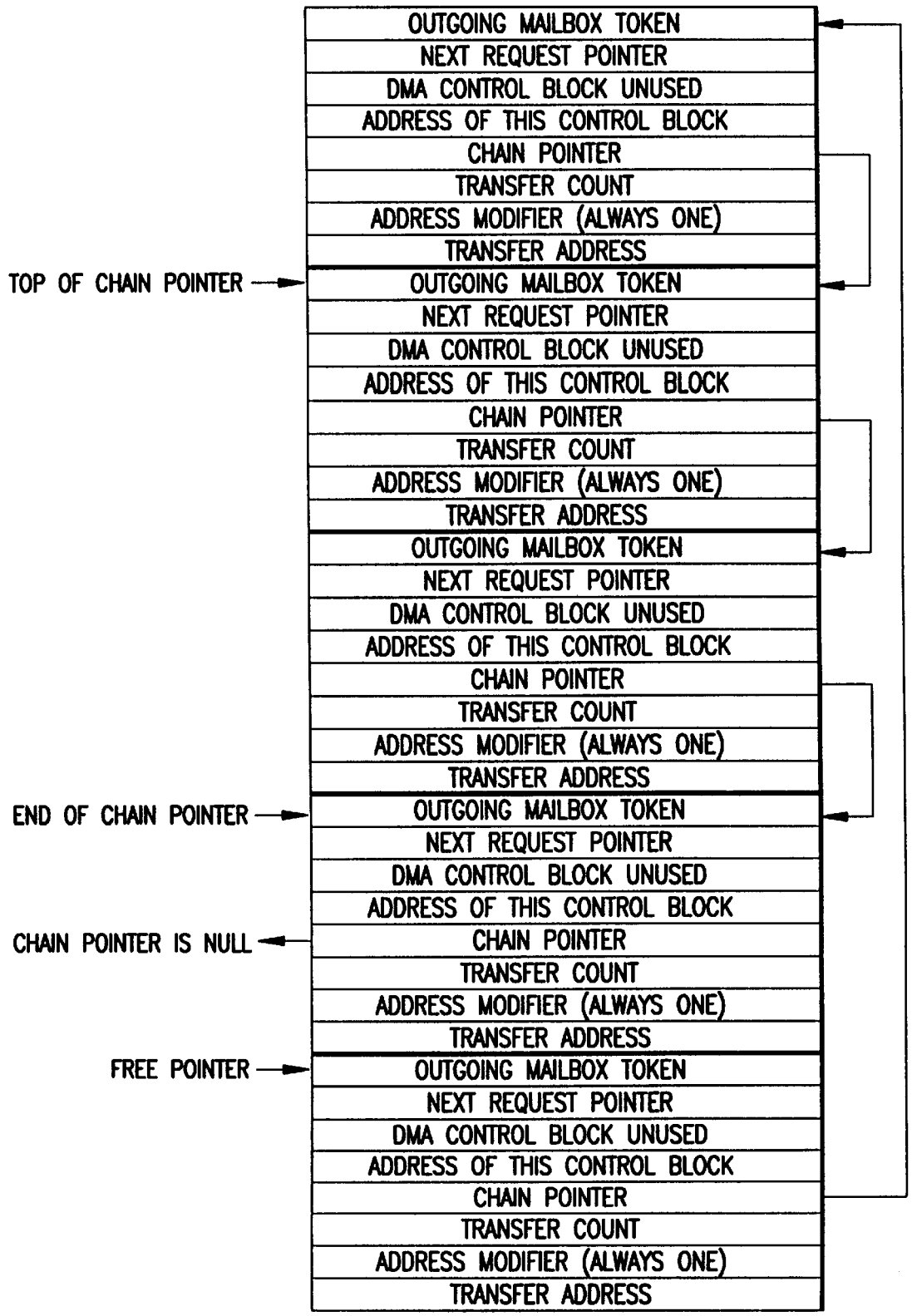
FIG. 33 shows the typical state of the outgoing mailbox DMA chain.

FIG. 33 illustrates a typical state of the outgoing mailbox DMA chain.

Figure 34:
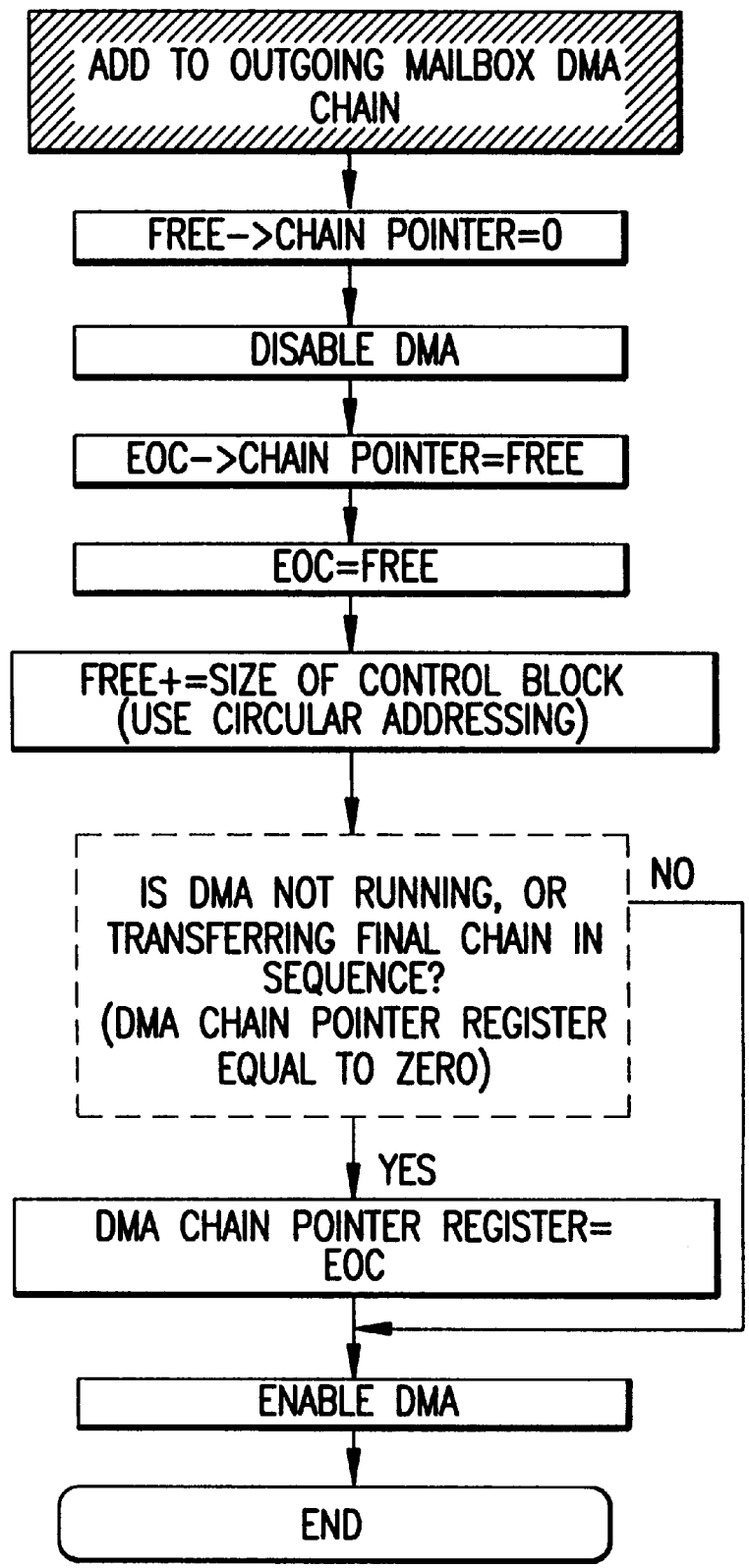
FIG. 34 is a flow-chart of adding entries to a non-full chain.

FIG. 34 shows the control flow for adding an entry to a non-full chain.

Figure 35:
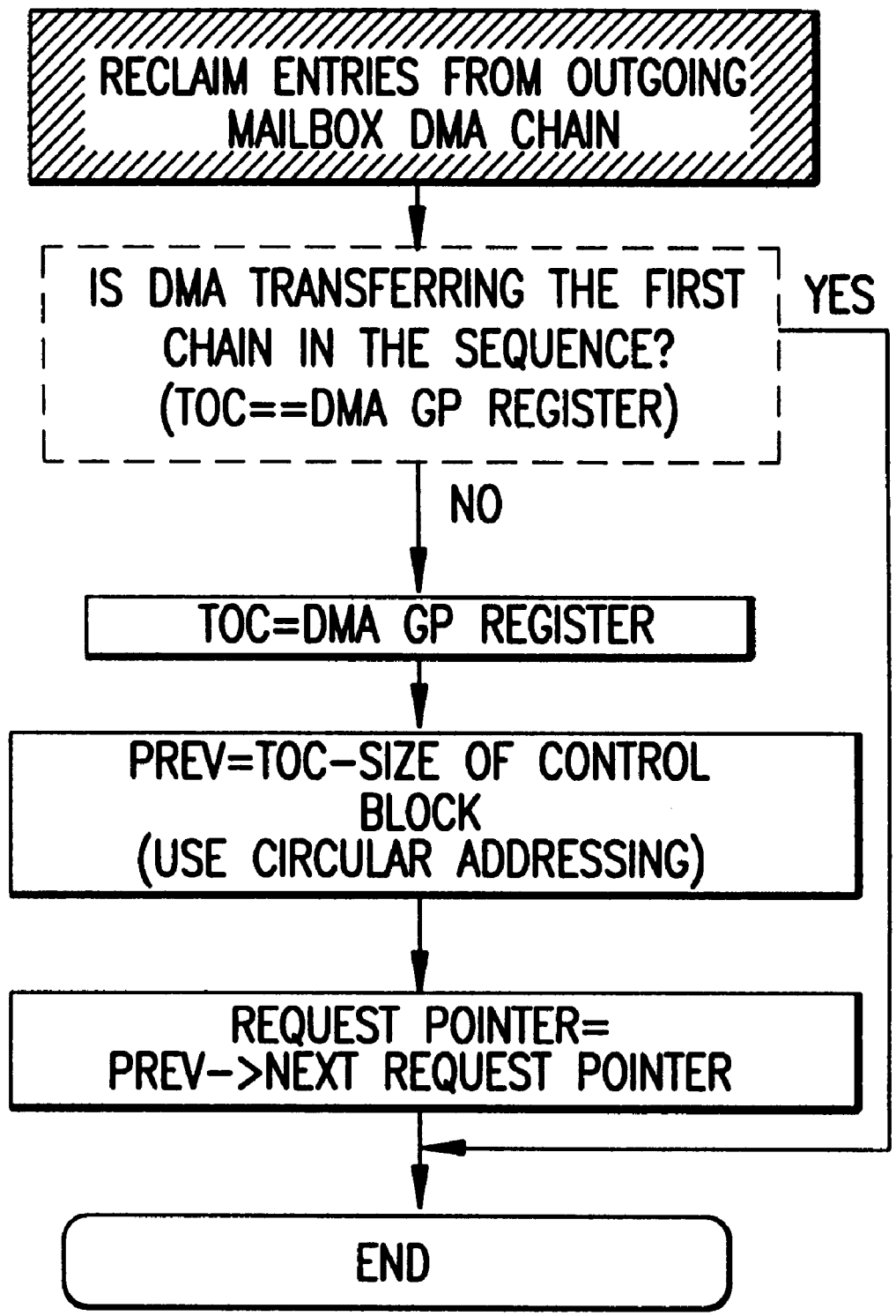
FIG. 35 is a flow-chart of reclaiming entries from the outgoing mailbox DMA chain.

FIG. 35 is a flow-chart of reclaiming entries from the outgoing mailbox DMA chain, and shows the control flow for reclaiming entries from the chain while a DMA is running.

Figure 36:
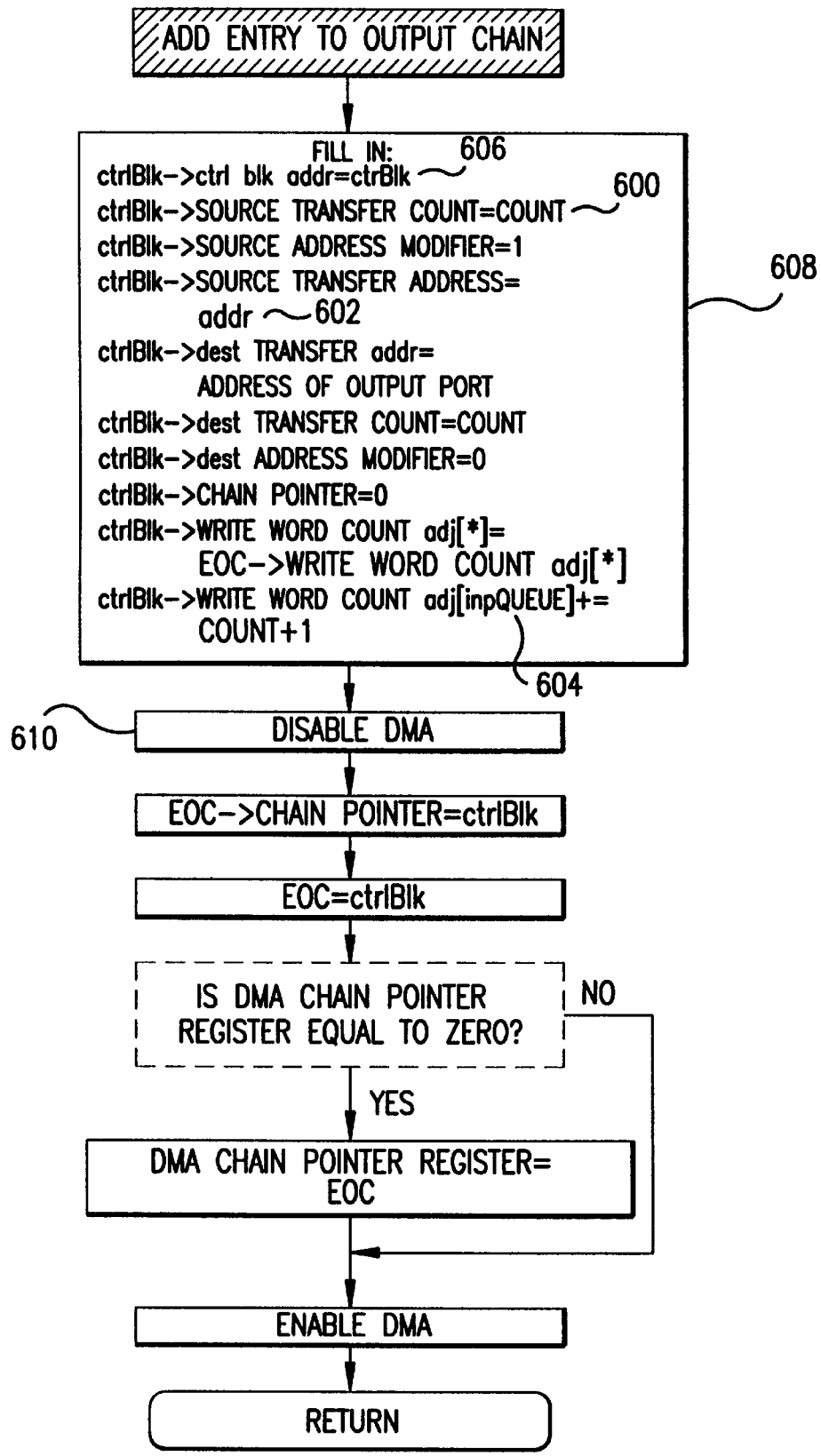
FIG. 36 is a flow-chart of adding an entry to the outgoing mailbox DMA chain.

FIG. 36 shows the control flow for adding an entry to the output chain. The parameters to this function are as follows. Count 600. This parameter specifies the transfer count, in words. Addr 602. This parameter specifies the source transfer address. InpQueue 604. This parameter specifies the input queue from which the request was received. CtrlBlk 606. This parameter specifies the address of the control block in the output chain. The remainder of the flow chart, outside of the grouped region 608, depicts a particular embodiment (starting with item 610) for the output DMA completion ISR discussed at FIG. 39 hereinbelow.

Continuing with FIG. 27, at step 512 the invention idles until the Idle loop 514 detects a request in the input queue. Once detected, control is passed to the Dispatcher 516. The Dispatcher then passes control to the appropriate rendering function, which invokes the OutputHeapAlloc logic to allocate memory for the rendering function's output.

Figure 37:
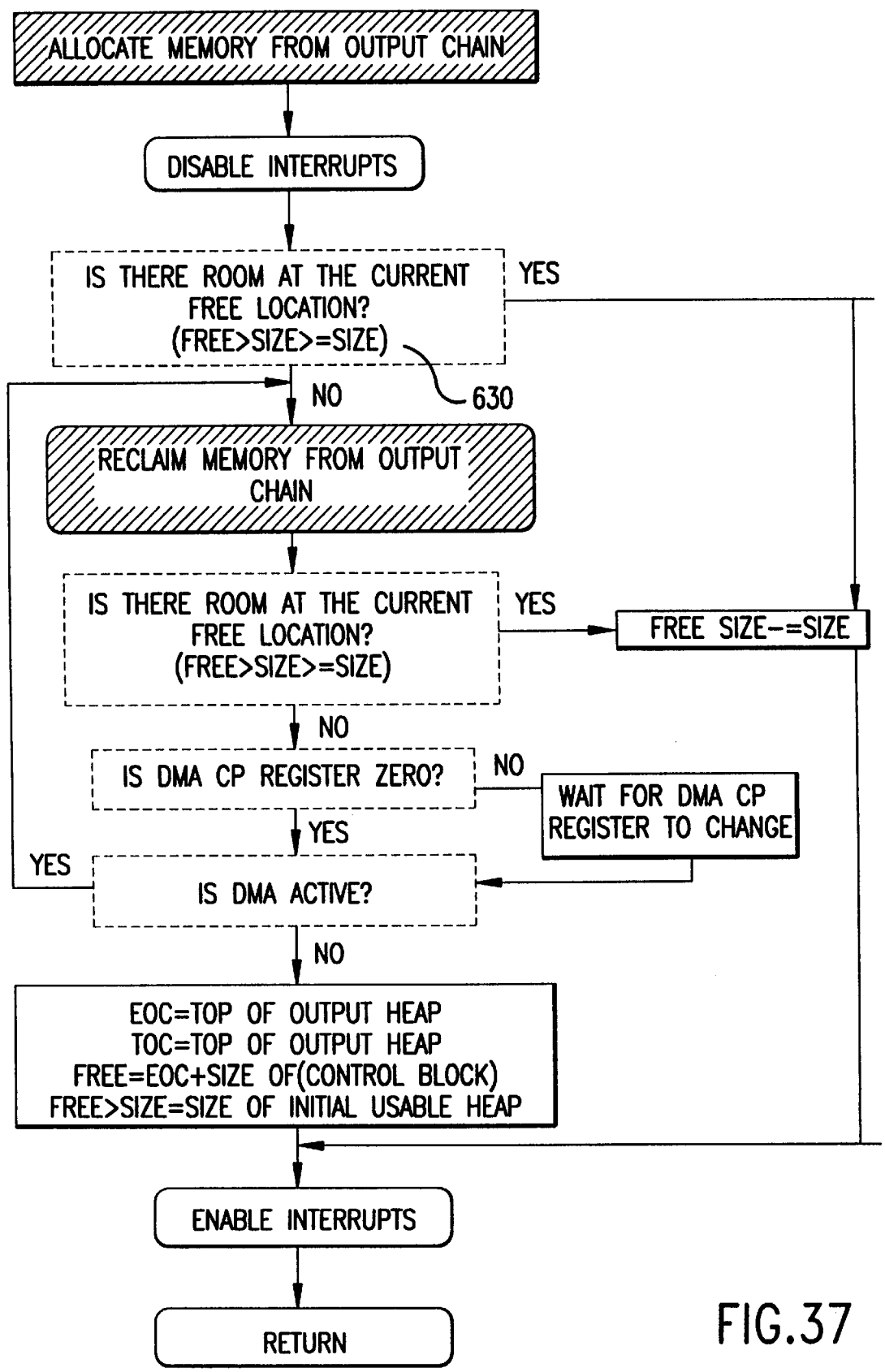
FIG. 37 is a flow-chart of allocating memory from the outgoing mailbox DMA chain.

FIG. 37 is a flow chart showing the control flow for allocating memory from the output chain. If there is not enough memory in the output heap, OutputHeapAlloc invokes the OutputChainReclaim logic to reclaim entries from the output chain. In a preferred embodiment, the output manager stalls if memory cannot be allocated. The parameter to this function is Size 630, which is the number of words to allocate.

Figure 38:
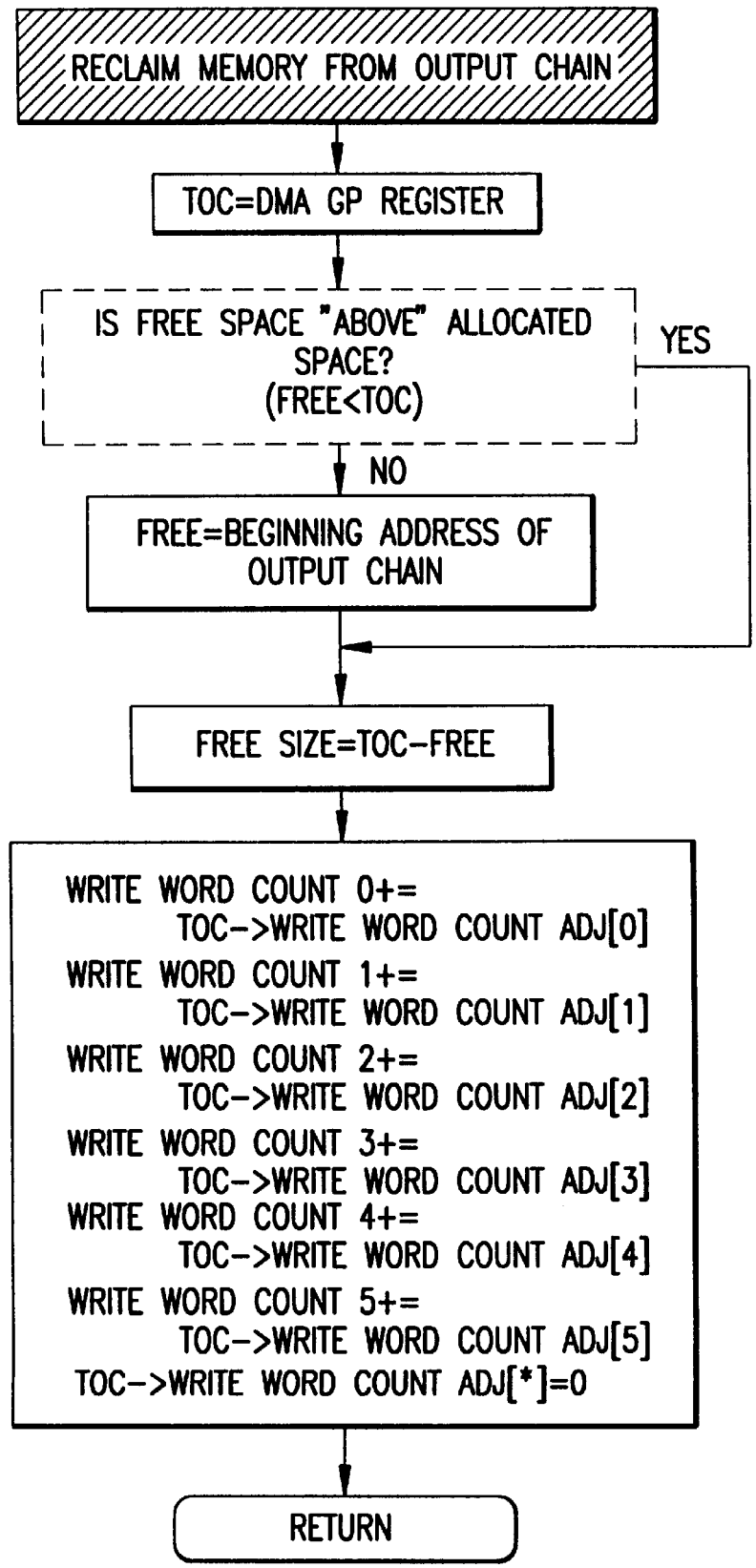
FIG. 38 is a flow-chart of reclaiming memory from the outgoing mailbox DMA chain.

FIG. 38 is a flow chart showing the control flow for reclaiming memory from the output chain. If enough memory cannot be reclaimed, OutputHeapAlloc loops, polling the output direct memory access status until it is complete. After rendering is complete, the rendering function invokes the OutputChainAdd logic to add its output to the output chain. Then the rendering function passes control to RequestExit 518 (FIG. 27), which adjusts the input queue pointers to exclude the request that was just processed. RequestExit passes control back to the Idle loop 514. In a preferred embodiment, memory is always reclaimed from the top of the chain.

Figure 39:
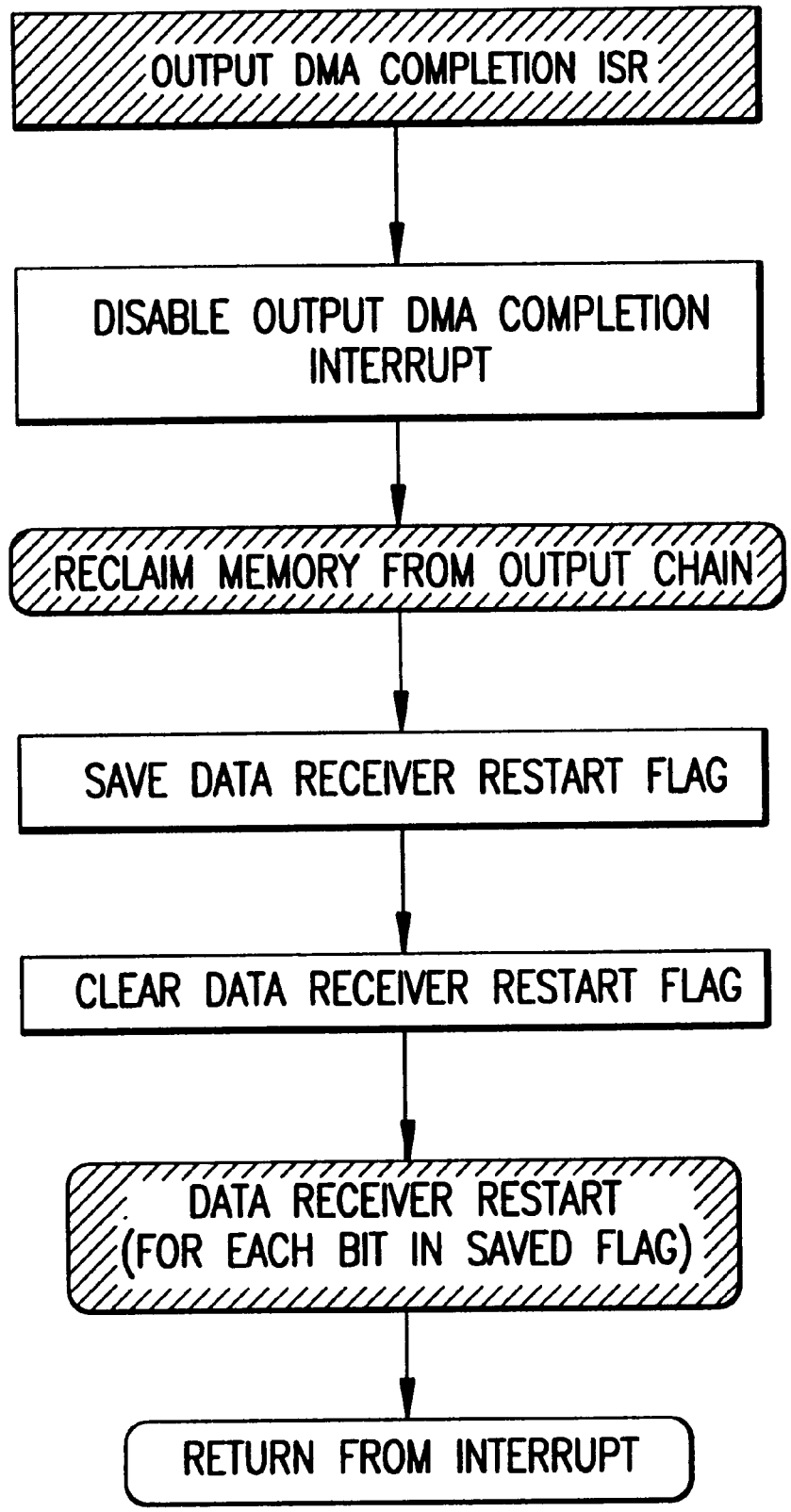
FIG. 39 is a flow-chart of the Output DMA Completion ISR.

FIG. 39 is a flow chart showing the overall control flow for the Output DMA Completion ISR, which is called after an output direct memory access, and which in a preferred embodiment utilizes the reclaim function of FIG. 38.

Figure 40:
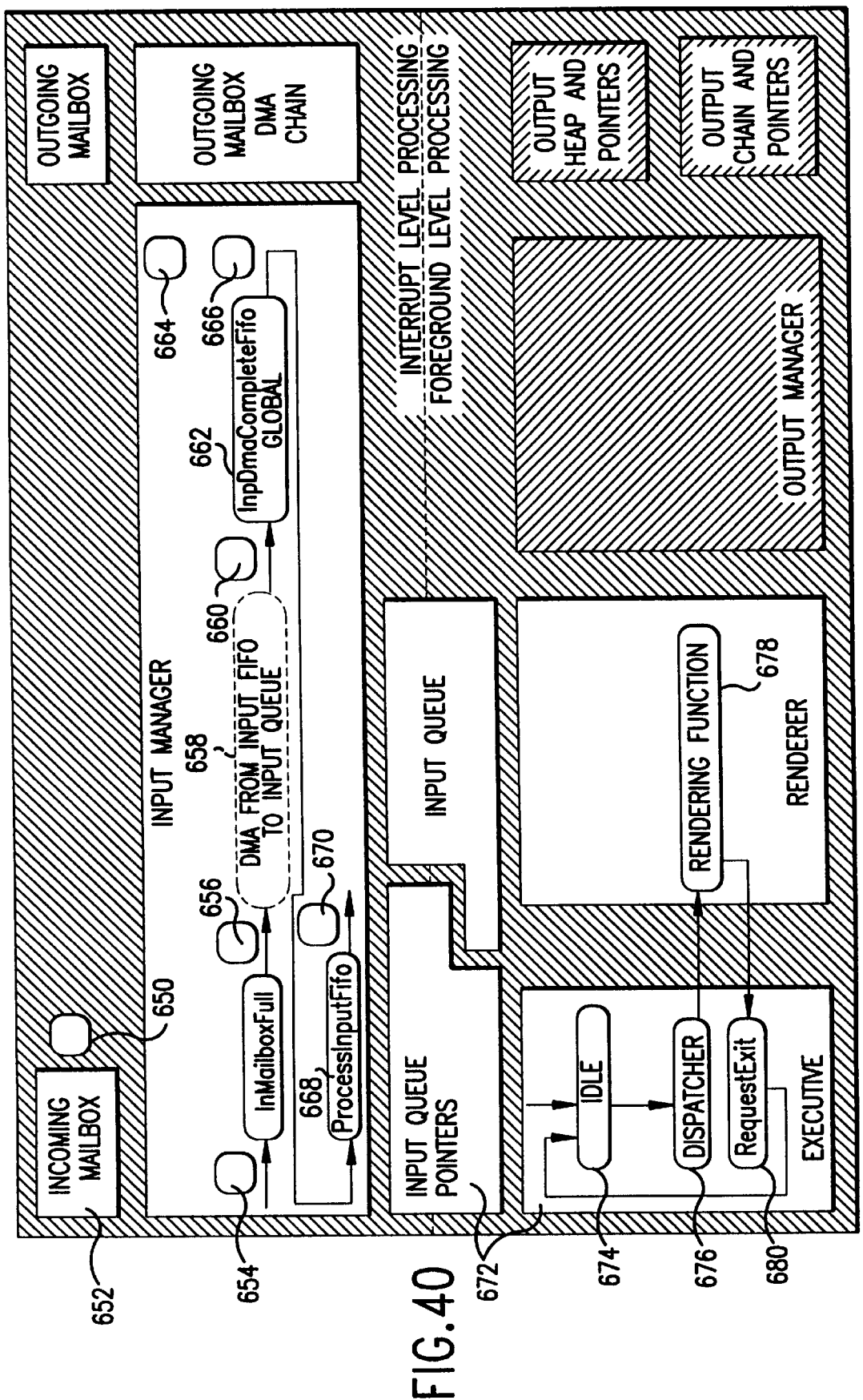
FIG. 40 is a data-flow diagram showing processing of a global request in the incoming mailbox.

FIG. 40 shows another data flow (see discussion hereinabove for FIG. 27), in which a request processor receives the input FIFO ownership token, the input FIFO contains a global request, and the request is passed via the outgoing mailbox. In a preferred embodiment, the flow of control is as follows.

First, at step 650, an input FIFO ownership token arrives in the incoming mailbox 652. Then at step 654 the InMailboxFull ISR is invoked, in which the ISR reads the request header and determines the size of the request. At step 656, the InMailboxFull ISR initiates a direct memory access to transfer at step 658 the request from the input FIFO to the input queue and then exits. Note that in a preferred embodiment, foreground processing occurs while the direct memory access is running. At step 660, when the direct memory access completes, the InpDmaCompleteFifoGlobal ISR 662 is invoked. This routine is invoked when the direct memory access of a global request from the input FIFO has completed. The global request is passed to the other request processors (via the outgoing mailbox), and the next request is processed from the input FIFO. At step 664, the InpDmaCompleteFifoGlobal ISR passes the global request to the next request processor by placing a direct memory access control block in the outgoing mailbox direct memory access chain.

Figure 41:
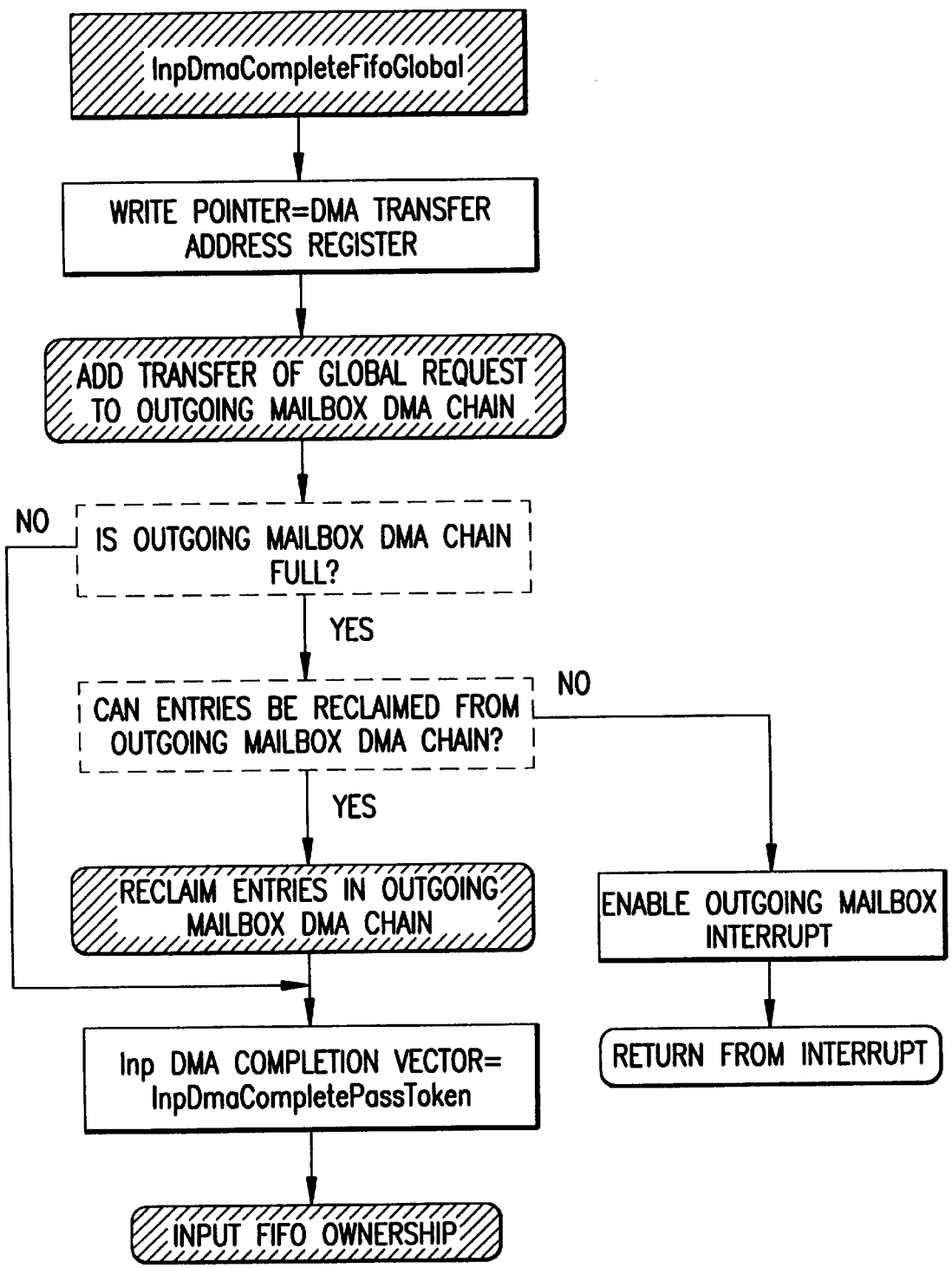
FIG. 41 is a flow-chart of the InpDmaCompleteFifoGlobal ISR of FIG. 40.

FIG. 41 shows the detailed control-flow for the InpDmaCompleteFifoGlobal ISR. InpDmaCompleteFifoGlobal is invoked upon completion of a transfer of a global request from the input FIFO into the input queue.

Continuing with FIG. 40, at step 666 the InpDmaCompleteFifoGlobal 662 passes control to ProcessinputFifo 668, an entry point inside of the InpMailboxFull ISR. At step 670 control flow diverges along one of two paths. If the next request in the input FIFO is global, then processing repeats through steps 656 through 666. Or, if the next request in the input FIFO is local or pass-through, then the program control flow described hereinabove for FIG. 27 is followed. After the divergence has been followed and completed, at step 672 the input queue request pointer is adjusted to include the request that has just been transferred in one of two ways. In a relatively busy system, the input DMA completion ISR adjusts the input queue request pointer when it reclaims entries from the outgoing mailbox direct memory access chain. Or, in a relatively idle system, the Idle loop 674 adjusts the input queue request pointer when it reclaims entries from the outgoing mailbox direct memory access chain. The Idle loop 674 detects a request in the input queue and passes control to the Dispatcher 676. The Dispatcher then passes control to the appropriate rendering function 678. After processing of the global request is complete, the rendering function 678 passes control to RequestExit 680, which adjusts the input queue pointers to exclude the request that was just processed. Then RequestExit passes control back to the Idle loop 674.

Figure 42:
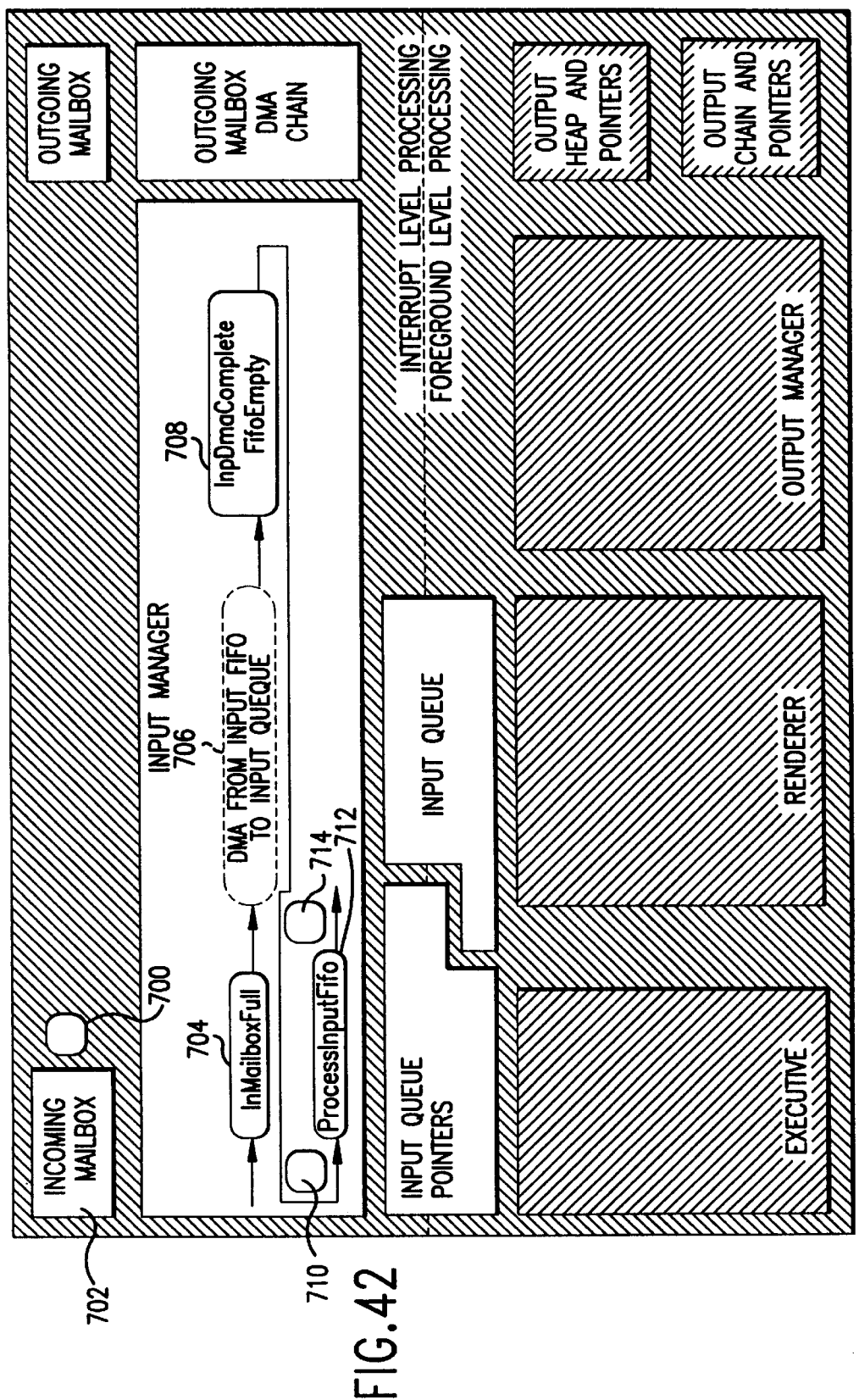
FIG. 42 is a data-flow diagram showing processing of an input queue ownership notification when the input queue is empty.

FIG. 42 illustrates another data flow, in which a request processor receives the input FIFO ownership token and the input FIFO is empty. In a preferred embodiment, the flow of control is as follows.

At step 700, an input FIFO ownership token arrives in the incoming mailbox 702, and the InMailboxFull ISR 704 is invoked. The InMailboxFull ISR 704 then initiates a direct memory access 706 to transfer the request header from the input FIFO to the input queue and then exits. Note that foreground processing is enabled while the direct memory access is running. When the to direct memory access completes, the InpDmaFifoEmpty ISR 708 is invoked.

Figure 43:
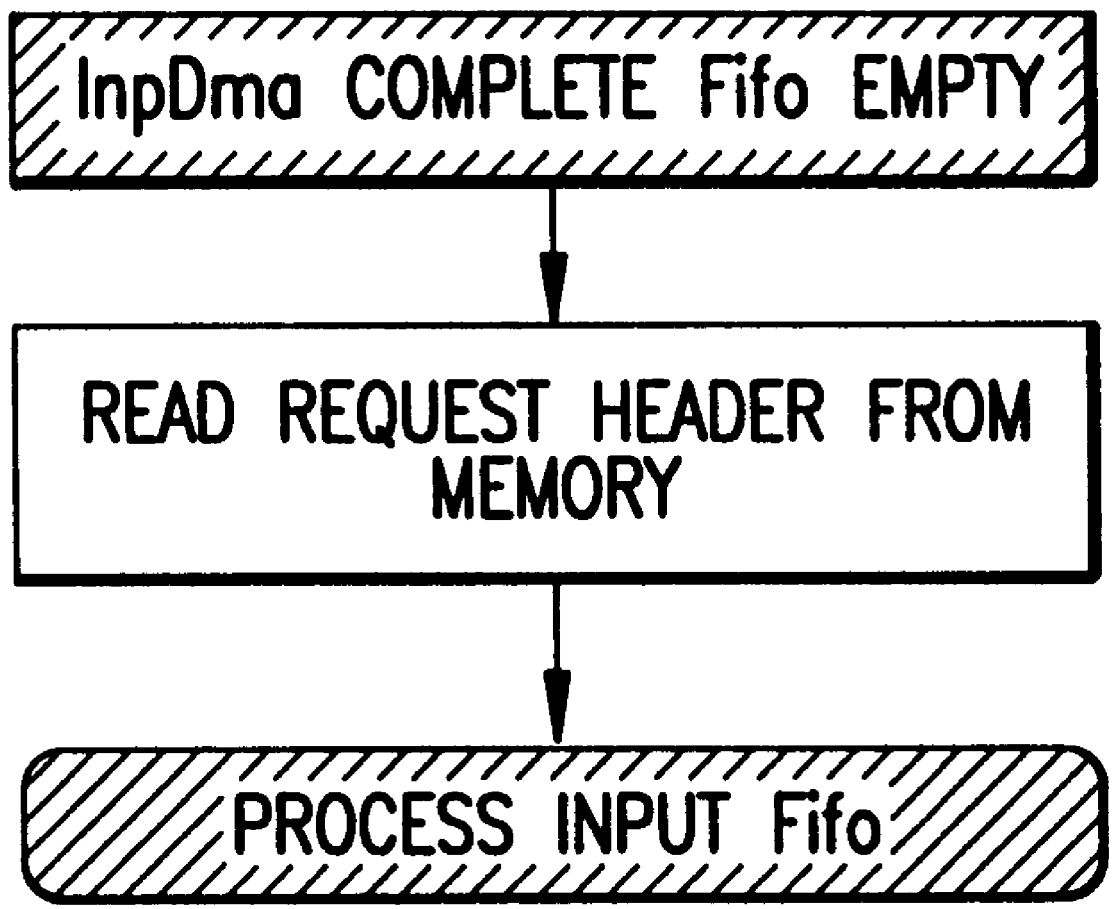
FIG. 43 is a flow-chart of the InpDmaCompleteFifoEmpty ISR of FIG. 42.

FIG. 43 is a flow chart showing the detailed control-flow for the InpDmaCompleteFifoEmpty ISR. In InpDmaCompleteFifoEmpty, if the input FIFO is empty upon processing the input FIFO ownership token, a single-word DMA is initiated to read the next request header. Upon completion of the transfer, InpDmaCompleteFifoEmpty is invoked to process the request header, thus effecting the restart of the input manager.

Continuing with FIG. 42, at step 710 the InpDmaFifoEmpty passes control to ProcessInputFifo 712, which should be an entry point inside of the InpMailboxFull ISR. At step 714, processing control flow takes the path described hereinabove for FIG. 27.

Figure 44:
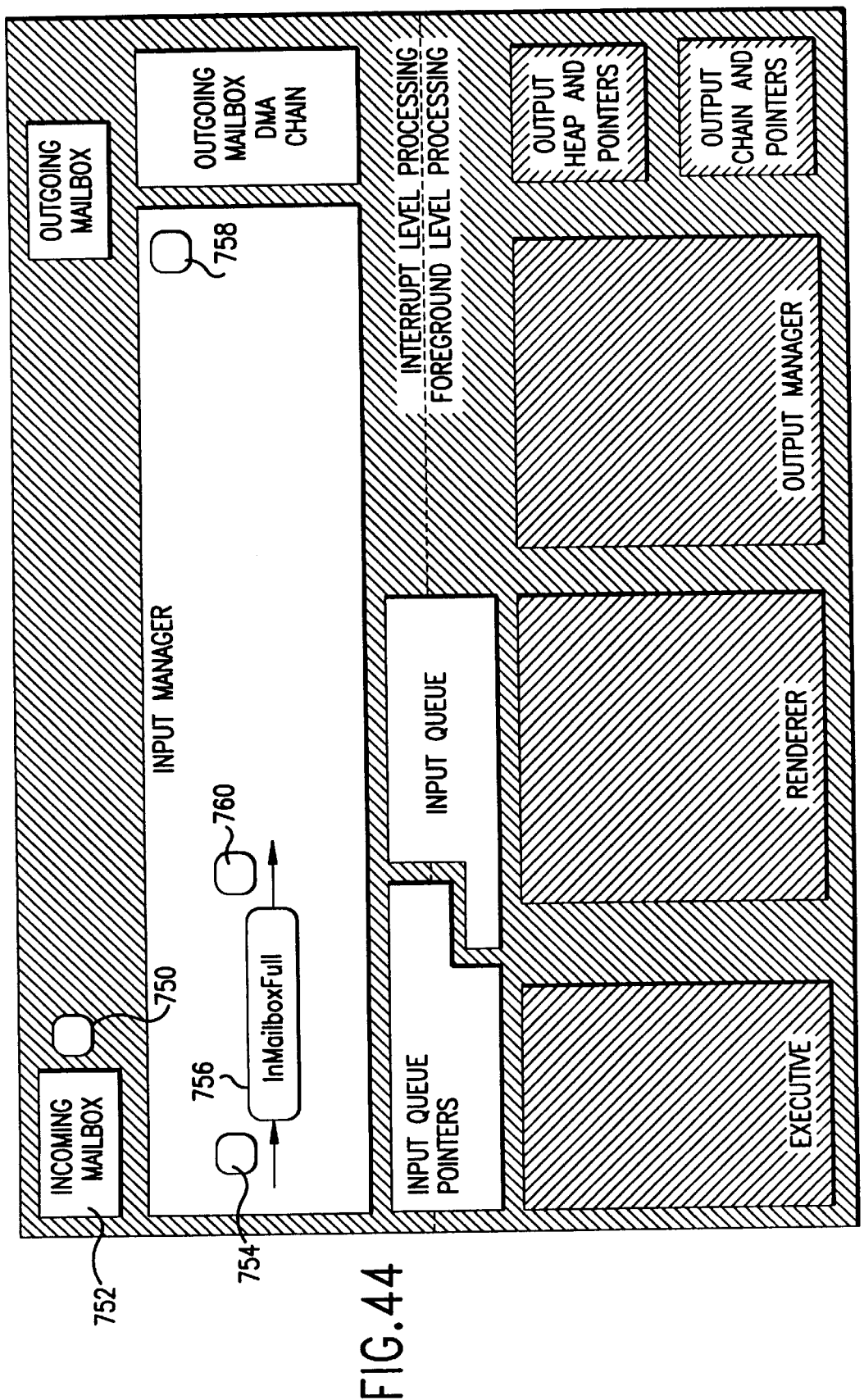
FIG. 44 is a data-flow diagram showing processing of an input queue ownership notification when a graphics request in the queue is being processed for the first time.

FIG. 44 shows another data flow, in which a request processor receives the input FIFO ownership token, the input queue is full, and the request is being processed by the request digital signal processor for the first time. In a preferred embodiment, the flow of control is as follows.

At step 750, an input FIFO ownership token arrives in the incoming mailbox 752. At step 754 the InMailboxFull ISR 756 is invoked, which reads the request header and determines the size of the request. At step 758 the digital signal processor number is logically ORed into the input FIFO ownership token. Then at step 760 the InMailboxFull ISR 756 passes the input FIFO ownership token to the next request processor in the round-robin queue via one of two methods. The first method is writing it directly to the outgoing mailbox. This method is used if the previous token was for input FIFO ownership. The second method is placing the token in the outgoing mailbox direct memory access chain. This method is used if the previous token was not for input FIFO ownership. After passing along the token, the InMailboxFull ISR 756 exits, and foreground processing continues.

Figure 45:
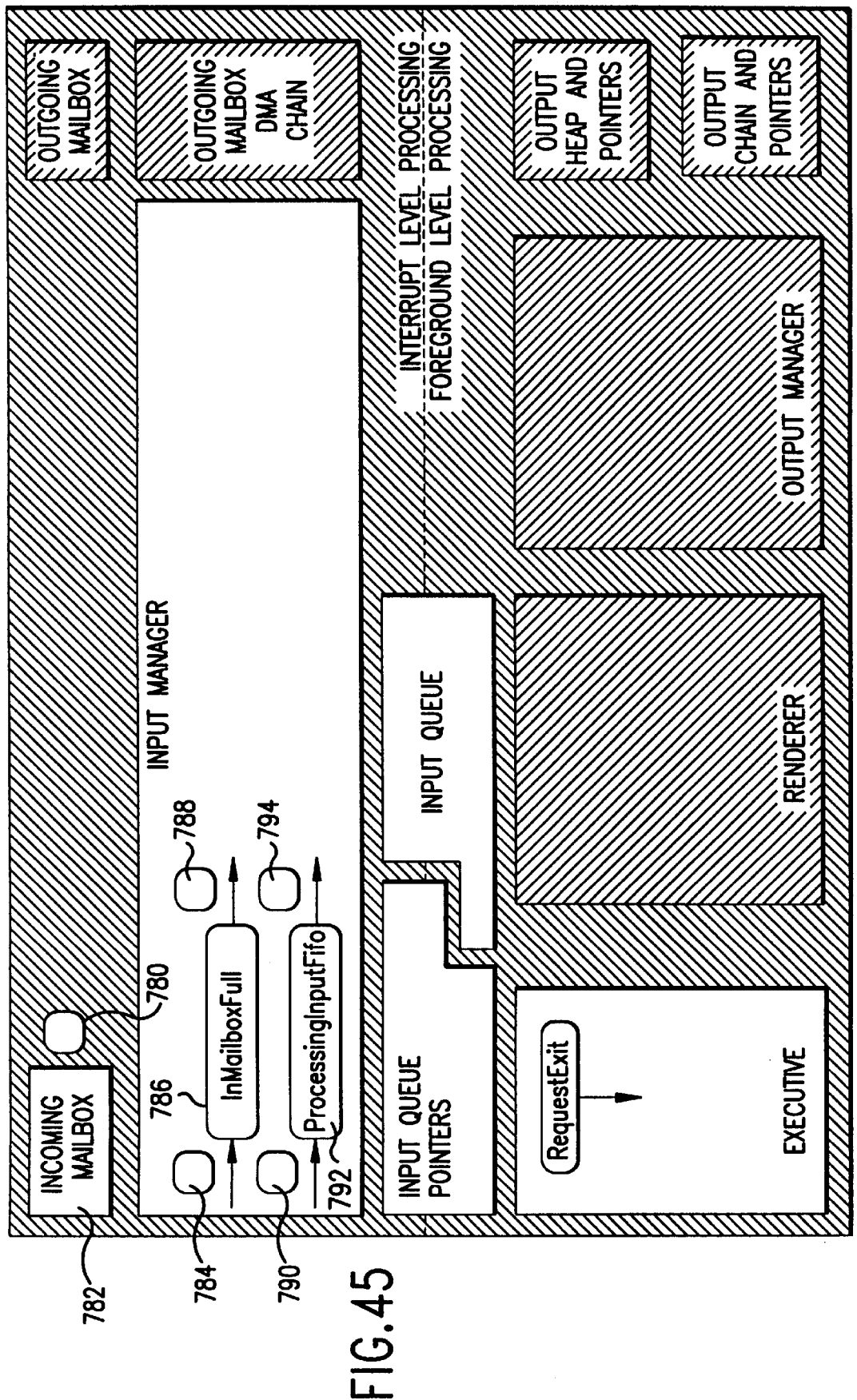
FIG. 45 is a data-flow diagram showing processing of an input queue ownership notification when a graphics request in the queue has been skipped by a previous processor.

FIG. 45 illustrates another data flow, in which a request processor receives the input FIFO ownership token, the input queue is full, and the request has already been passed by the request processor. In a preferred embodiment, the flow of control is as follows.

At step 780 an input FIFO ownership token arrives in the incoming mailbox 782, and at step 784 the InMailboxFull ISR 786 is invoked, which reads the request header and determines the size of the request. At step 788 the InMailboxFull ISR 786 sets a register containing the number of words needed in the input FIFO and then exits, enabling foreground processing to execute. At step 790, when the RequestExit 518 logic (described hereinabove for FIG. 27) determines that enough space is available in the input queue, it invokes the input manager 150 (shown on FIG. 3) via an interrupt to the ProcessInputFifo 792 entry point. Then at step 794 the processing control flow takes the path described hereinabove for FIG. 27.

Figure 46:
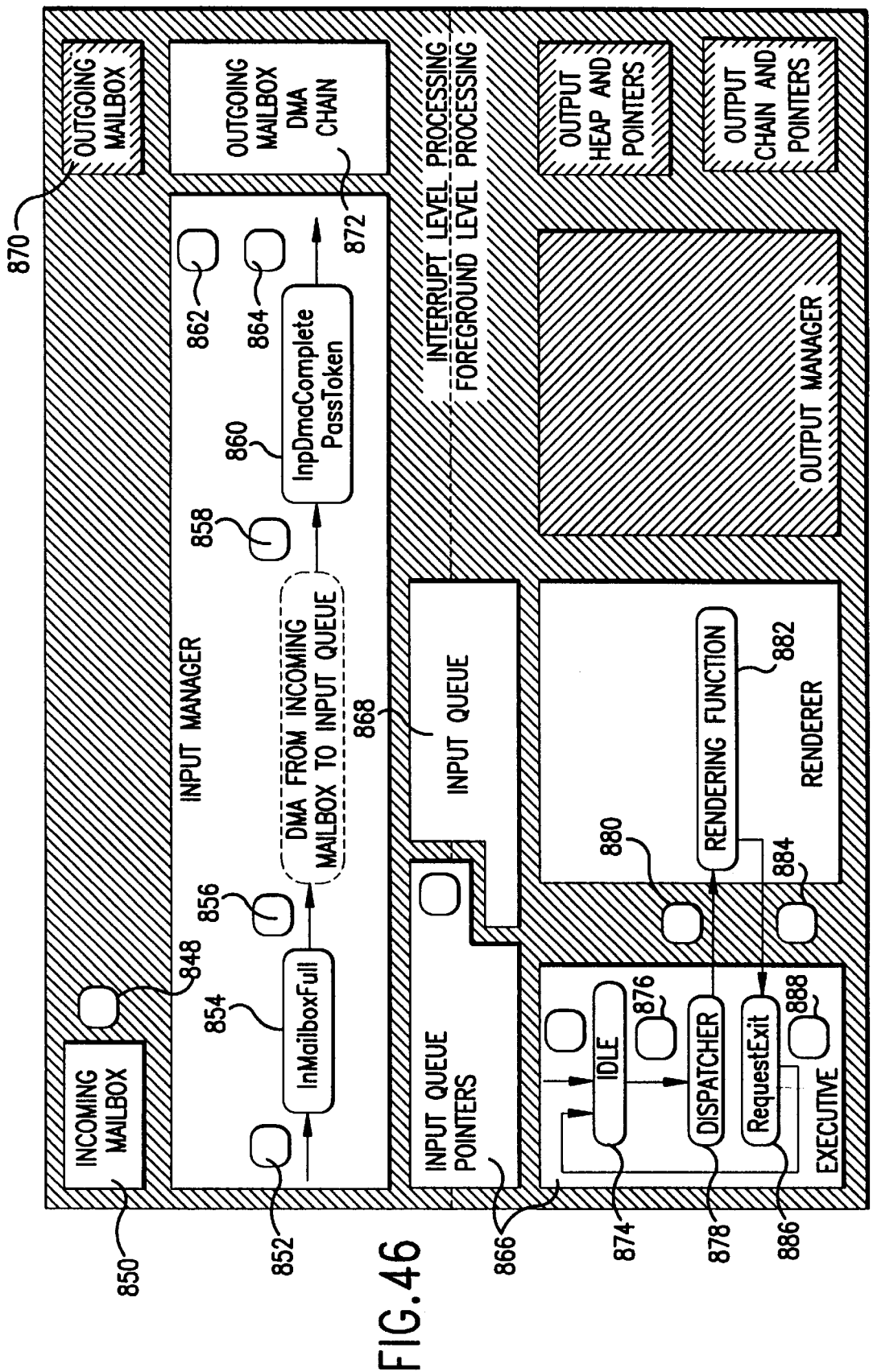
FIG. 46 is a data-flow diagram showing processing of a global request in the incoming mailbox and the next processor in the round-robin queue is not the originator of the request.

FIG. 46 shows another data flow, in which a request processor receives an entire global request in its incoming mailbox and the next request processor is not the originator of the request. In a preferred embodiment, the flow of control is as follows.

At step 848, a global request token arrives in the incoming mailbox 850. At step 852 the InMailboxFull ISR 854 is invoked, which reads the request header and determines the size of the request. At step 856 the InMailboxFull ISR 854 initiates a direct memory access to transfer the request from the incoming mailbox to the input queue and then exits. Note that foreground processing occurs while the direct memory access is running. At step 858, when the direct memory access completes, the InpDmaCompletePassToken ISR 860 is invoked. At step 862 the InpDmaCompletePassToken ISR 860 passes the global request to the next request processor by placing a direct memory access control block in the outgoing mailbox direct memory access chain. Then at step 864 the InpDmaCompletePassToken 860 exits and foreground processing is allowed to continue. At step 866 the input queue 868 request pointer is adjusted to include the request that has just been transferred. In a preferred embodiment, this adjustment is performed in one of two ways. First, in a relatively busy system, the input DMA completion ISR adjusts the input queue 868 request pointer when it reclaims entries from the outgoing mailbox 870 direct memory access chain 872. Or, in a relatively idle system, the Idle loop 874 adjusts the input queue 868 request pointer when it reclaims entries from the outgoing mailbox direct memory access chain 872. Then at step 876 the Idle loop 874 detects a request in the input queue 868 and passes control to the Dispatcher 878. At step 880 the Dispatcher 878 passes control to the appropriate rendering function 882. At step 884, after processing of the global request is complete, the rendering function 882 passes control to RequestExit 886, which adjusts the input queue 868 pointers to exclude the request that was just processed. Then at step 888, RequestExit 886 passes control back to the Idle loop 874 which awaits another token to be received.

Figure 47:
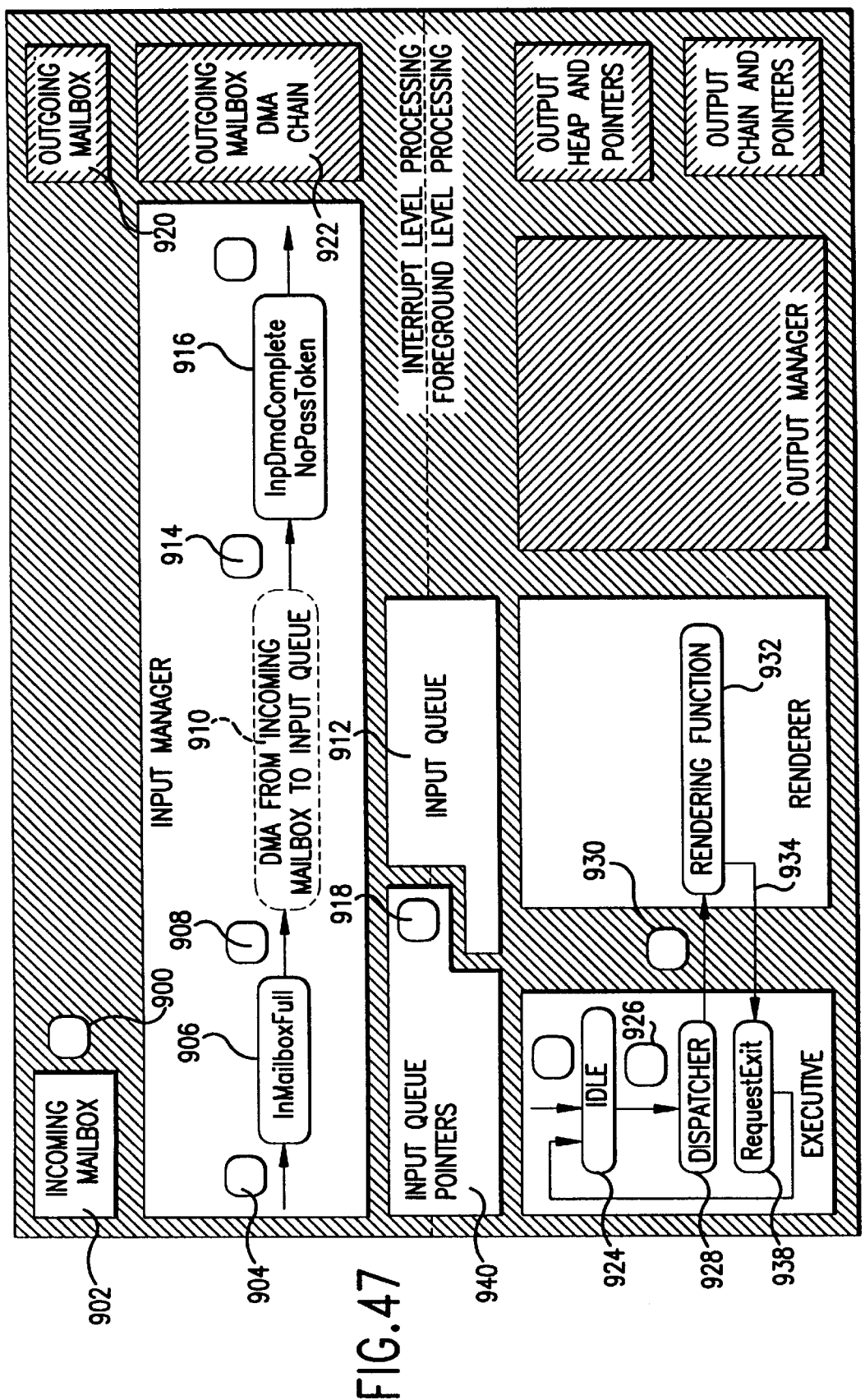
FIG. 47 is a data-flow diagram showing processing of a global request in the incoming mailbox and the next processor in the round-robin queue is the originator of the request.

FIG. 47 shows illustrates another data flow, in which a request processor receives an entire global request in its incoming mailbox and the next request processor is the originator of the request. In a preferred embodiment, the flow of control is as follows.

At step 900 a global request token arrives in the incoming mailbox 902, and at step 904 the InMailboxFull ISR 906 is invoked, which reads the request header and determines the size of the request. Then at step 908 the InMailboxFull ISR 906 initiates a direct memory access to transfer at step 910 the request from the incoming mailbox 902 to the input queue 912 and then exits. Note that foreground processing occurs while the direct memory access is running. Then at step 914, when the direct memory access completes, the InpDmaCompleteNoPassToken ISR 916 is invoked.

Figure 48:
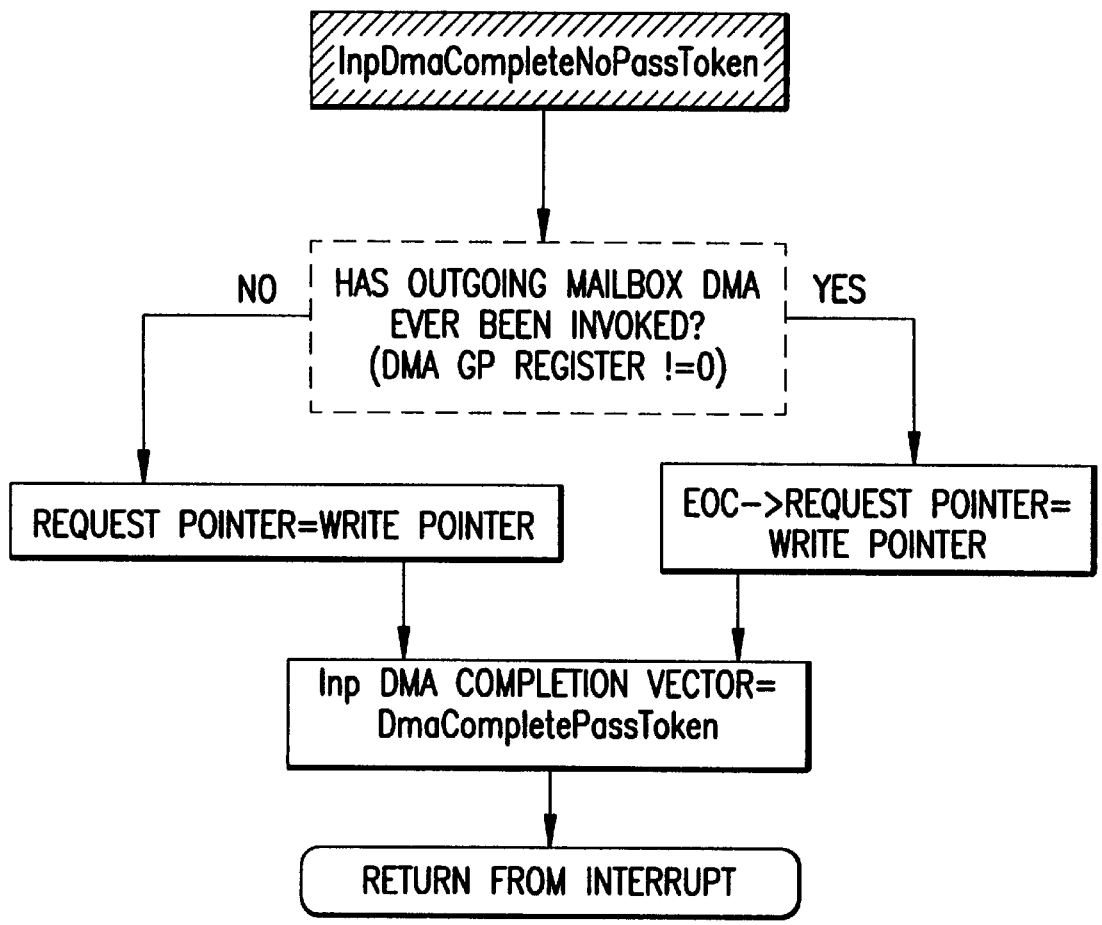
FIG. 48 is a flow-chart of the InpDmaCompleteNoPassToken ISR.

FIG. 48 shows the detailed control-flow for the InpDmaCompleteNoPassToken ISR. This routine is invoked when the direct memory access of a global request from the incoming mailbox has completed and the next request processor is the originator of the request. In a preferred embodiment, no token is passed to the next request processor. When this ISR exits, foreground processing continues.

Continuing with FIG. 47, at step 918 the input queue 912 request pointer is adjusted in one of two ways to include the request that has just been transferred. First, in a relatively busy system, the input DMA completion ISR adjusts the input queue 912 request pointer 940 when it reclaims entries from the outgoing mailbox 920 direct memory access chain 922. Or, in a relatively idle system, the Idle loop adjusts the input queue request pointer 940 when it reclaims entries from the outgoing mailbox direct memory access chain 922. Then at step 926 the Idle loop 924 detects a request in the input queue 912 and passes control to the Dispatcher 928. At step 930 the Dispatcher passes control to the appropriate rendering function 932. At item 934, after the renderer 936 finishes processing the global request, the rendering function 932 passes control to RequestExit 938, which adjusts the input queue pointers 940 to exclude the request that was just processed. RequestExit 938 is then called which then passes control back to the Idle loop 924.

Sequencer

FIGS. 49 through 52 show various processing stages of the sequencer digital signal processor.

Figure 49:
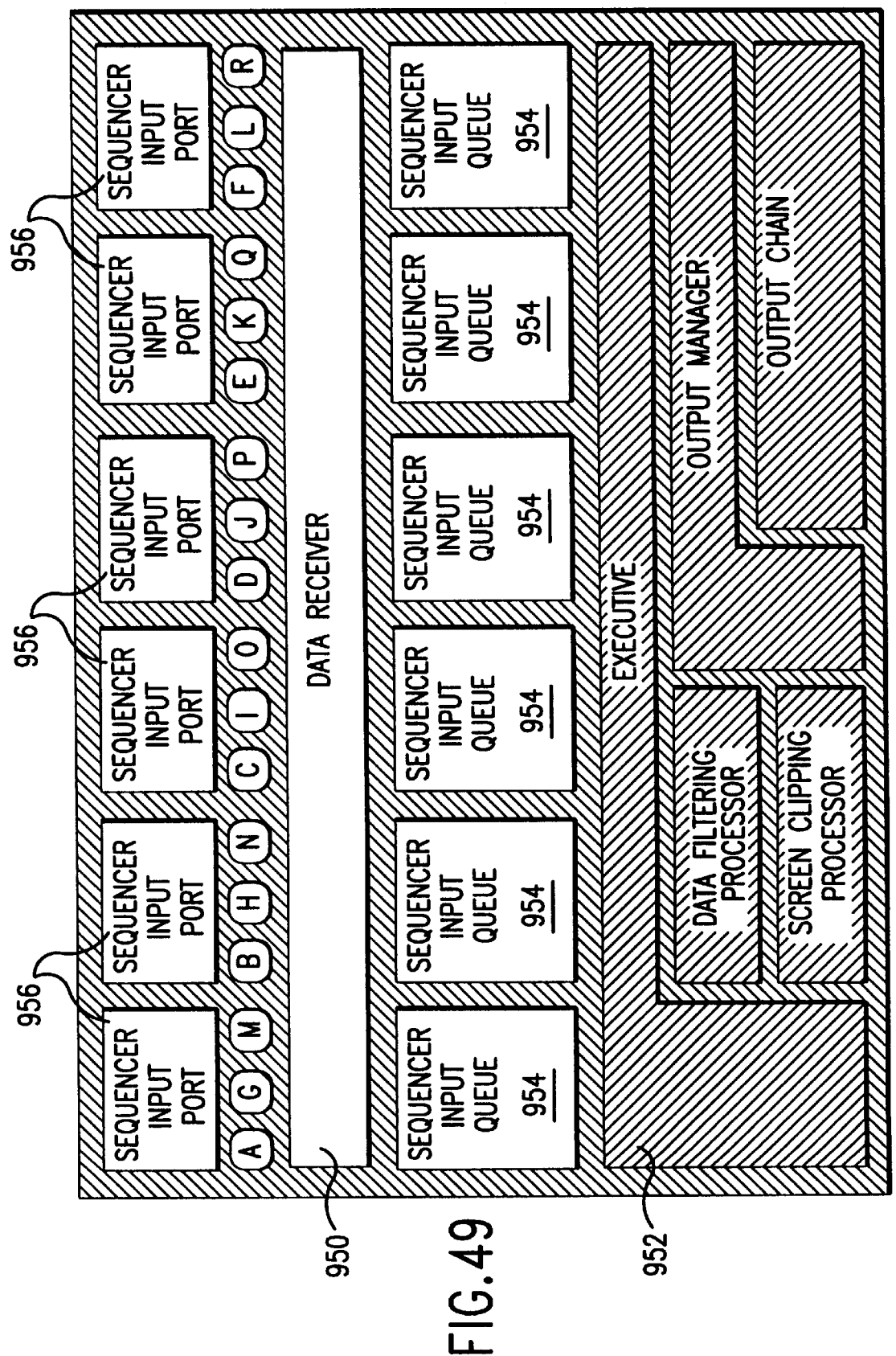
FIG. 49 is a diagram showing the initial processing configuration of the FIG. 22 sequencer.

In FIG. 49, the data receiver 950 constantly transfers data from the request processors 110 (shown on FIG. 1) to the input queues 954. The data receiver 950 simultaneously services all request processors installed into the invention. The executive 952 processes a request from each input queue 954 in sequence unless the sequencer 112 (shown on FIG. 1) request header specifies that the executive 952 must transfer the next request from the same request processor 110. FIG. 49 shows the initial state of sequencer operation, in which several graphics requests are identified within the figure with letter labels A through R. Initially, the data receiver 950 begins transfers from each sequencer input port 956 to each input queue 954.

Figure 50:
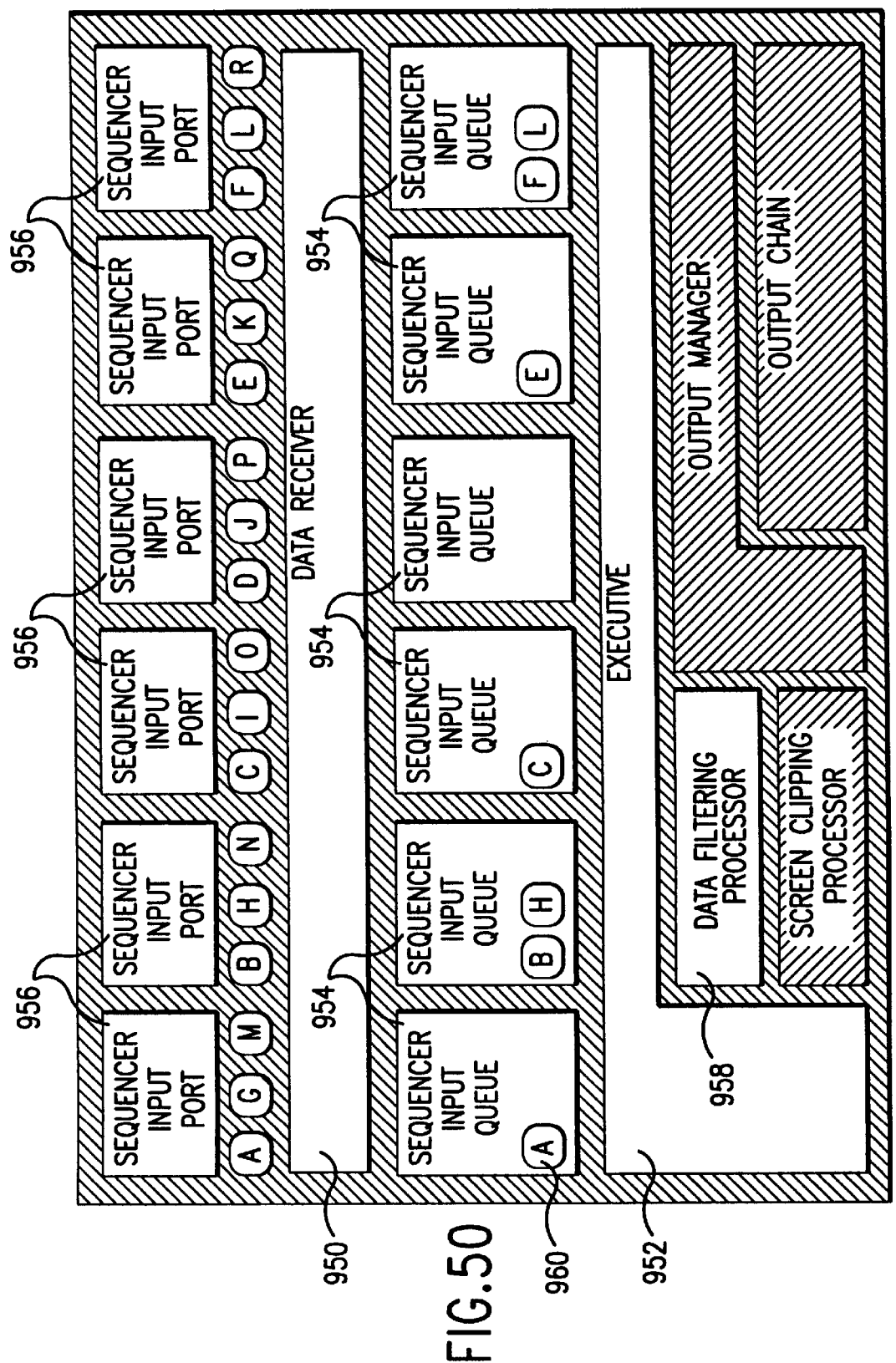
FIG. 50 is a diagram showing continued processing by the FIG. 22 sequencer.

FIG. 50 illustrates program control flow after some of the transfers of the requests have been completed. In a preferred embodiment, the transfers are performed asynchronously. After the transfer of initial request A has completed, the filtering operations 958, if enabled, are applied beginning with the transferred request A (item 960) and then the filters are applied to each input queue 954 in sequence. As shown in FIG. 50, requests A, B, H, C, E, F and L have been partially processed.

Figure 51:
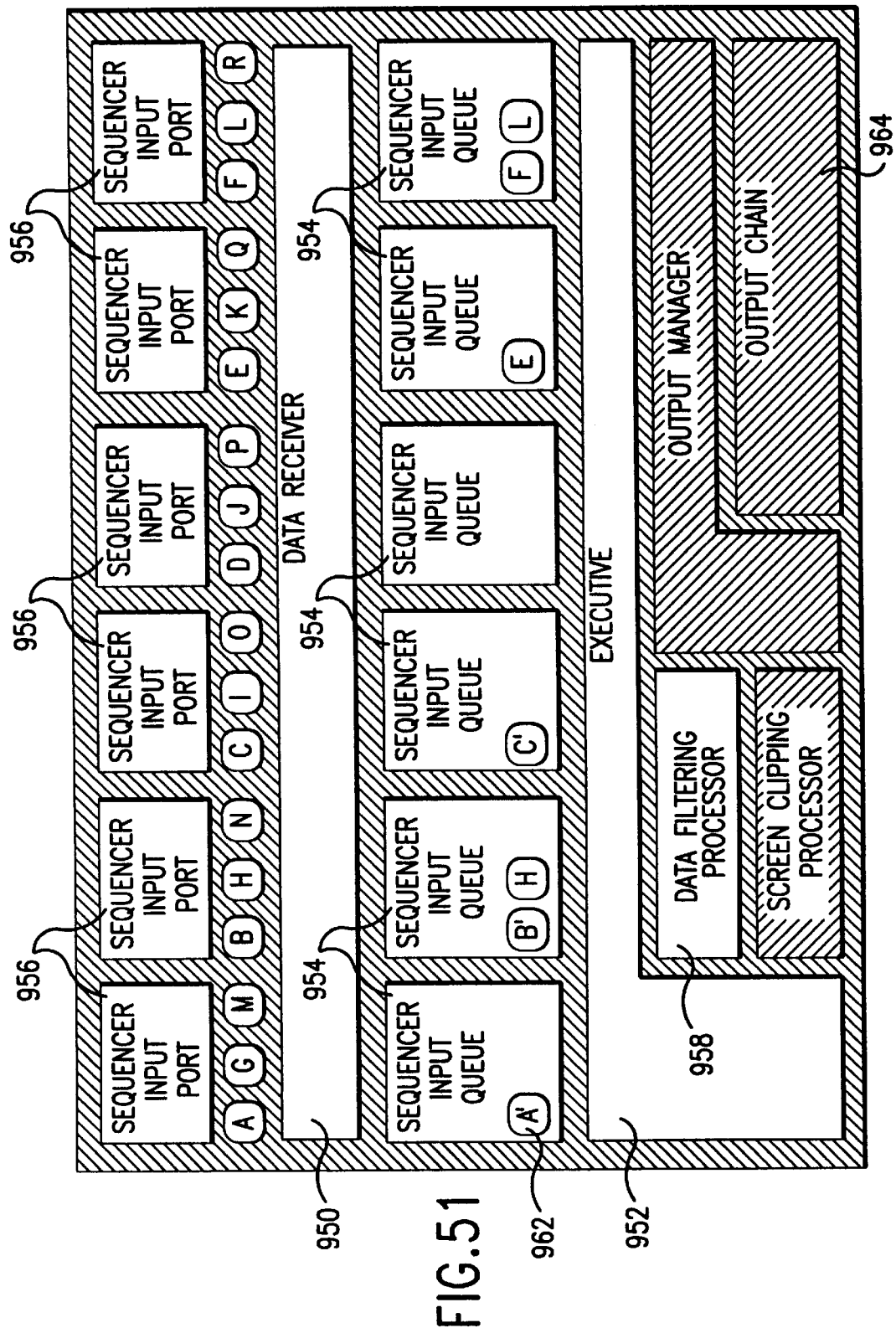
FIG. 51 is a diagram showing continued processing by the FIG. 22 sequencer.

FIG. 51 illustrates a filtering operation 958 that modifies the transferred request 960 (FIG. 50) in the input queue 954 and converts the transferred request 960 into a modified request A' (shown as item 962). Note that in this figure, although request E has been transferred to its input queue 954 before request D has been transferred, request E will not be filtered until request D has been transferred and filtering applied to the transferred request D. As requests are filtered by the data filter 958, control blocks are added to the output chain 964 to transfer the data from one of the input queues 954 or the output chain 964 to the rendering hardware 366 (shown on FIG. 22).

Figure 52:
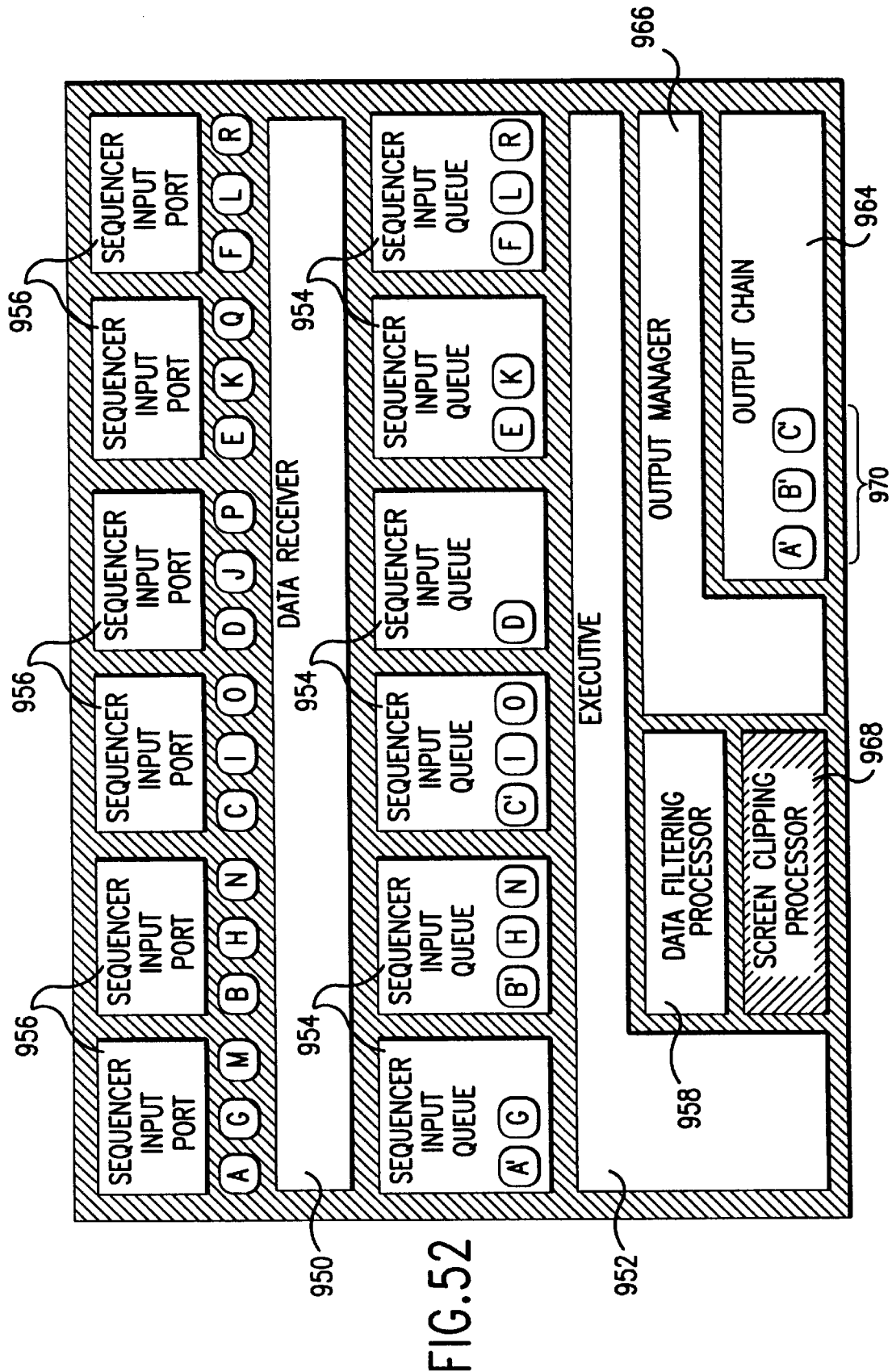
FIG. 52 is a diagram showing continued processing by the FIG. 22 sequencer.

FIG. 52 illustrates the state of the sequencer 112 (shown on FIG. 1) as the requests A through R are added to the output chain 964. As requests are transferred from the output chain 964, the output manager 966 tracks which requests in the input queues 954 have been completely processed. When the input queues 954 become full, the data receiver 950 invokes the output manager 966 to reclaim space in the input queues 954. If space cannot be reclaimed, the data receiver 950 stalls and, in a preferred embodiment, will be awakened by the output manager 966 when space becomes available. Shown as item 968 is the Screen Clipping Processor. As the invention is transferring requests from the input queues 954 to the output chain 964, as with the filtering operation, if clipping is enabled, then the processed requests A' through R' are clipped and this clipped data 970 is written into the output chain 964. As part of the clipping operation, preferred embodiments of the invention will allow dual screen processing. That is, if a window overlaps both screens of a dual-screen system, the request buffer is sent to the invention twice so that the sequencer 112 (FIG. 1) only needs to clip to one screen at a time.

Figure 53:
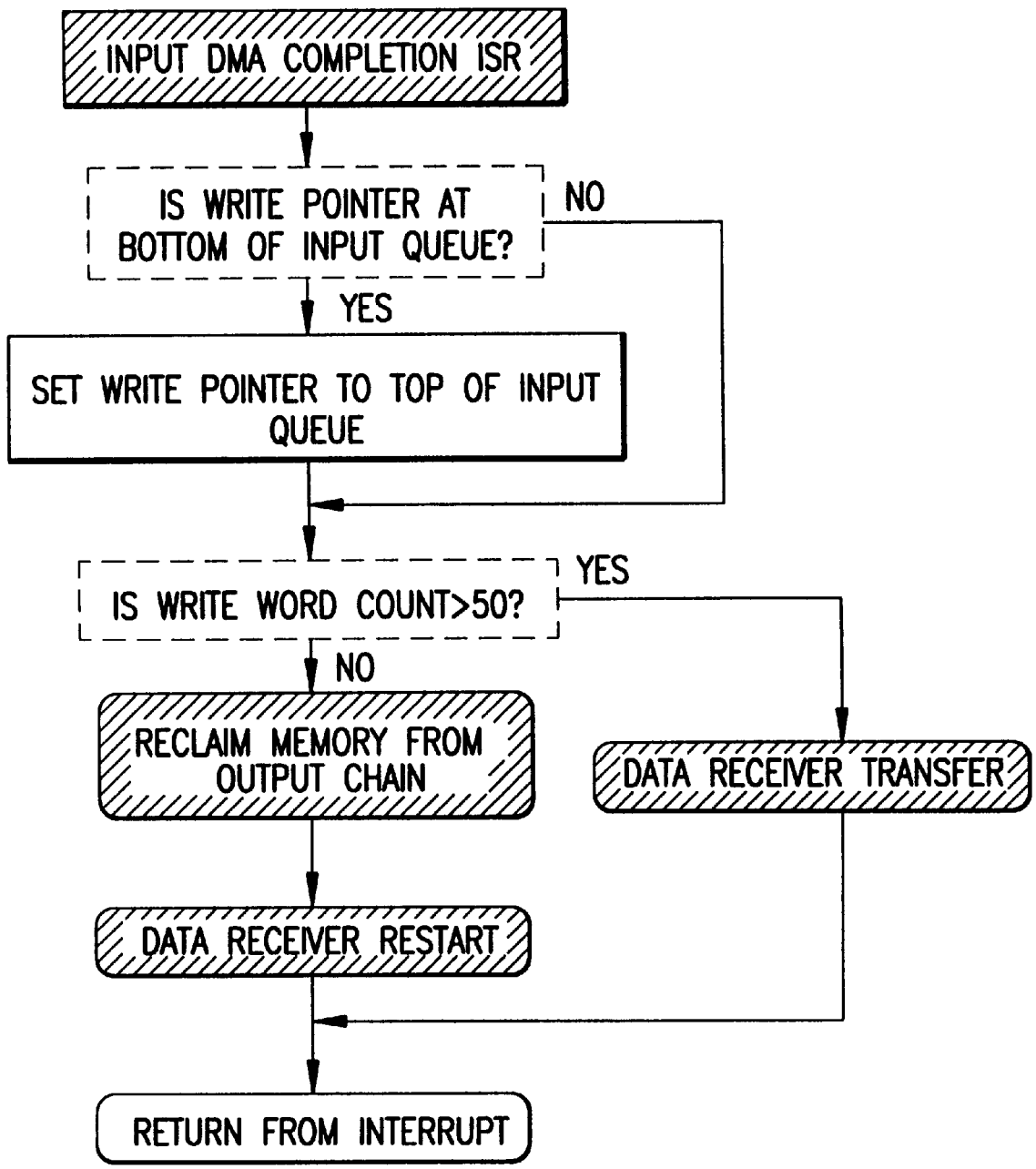
FIG. 53 is a flow-chart of the Input DMA Completion ISR.

FIG. 53 is a flow chart showing the control flow for the data receiver DMA completion ISR, a function that may be used by the FIG. 52 processing to perform queue management.

Figure 54:
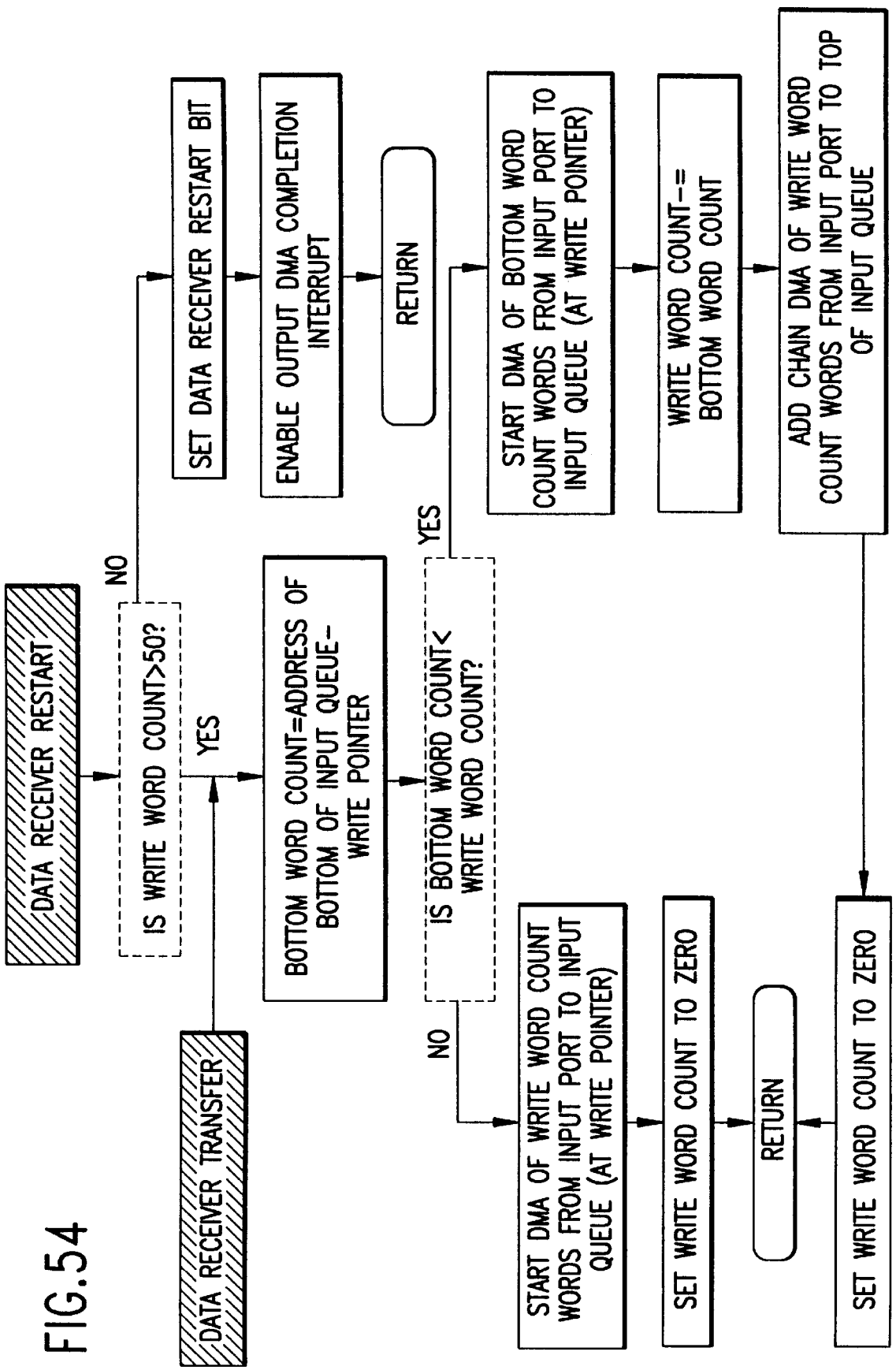
FIG. 54 is a flow-chart showing the data receiver restart and data receiver transfer portions of the FIG. 53 Input DMA Completion ISR.

FIG. 54 illustrates the control flow for the data receiver restart routine, a function that may be used by the FIG. 52 processing to perform queue management.

Figure 55:
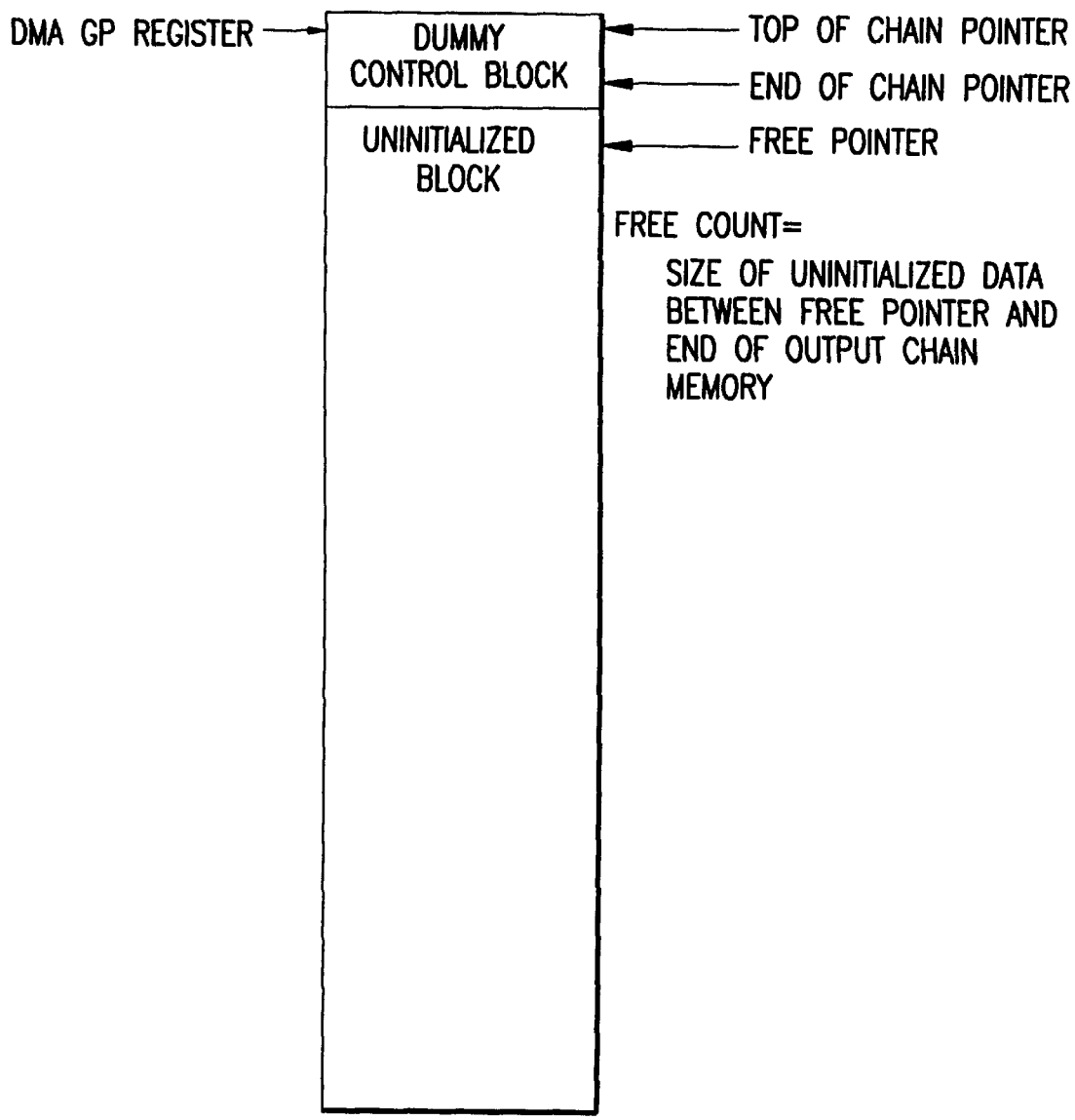
FIG. 55 shows the initial configuration of the FIG. 52 output chain.

FIG. 55 illustrates the initial condition of the output chain before the FIG. 52 process has placed anything upon the output chain 964 (FIG. 52).

Figure 56:
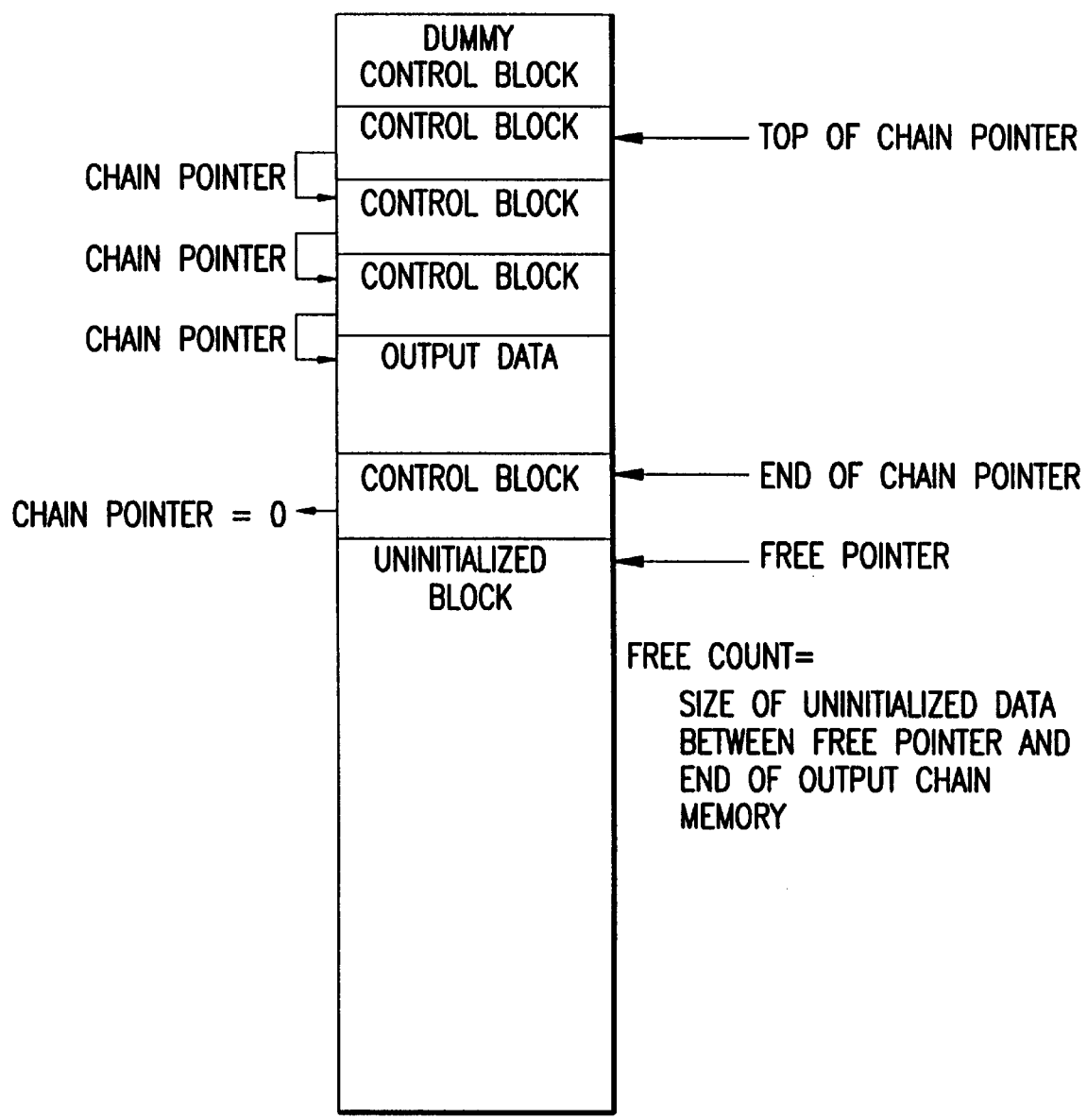
FIG. 56 shows the FIG. 52 output chain after entries have been added to the chain.

FIG. 56 illustrates the output chain 964 (FIG. 52) after entries have been placed on the chain. As entries are added to the output chain, a direct memory access is transferring them to the rendering hardware. When there is insufficient free space in the output chain, entries that have been transferred are reclaimed from the top of the output chain. In order to maintain a single contiguous free area, the free area at the bottom of the chain is lost after reclaiming entries at the top of the chain. Note that this does not affect the transfer of the last entry in the chain.

Figure 57:
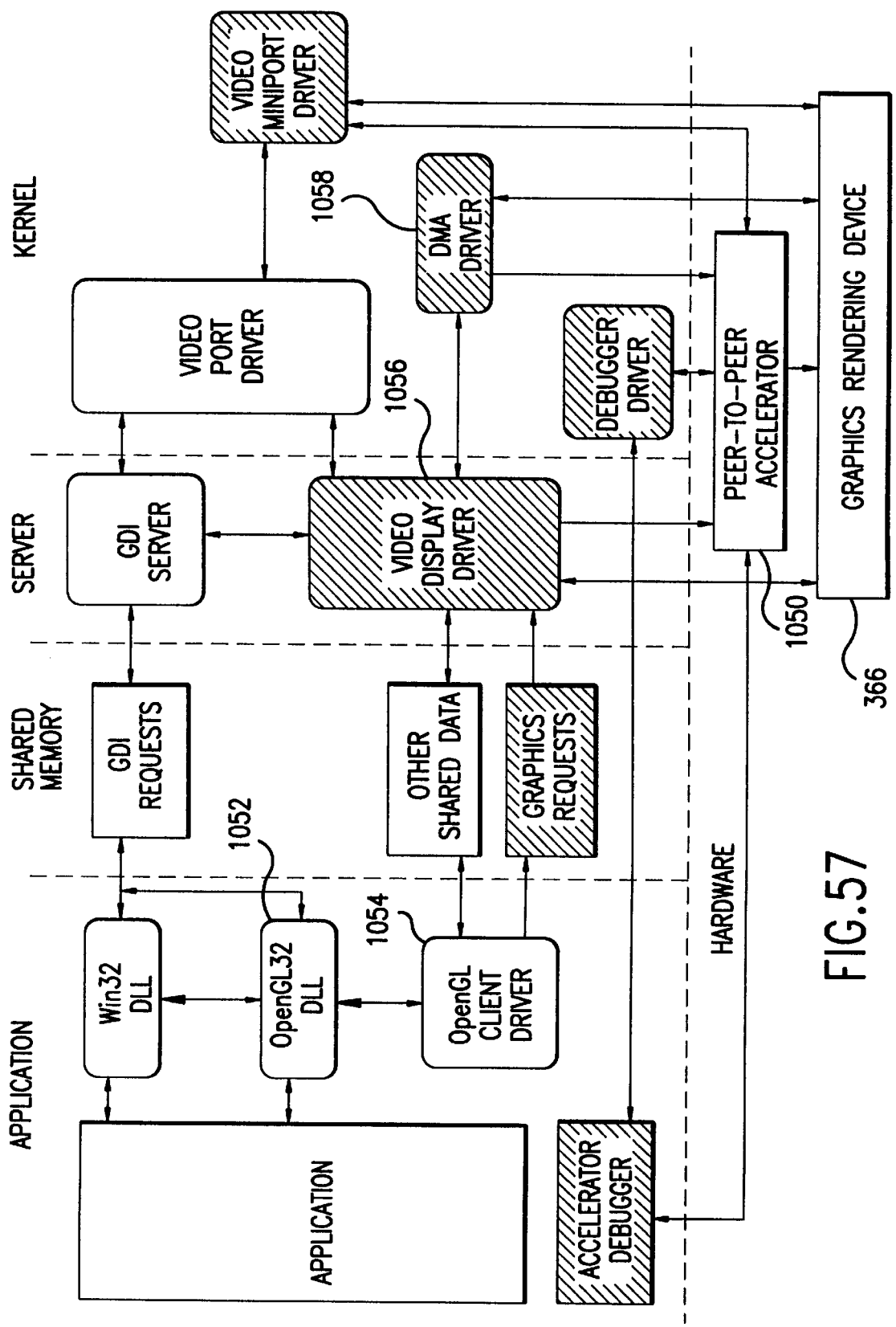
FIG. 57 is a system diagram showing a preferred embodiment as implemented in the Windows NT operating system environment.

FIG. 57 is an overview representation of preferred embodiments of the invention with respect to its integration with a preferred operating system environment hosting the invention, which presently is a host computer running the Windows NT operating system. To the operating system, the invention appears to be a graphics device for which a buffer of OpenGL is created and to which the buffer is transferred by direct memory access. In a preferred embodiment, after the invention finishes processing the buffer of commands, there needs to be functions for the invention to signal the operating system regarding buffer processing status. Such functions would be provided to have the invention perform I/O Control direct memory access synchronization requests to the graphics rendering device through the accelerator, and to allow I/O control to queue such direct memory accesses from the host computer to the invention.

Shown as item 1050, the invention is connected to the graphics rendering device 366 (FIG. 22). The basic program flow is as follows. The application makes OpenGL calls into the OpenGL32 DLL 1052. The OpenGL32 DLL dispatches the OpenGL client driver 1054. The OpenGL client driver builds requests in a shared memory buffer. If the invention can handle the current OpenGL attribute settings, the requests contain headers indicating that they require processing by the invention. If the invention cannot process the current OpenGL attribute settings, the requests will contain headers indicating that they should be passed directly through to the graphics rendering device 366. The OpenGL client driver 1054 instructs the video display driver (VDD) 1056 to copy the buffer of requests to the invention via the OpenGL escape application programming interface. The VDD instructs the direct memory access driver 1058 to add the transfer to its direct memory access queue. The direct memory access driver programs the direct memory access hardware to copy the data from the shared memory buffer to the input FIFO of the invention. In embodiments where there is no private data bus between the invention 1050 and the graphics rendering device 366, the direct memory access driver is also responsible for keeping a perpetual direct memory access running to transfer data from the invention 1050 back to the rendering device 366 through the host-computer's bus. The invention 1050 processes the buffer of requests. Requests that require processing by the invention are so processed, generating output to be sent to the rendering device 366. Requests that do not require processing are passed through.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A graphics accelerator comprising:

a processing system having a plurality of processors, each processor in the processing system having an input and an output;

a request bus that forwards graphics requests to the plurality of processors;

the input of each processor being in communication with the request bus, the plurality of processors being arranged in a peer-to-peer configuration to process each successive graphics request on the request bus on a cyclical basis, the processing system being self-controlling in processing each successive graphics request on the request bus, and a sequencer in communication with the output of each processor, the sequencer receiving processed graphics requests from the output of each processor, the sequencer ordering the received processed graphics requests.

2. The graphics accelerator as defined by claim 1 wherein:

each of the processors has a token input and a token output, the token output of each one of the processors being connected to the token input of another one of the processors, the presence of a control token in the token input of a processor identifying an active processor and triggering the processing by such active processor of a graphics request on the request bus, after processing by such active processor, the control token being forwarded to another one of the processors via the token output of the active processor so that processing by all of the processors is controlled at a peer-to-peer level.

3. The graphics accelerator as defined by claim 2 further comprising:

a communication bus between the sequencer and each of the plurality of processors so that the sequencer can simultaneously receive a processed graphics request from each of the processors.

4. The graphics accelerator as defined by claim 2 wherein a token includes an identifier of the active processor so that another processor can determine when the token has traveled cyclically to all processors.

5. The graphics accelerator as defined by claim 2 further comprising a token identification arrangement for identifying when a token placed by a first processor upon the token output has traveled cyclically to all processors.

6. The graphics accelerator as defined by claim 2 wherein the sequencer further includes:

means for simultaneously receiving the processed graphic requests from each processor; and means for outputting to a graphics rendering device each processed request in the order the processed request was received upon the graphics bus.

7. The graphics accelerator as defined by claim 1 wherein each processor further includes:

a token input for receiving a control token; and an input manager processor for processing tasks defined by data on the token input.

8. The graphic accelerator as defined by claim 7 wherein each processor further includes:

a renderer processor for processing the local request according to the request type into a processed request;

an executive processor for dispatching the local graphics request from the processor's input to the renderer; and an output manager processor for outputting processed graphics requests to the sequencer.

9. A graphics accelerator comprising:

a plurality of processors that each include graphics producing logic, the graphics producing logic producing graphical data from received graphics requests; and a request bus that forwards graphics requests to the processors, the request bus being controlled by no more than one processor at any time, the processor that controls the request bus receiving graphics requests from the request bus, the plurality of processors being in a peer-to-peer configuration to each receive graphics requests from the request bus on a cyclical basis, the plurality of processors communicating to determine the processor that controls the request bus.

10. The graphics accelerator as defined by claim 9 further comprising:

a sequencer that receives processed graphics requests from each processor, the sequencer ordering the received processed graphics requests.

11. The graphics accelerator as defined by claim 9 wherein each processor controls the request bus on a round robin basis.

12. The graphics accelerator as defined by claim 11 wherein graphics requests are forwarded across the request bus in a preselected order, the processors processing the graphics requests in the preselected order to produce a stream of processed graphics requests that are in the preselected order.

13. The graphics accelerator as defined by claim 9 wherein the processors utilize a bus control token passing arrangement to control the request bus, the processor with the bus control token controlling the bus.

14. The graphics accelerator as defined by claim 9 wherein each processor includes:

a processor input that is coupled to the request bus to receive graphics requests; and an input manager processor for processing graphics requests received at the input.

15. The graphics accelerator as defined by claim 14 wherein each processor includes a token input for receiving a bus control token from another one of the plurality of processors, the processor that has the bus control token controlling the bus, the input manager of each processor being coupled with the token input for processing tasks defined by data on the token input.

16. The graphics accelerator as defined by claim 9 wherein each processor includes:

an output; and an output manager processor for outputting processed graphics requests to the output.

* * * * *